United States Patent [19]
Villalon, Jr.

[11] Patent Number: 5,937,679
[45] Date of Patent: *Aug. 17, 1999

[54] TRAILER HITCH LOCK

[75] Inventor: Severo Leonard Villalon, Jr., Duncan, Okla.

[73] Assignee: Guardian Industries, Duncan, Okla.

[*] Notice: This patent is subject to a terminal disclaimer.

[21] Appl. No.: 09/080,634

[22] Filed: May 18, 1998

Related U.S. Application Data

[63] Continuation-in-part of application No. 08/670,672, Jun. 26, 1996, Pat. No. 5,752,398.

[51] Int. Cl.$^6$ ..................................................... E05B 69/00
[52] U.S. Cl. .................................... 70/58; 70/258; 70/14; 280/507
[58] Field of Search .................................. 70/14, 58, 258, 70/DIG. 27; 280/507, 511, 512

[56] References Cited

U.S. PATENT DOCUMENTS

| | | | |
|---|---|---|---|
| 2,130,100 | 9/1938 | Rasmussen | 280/511 |
| 2,204,882 | 6/1940 | Berluti | 280/511 |
| 2,726,099 | 12/1955 | Nunn, Jr. | 280/512 |
| 3,009,714 | 11/1961 | Lamberson | 280/512 |
| 3,139,291 | 6/1964 | Gersey | 280/512 |
| 3,410,580 | 11/1968 | Longenecker | 280/512 |
| 3,567,253 | 3/1971 | Puydt et al. | 280/512 |
| 3,780,546 | 12/1973 | Longenecker | 70/58 |
| 3,830,580 | 8/1974 | Slattery et al. | 280/512 |
| 3,977,221 | 8/1976 | Foote | 70/58 |
| 4,042,256 | 8/1977 | Lepp | 280/512 |
| 4,241,936 | 12/1980 | Carruthers et al. | 280/507 |
| 4,291,557 | 9/1981 | Bulle et al. | 70/58 |
| 4,416,467 | 11/1983 | Bradley | 280/512 |
| 4,444,410 | 4/1984 | Martin | 280/512 |
| 4,581,908 | 4/1986 | Bulle et al. | 70/58 |
| 4,657,276 | 4/1987 | Hamerl | 280/512 |
| 4,774,823 | 10/1988 | Calison | 70/232 |
| 4,817,979 | 4/1989 | Goettker | 280/512 |
| 4,925,205 | 5/1990 | Villalon et al. | 280/507 |
| 5,344,174 | 9/1994 | Sanders | 280/511 |
| 5,441,295 | 8/1995 | Smith | 70/258 |
| 5,632,501 | 5/1997 | Jackson et al. | 280/511 |
| 5,735,539 | 4/1998 | Kravotz | 280/511 |
| 5,752,398 | 5/1998 | Villalon, Jr. | 70/58 |

FOREIGN PATENT DOCUMENTS

| | | | |
|---|---|---|---|
| 318653 | 6/1989 | European Pat. Off. | 280/507 |
| 9429131 | 12/1994 | WIPO | 280/507 |

*Primary Examiner*—Steven Meyers
*Assistant Examiner*—Teri Pham
*Attorney, Agent, or Firm*—Frank J. Catalano

[57] ABSTRACT

An anti-theft device is provided which, when used on a trailer coupler, locks on to the trailer coupler and covers the receptacle of the coupler, thereby preventing the insertion of a hitch ball or other towing means into the receptacle. Locking engagement is achieved by a retaining member being moved and held in a position inside the receptacle of the coupler by the operation of a lock housed in the body of the anti-theft device. In another embodiment of the invention locking engagement is achieved by the retaining member being moved to a position inside the coupler receptacle through operation of a lever independent of the retaining member and being held in such position through operation of a lock housed in the body of the anti-theft device. No tools or auxiliary parts are required to attach or remove the device.

1 Claim, 50 Drawing Sheets

TRAILER HITCH LOCK

CROSS-REFERENCE TO RELATED APPLICATION

This application is a continuation-in-part of allowed patent application Ser. No. 08/670,672, filed Jun. 26, 1996 "TRAILER HITCH LOCK", Severo L. Villalon, Jr., Inventor; U.S. Pat. No. 5,752,398.

BACKGROUND OF THE INVENTION

This invention is directed generally to locking mechanisms and more particularly to an apparatus which covers the hitch ball receptacle of a trailer coupler thereby denying access to the receptacle and preventing unauthorized movement of the trailer.

Several locking devices have previously been devised which cover the hitch ball receptacle or opening of a conventional ball and socket type trailer coupler to prevent thieves from connecting a tractor vehicle to the trailer and hauling the trailer off. In prior devices the retaining member can be moved into the receptacle only by moving or depressing a part extending to the outside of the device. This part is either the retaining member itself, an extension of the retaining member or an attachment to the retaining member. In these prior devices, the movement of the retaining member into the hitch ball receptacle of the coupler is independent of the operation of the lock. Only after the retaining member is moved into the hitch ball receptacle, is the lock activated to hold the retaining member in place or to block access to a means of releasing the retaining member. In most prior art devices, the lock is a separate padlock which is not permanently affixed to the device. There are no devices known to this inventor in which the act of locking a lock permanently affixed to the device causes the retaining member to move into the hitch ball receptacle.

In Foote, U.S. Pat. No. 3,526,110 a set screw must be adjusted with a separate tool in order to properly operate the locking device. In Longnecker, U.S. Pat. No. 3,780,546 a separate padlock is used to secure the device to the trailer coupler.

In Bulle, U.S. Pat. No. 4,291,557 the retaining member is spring loaded allowing it to automatically retract as the device is slipped over the coupler and then to automatically project into the hitch ball receptacle when the device is in place.

The locking device is removed through a key operated, spring biased cam which retracts the retaining member from the hitch ball receptacle. With the retaining member retracted, the locking device can then be removed from the coupler. However, upon removal of the locking device from the coupler, the retaining member is exposed and is subject to being bent or damaged.

SUMMARY OF THE INVENTION

The locking device of the present invention has a body which fits on a trailer coupler to cover the hitch ball receptacle of the coupler. The hitch ball receptacle is the opening in the trailer's coupler into which the ball of the towing vehicle fits. The device has a lock mounted on the body, said lock having a locked position and an unlocked position. The lock has a lock pin responsive to a lock plunger, wherein the movement of the lock plunger from an unlocked position to a locked position causes the lock pin to move a retaining member into the hitch ball receptacle or opening. With the retaining member in the hitch ball receptacle, the device can not be removed from the coupler and a hitch ball can not be inserted into the hitch ball receptacle or opening. This prevents the trailer from being stolen by unauthorized towing. Unlocking the lock causes the lock pin to retract, which allows the retaining member to move out of the hitch ball receptacle. The device can then be removed from the coupler and the coupler can once again receive a hitch ball.

In one embodiment, the device is designed to fit a coupler manufactured from sheet metal stampings which has an outwardly extending flange on the coupler's perimeter. In this embodiment, the body of the device has a U-shaped groove designed to receive the outwardly extending flange of the coupler. The device of this embodiment is attached to the coupler by alligning the device's U-shaped groove with the coupler's flange, sliding the device on to the flange and activating the lock whereby a retaining member in the form of a boss is extended into the hitch ball opening to prevent removal of the locking device.

In another embodiment, the device is designed to fit a typical coupler manufactured from cast or forged components. In this embodiment the body of the device has an open ended cavity for receiving the coupler within the body. The device is fitted on to the coupler by aligning the open end of the cavity with the coupler, then sliding the device over the outer surface of the coupler so that the coupler is positioned inside the cavity. To lock the device onto the coupler the lock is locked which causes a retaining member or boss to extend into the hitch ball opening to prevent removal of the locking device from the coupler.

In still another embodiment, a lever independent of the retaining member has a handle which extends out of the body of the device. Movement of the handle causes the lever to pivot the retaining member or boss into the hitch ball receptacle of the coupler. The lock must then be moved to its locked position, which causes a lock pin to block the retaining member from moving out of the hitch ball receptacle.

In yet another embodiment, an opening is provided in the body so that the device can be attached to a bolt or other mounting member for storage. Preferably, the bolt or mounting member is located on the trailer itself. Thus, the device can be stored conveniently on the trailer, rather than in a car, truck or other location where it might become lost, misplaced or otherwise unavailable when needed for use on the trailer coupler.

In the locking device of this invention, the action of locking and unlocking the lock causes the retaining member or boss to move in and out of the hitch ball receptacle. It is not necessary that a part of the retaining member, independent of the lock, be accessed from the outside of the device to lock the device to the coupler. Thus, the risk of damage to the retaining member by exposure to outside forces is significantly reduced and the efficiency and ease of operation of the device is improved. No tool, independent padlock, or key is required to place the retaining member or boss in an engaged position.

It is, therefore, the primary object of this invention to provide a trailer hitch locking device which covers a trailer coupler's hitch ball receptacle and in which the operation of the lock moves and holds the retaining member inside the hitch ball receptacle to prevent removal of the locking device from the coupler.

Another object is to provide a trailer hitch locking device in which a part independent of the retaining member is used to move the retaining member into the coupler's hitch ball receptacle and the lock is engaged to block the retaining member from retracting from the receptacle.

Another object of the present invention is to provide a trailer hitch locking device which can be easily stored on the trailer when the device is not in use.

Other objects and a better understanding of the invention can be had from the following description taken in conjunction with the drawings.

DETAILED DESCRIPTION OF THE PREFERRED EMBODIMENTS

Figure 1:
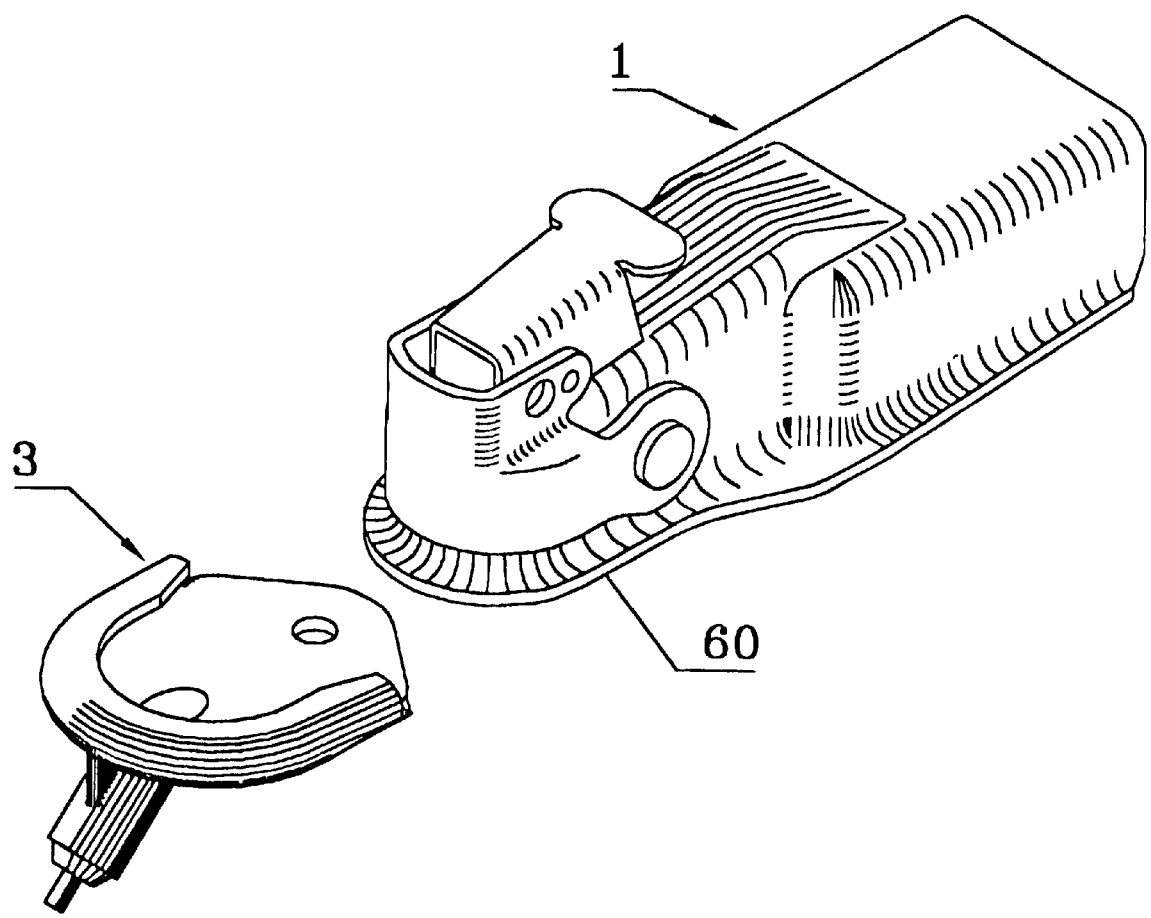
FIG. 1 is an isometric view of a sheet metal type coupler positioned next to the first embodiment of the locking device.
Figure 8:
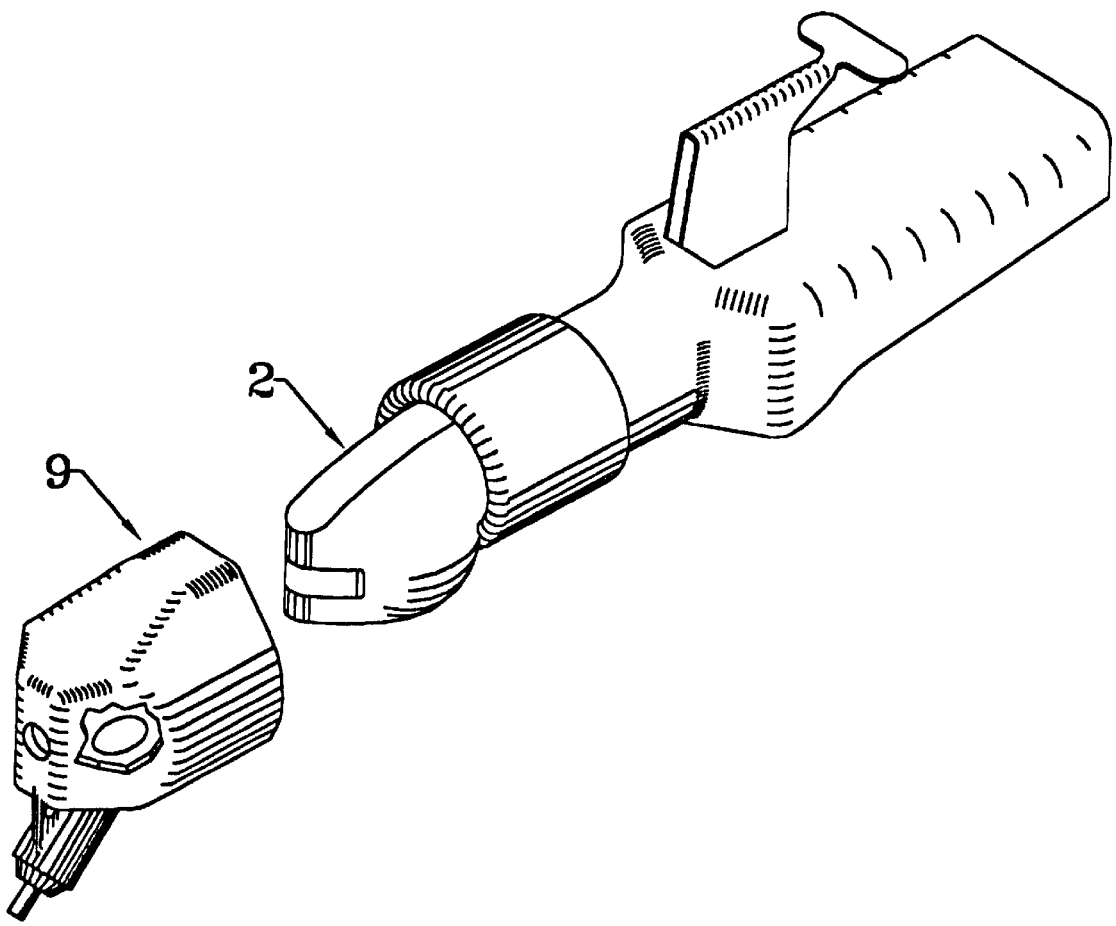
FIG. 8 is an isometric view of a solid steel type coupler positioned next to the second embodiment of the locking device.

Trailer couplers are generally manufactured from sheet metal stampings or from cast or forged components. FIG. 1 illustrates locking device 3 next to a typical sheet metal trailer coupler 1 manufactured from sheet metal stampings. This type of coupler has an outwardly extending flange 60 formed on the perimeter of the coupler. FIG. 8 illustrates my locking device 9 next to a typical coupler 2 manufactured from cast or forged components. In both types of couplers, a hitch ball receptacle or opening is provided for receiving the hitch ball of a towing vehicle.

A vehicle with a hitch ball is generally needed to pull the trailer. The trailer is coupled to the vehicle by placing the trailer coupler's hitch ball receptacle over the vehicle's hitch ball, thereby allowing the vehicle to pull the trailer.

First Embodiment

Figure 2:
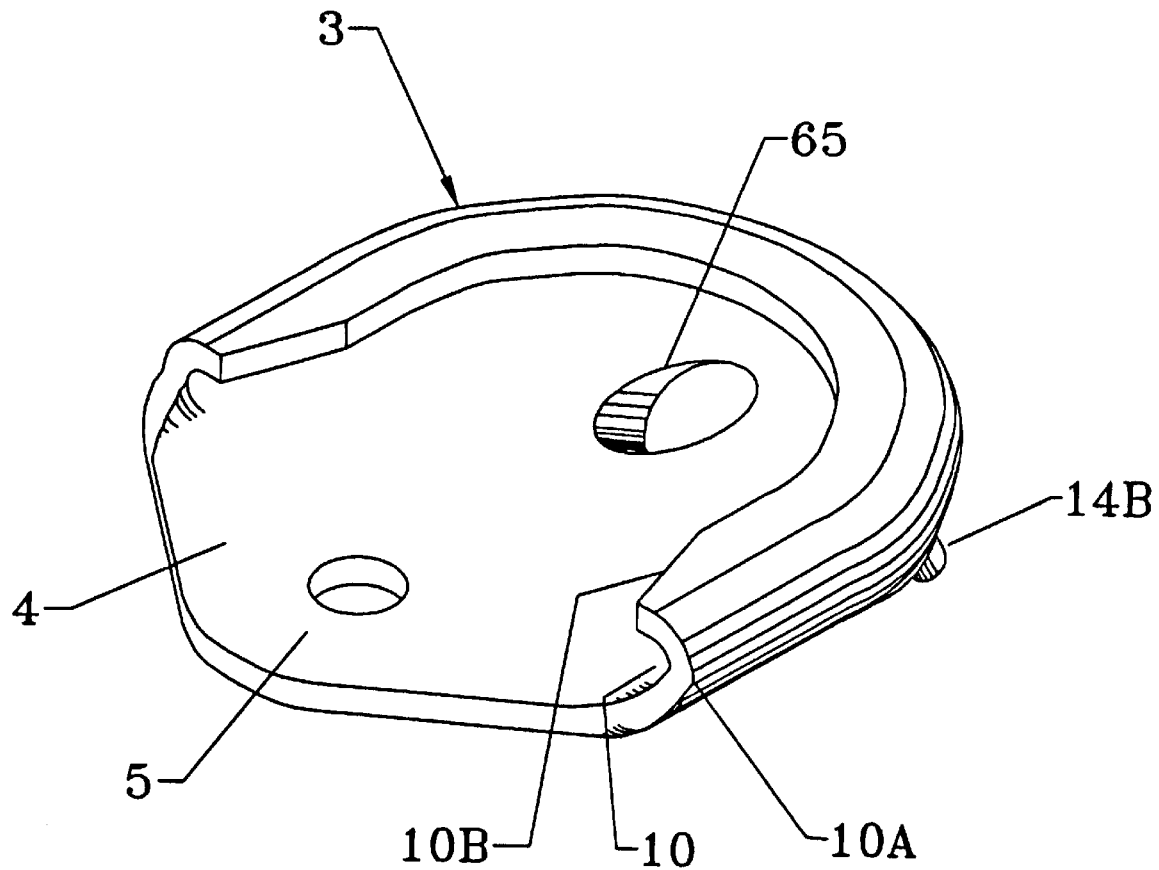
FIG. 2 is an isometric view from the rear or receiving end of the first embodiment of the locking device with the lock shown in an unlocked position.
Figure 3:
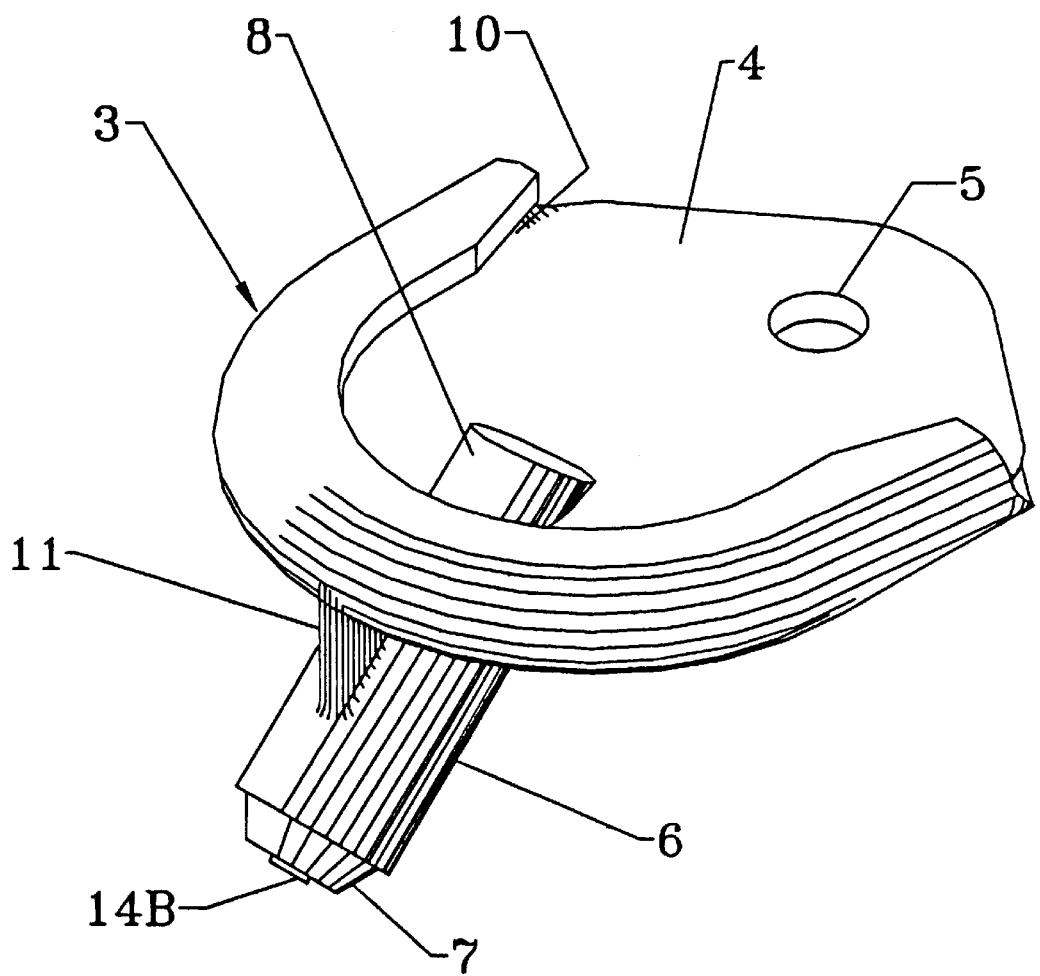
FIG. 3 is an isometric view from the front of the first embodiment of the locking device with the lock in a locked position.

FIG. 2 shows the first preferred embodiment of the locking device of this invention in an unlocked position, unattached to a coupler. FIG. 3 shows the same first preferred embodiment of the locking device, but in a locked position, unattached to a coupler.

Figure 4:
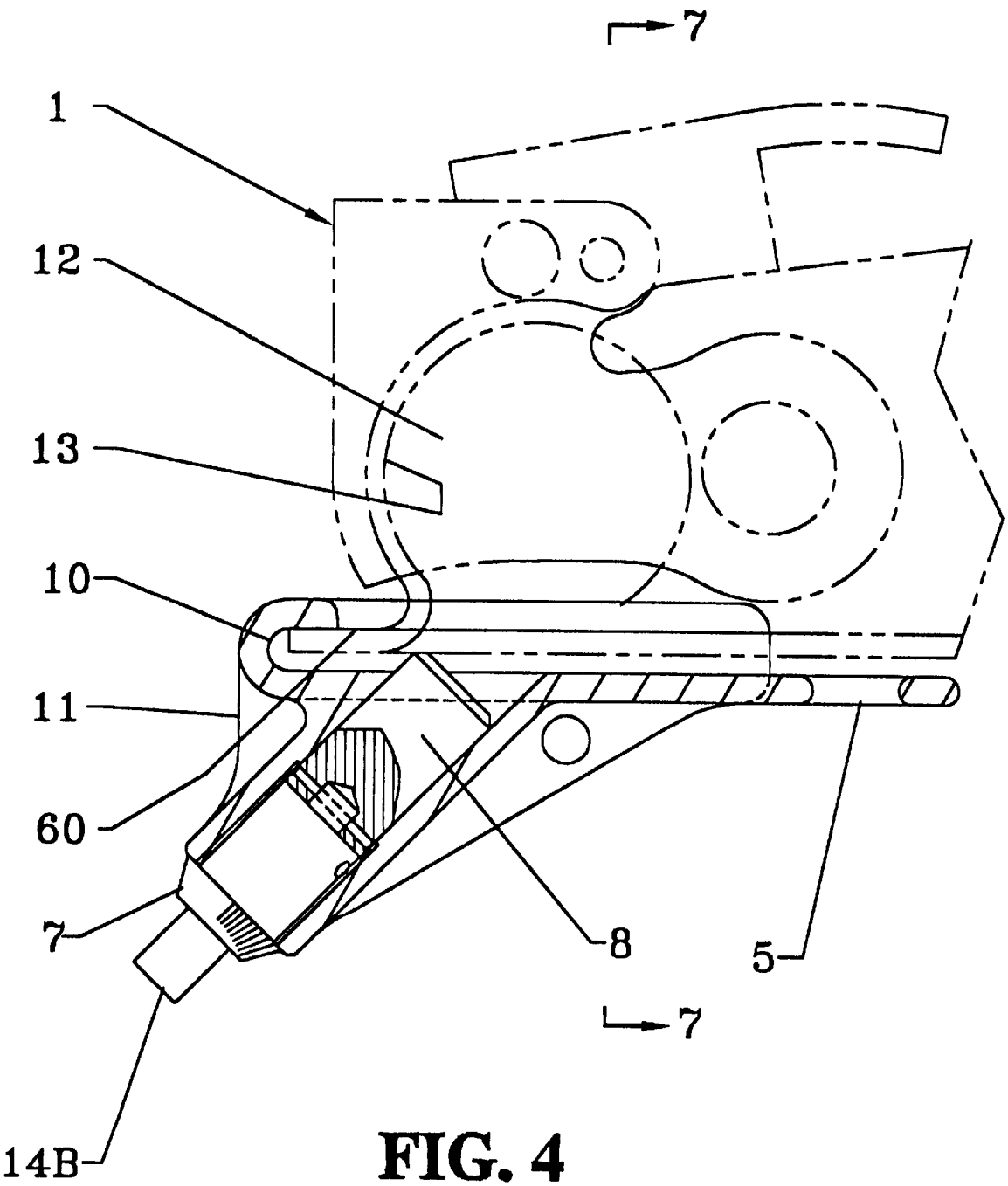
FIG. 4 is a partial side view, partial cross-sectional view of the first embodiment of the locking device shown positioned on a coupler in an unlocked position.
Figure 5:
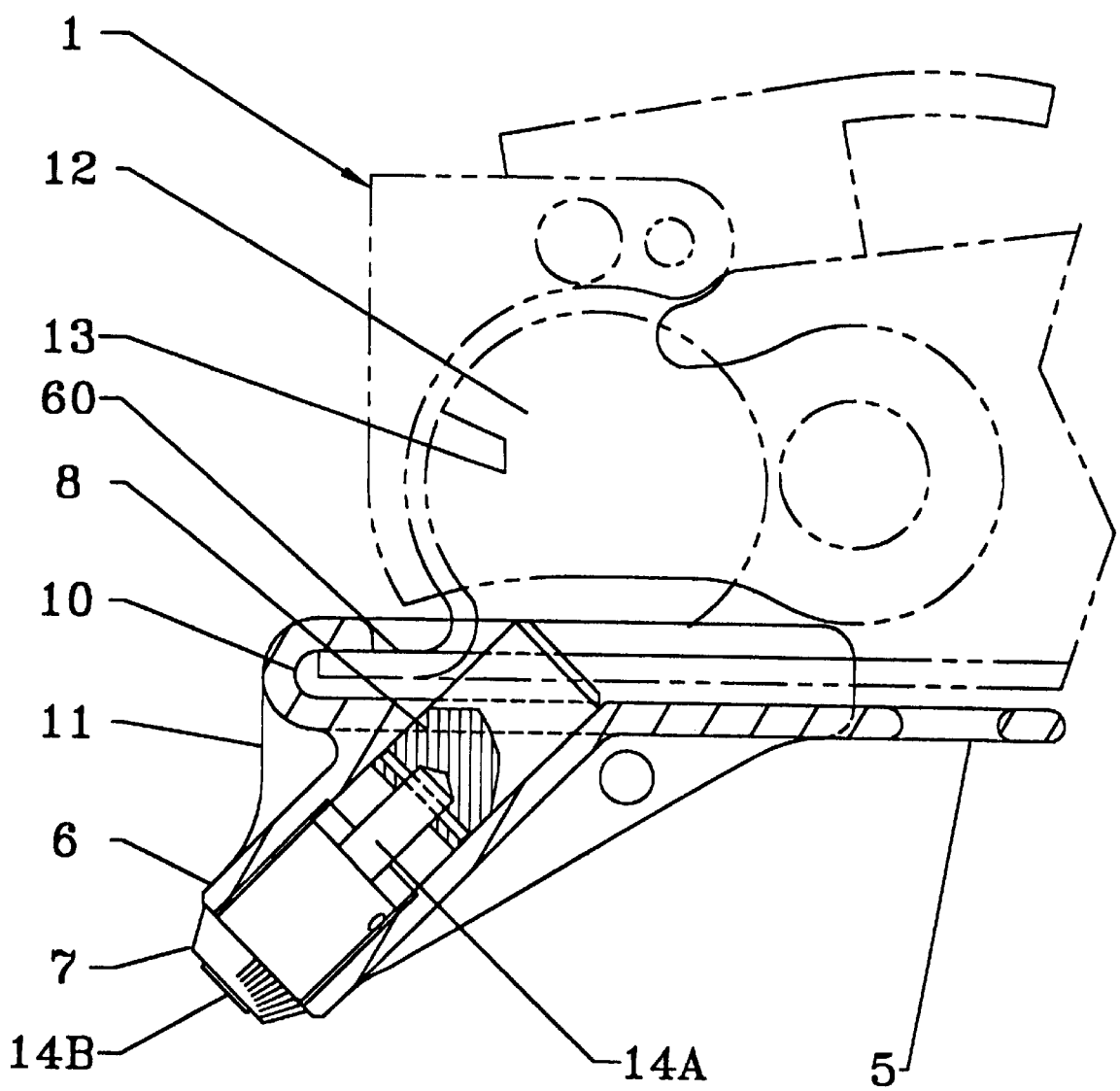
FIG. 5 is the same view as FIG. 4, but showing the locking device in its locked position.
Figure 6:
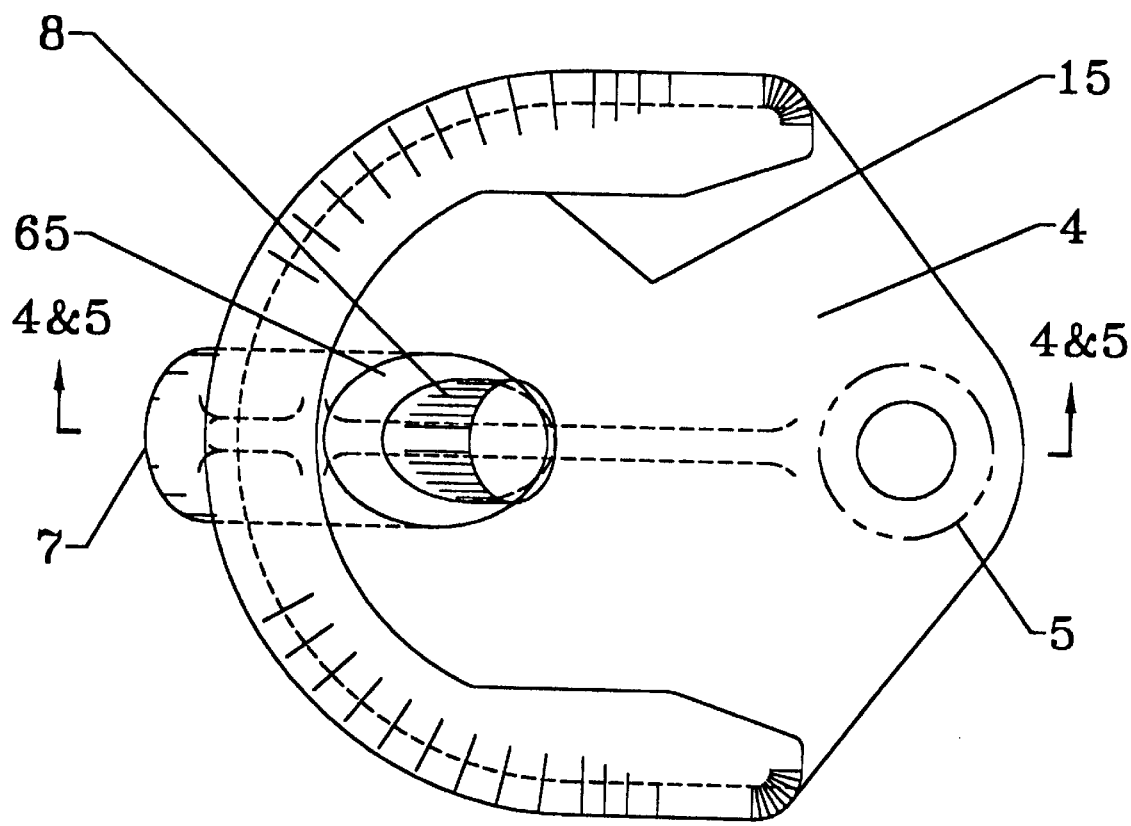
FIG. 6 is a top view of the device in FIG. 5.
Figure 7:
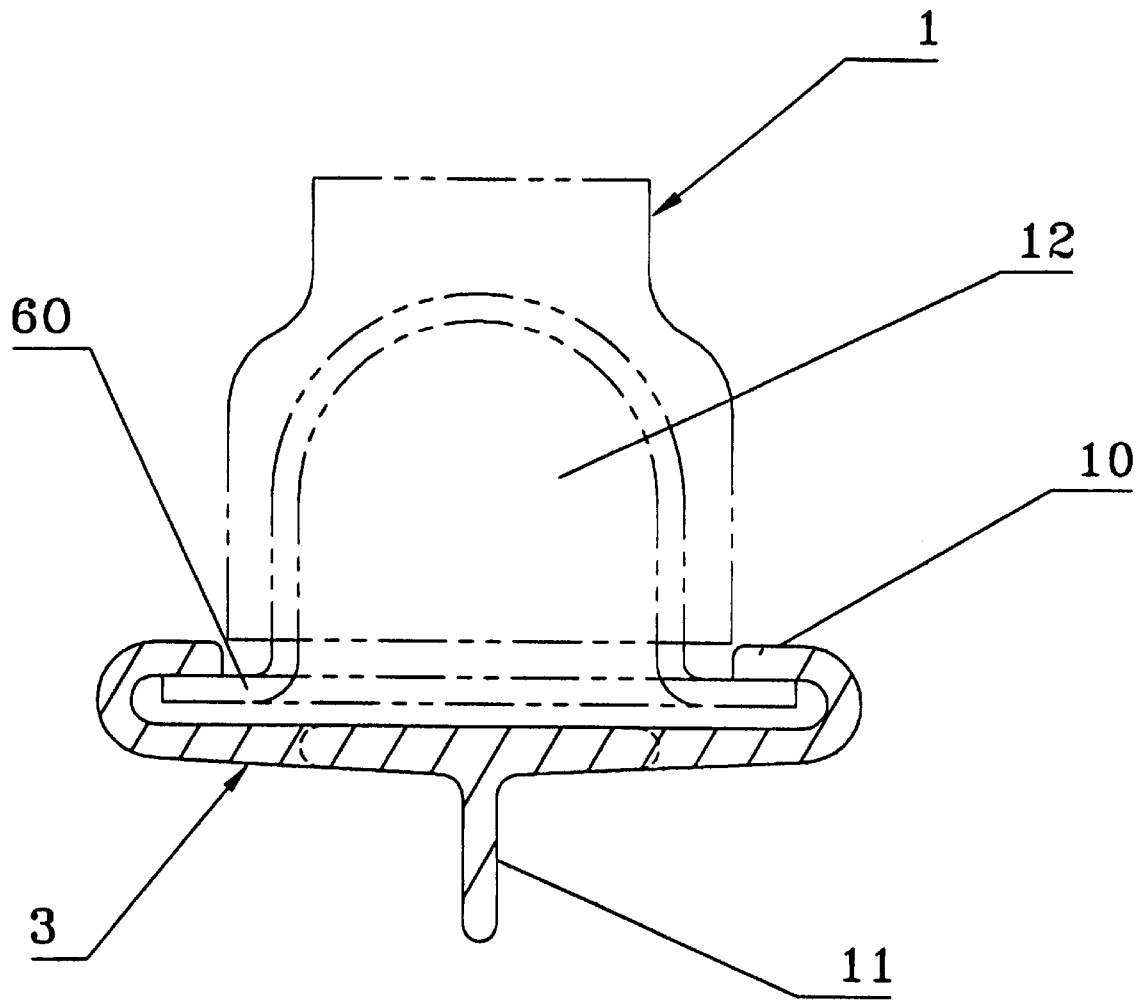
FIG. 7 is a cross-sectional view of the device in FIG. 4.

Referring to FIGS. 2 and 3, it can be seen that locking device 3 has a planar body member 4, with a top side, a bottom side, and a U-shaped groove 10 formed about a portion of the periphery of the top side of planar member 4. The U-shaped groove 10 is made by forming an upturned side member 10A about a part of the periphery of the planar member 4 with side member 10A having an inwardly extending lip 10B. Referring to FIGS. 1 and 2, locking device 3 is positioned on coupler 1 by aligning the outwardly extending flange 60 of coupler 1 with the U-shaped groove 10 of device 3 and then sliding device 3 onto coupler 1 so that the coupler's flange 60 is held in U-shaped groove 10. Opening 65 in planar member 4 should be next to the hitch ball opening or receptacle 12 when device 3 is properly positioned on coupler 1. As shown in FIGS. 4, 5 and 7, device 3 has a size and shape such that a sliding and secure fit, with close tolerances is obtained with coupler 1. As shown in FIGS. 4 and 5, when the locking device 3 is properly fitted on the coupler 1, the hitch ball receptacle 12 is covered by locking device 3 and when so covered cannot receive a hitch ball.

Next is a discussion of the locking mechanism for holding locking device 3 in place on the coupler to prevent the trailer from being stolen. Referring to FIGS. 2, 3, 4, 5 and 6, there is a hole 65 in planar member 4. A cylindrical member 6, which is attached to or made a part of planar member 4, is extending downward from the bottom side of planar member 4 at the perimeter of hole 65. Cylindrical member 6 is supported by gusset 11. There is an axial bore within cylindrical member 6 which is in alignment with hole 65. Lock 7 with a lock pin 14A and lock plunger 14B is housed in the end of cylindrical member 6 away from hole 65. Lock pin 14A moves axially within the bore of cylindrical member 6 in response to lock plunger 14B. A coupler engaging means in the form of an elongated boss 8 is attached to the end of lock pin 14A and preferably integral therewith. The boss 8 is sized to allow it to be easily inserted into hitch ball receptacle 12. Any attempt to remove the device from the coupler will cause the boss 8 to bear against the interior surface 13 of hitch ball receptacle 12. Therefore, boss 8 must be of sufficient shape and strength to withstand bending or breakage from such engagement.

Preferably, lock 7 is a punch type, cylinder lock known in the art. Lock 7 is placed in a locked position simply by depressing spring loaded lock plunger 14B. In this type of lock no key is needed to move lock 7 from an unlocked position to a locked position. However, a key is needed to release lock plunger 14B and unlock the lock 7. As is evident, other types of locks could be used to accomplish the purposes of this invention. It is not the intent to limit the practice of the invention to punch type cylinder locks with respect to any of the embodiments.

FIG. 4 shows locking device 3 positioned on coupler 1, with the lock 7 in an unlocked position. In this unlocked position, lock plunger 14B is extended to the outside of the device 3 and lock pin 14A is retracted. Boss 8, being an integral extension of lock pin 14A, is also in a retracted position, housed within the bore of cylindrical member 6. In this retracted position boss 8 is not inside hitch ball receptacle 12 and does not obstruct the positioning or removal of device 3 on or from coupler 1.

FIG. 5 shows locking device 3 attached to coupler 1, with lock 7 in a locked position. In this locked position, lock plunger 14B is depressed, lock pin 14A is extended and boss 8 protrudes into the coupler's hitch ball receptacle 12. Device 3 can not be removed from coupler I because boss 8 is inside the hitch ball receptacle 12. Any attempt to move device 3 from coupler 1 will cause boss 8 to bear against a portion of the interior surface 13 of hitch ball receptacle 12, thereby obstructing movement of locking device 3 and preventing a hitch ball from being inserted into hitch ball receptacle 12 for towing the trailer. Boss 8 should be of sufficient size, shape and strength to withstand bending or breakage as a result of forced contact with the interior surface 13 of hitch ball receptacle 12.

A key, not shown, can be used to unlock lock 7 and release lock plunger 14B. When lock 7 is unlocked, lock pin 14A and boss 8 retract to a position within the axial bore of the cylindrical member 6 and out of hitch ball receptacle 12.

In the preferred embodiment, the body of locking device 3 should be made of a material which can withstand attempts to hammer or pry device 3 from its locked position on coupler 1. Preferably the body should be made from steel and be cast and machined to allow a close tolerance fit to trailer couplers. The locking device should also have supportive structures known in the art to absorb efforts to remove the device or the lock. At the minimum the locking device should be able to withstand being struck with a hammer or being pried upon with a crowbar.

In my prototype, planar member 4 has a thickness of about 0.5 centimeters, boss 8 has a diameter of about 1.8 centimeters and a length of about 3.2 centimeters. Boss 8 moves a total distance of approximately 1.3 centimeters in response to lock plunger 14B being depressed to a locked position. These dimensions are not intended to be exact or limiting, as devices with other dimensions could also be used.

Figure 45:
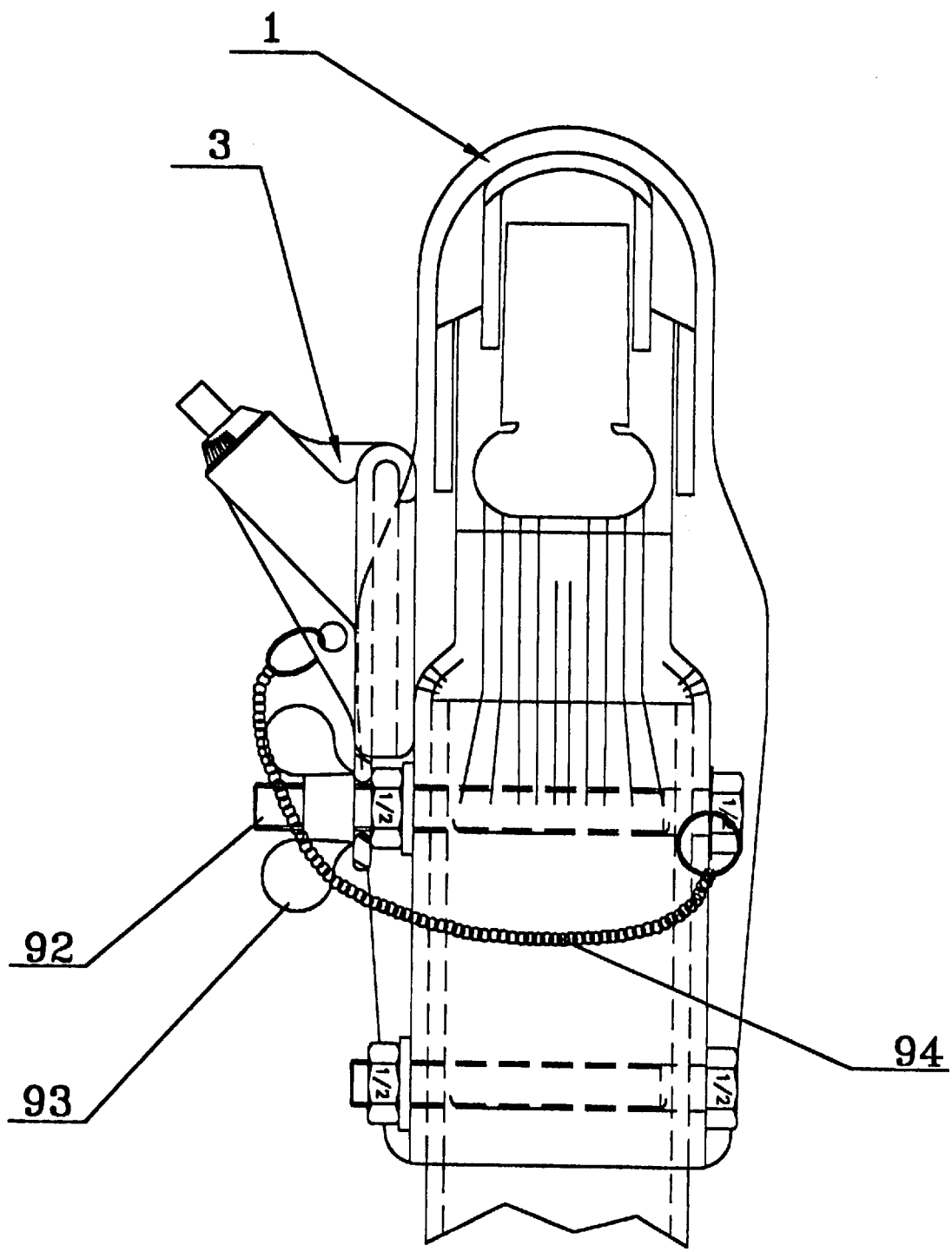
FIG. 45 is a top view of a sheet metal type coupler demonstrating how the locking device of the first embodiment can be stored on a trailer when the locking device is not in use.

A hole 5 is provided for mounting device 3 on a bolt or other mounting member, for storage. Preferably, the bolt or mounting member is located on the trailer so that the lock can be conveniently stored on the trailer itself when not in use. FIG. 45 demonstrates one way in which hole 5 can be used to store locking device 3 on the trailer when the locking device is not is use. Referring to FIG. 2 and FIG. 45, a bolt 92 extending from the trailer is inserted through hole 5 of locking device 3. The locking device 3 is secured to t he bolt by a nut 93. A safety chain 94 should be used to prevent loss of the locking device in the event the nut 93 becomes detached from the bolt 92. As is evident, the devices of the third, fifth, seventh, ninth and eleventh embodiments could be stored in a similar manner.

Second Embodiment

FIGS. 9A, 9B, 10A, 10B, 11, 12, 13 and 14 depict a second embodiment of the locking device of this invention. This embodiment is similar to the first preferred embodiment except that the body of locking device 9 is designed to fit the type of coupler shown in FIG. 8 which is usually manufactured from cast or forged components. The body of locking device 9 includes a ceiling 53, two side walls 54, an end wall 55, and a bottom wall 56 which define an open ended cavity 81 in which coupler 2 is received. There is a hole 66 in the bottom wall 56.

Figure 9A:
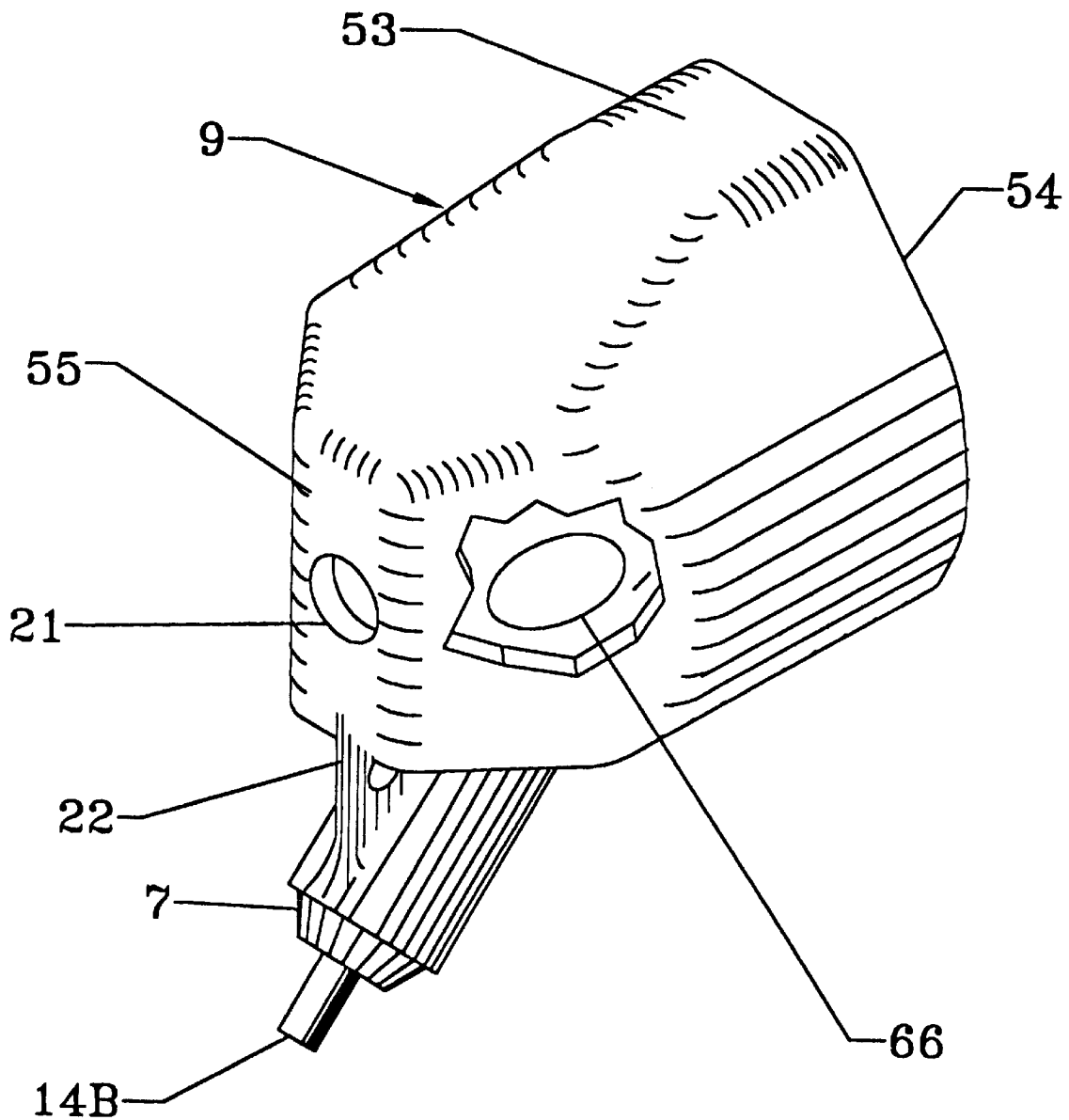
FIG. 9A contains an isometric view from the front of the second embodiment of the locking device with the lock in an unlocked position.
Figure 9B:
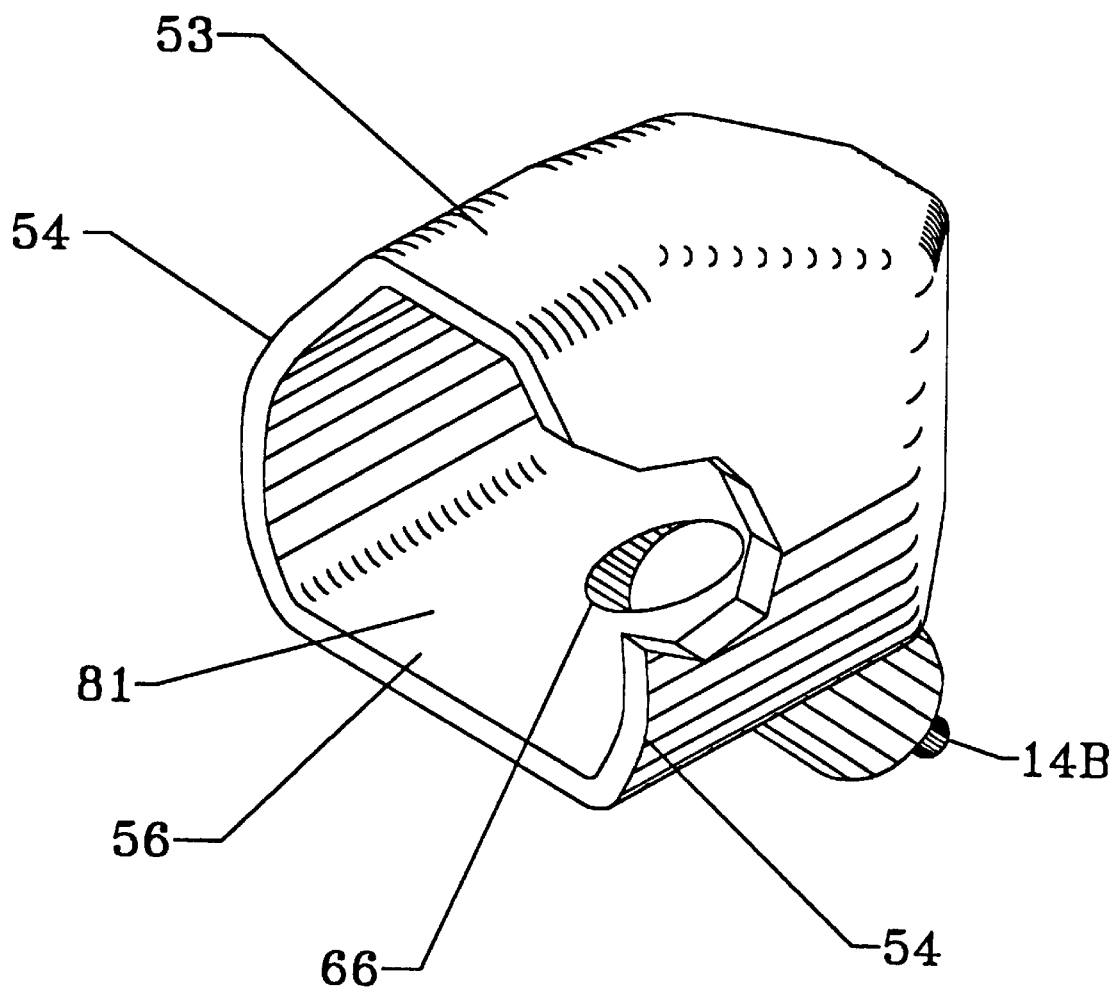
FIG. 9B contains an isometric view from the rear of the second embodiment of the locking device with the lock in an unlocked position.

In FIGS. 9A and 9B, locking device 9 is shown in an unlocked position, unattached to coupler 2. FIG. 9A is an isometric view from the front of the locking device. FIG. 9B is an isometric view from the rear of the locking device. Locking device 9 is placed on coupler 2 by aligning open ended cavity 81 of device 9 with the end of coupler 2 and sliding device 9 over coupler 2 so that the outer surface of coupler 2 is positioned within cavity 81 of locking device 9. Device 9 has a size and shape such that a sliding and secure fit, with close tolerances is obtained with coupler 2.

Figure 10A:
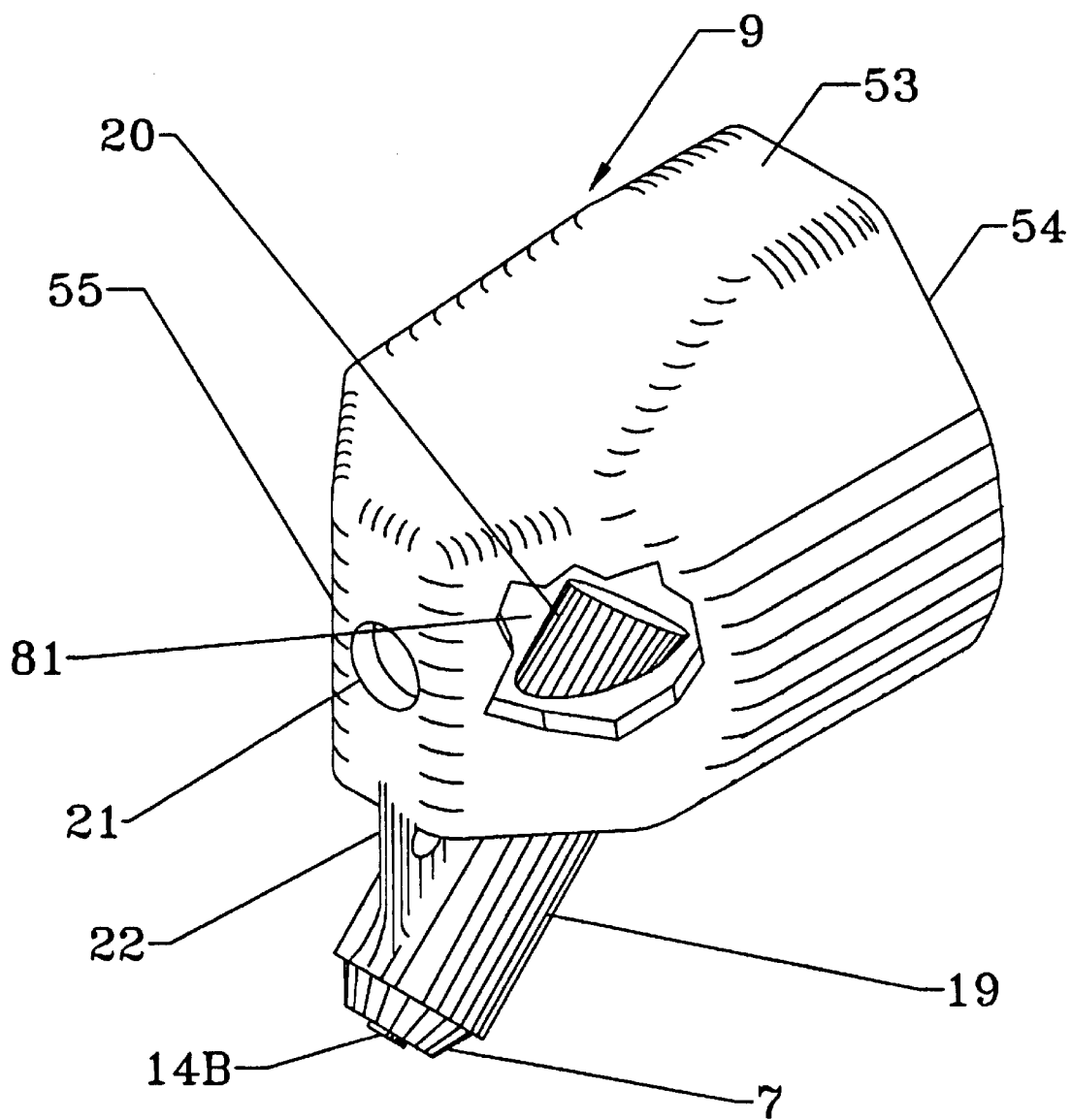
FIG. 10A contains an isometric view from the front of the second embodiment of the locking device with the lock in a locked position.
Figure 10B:
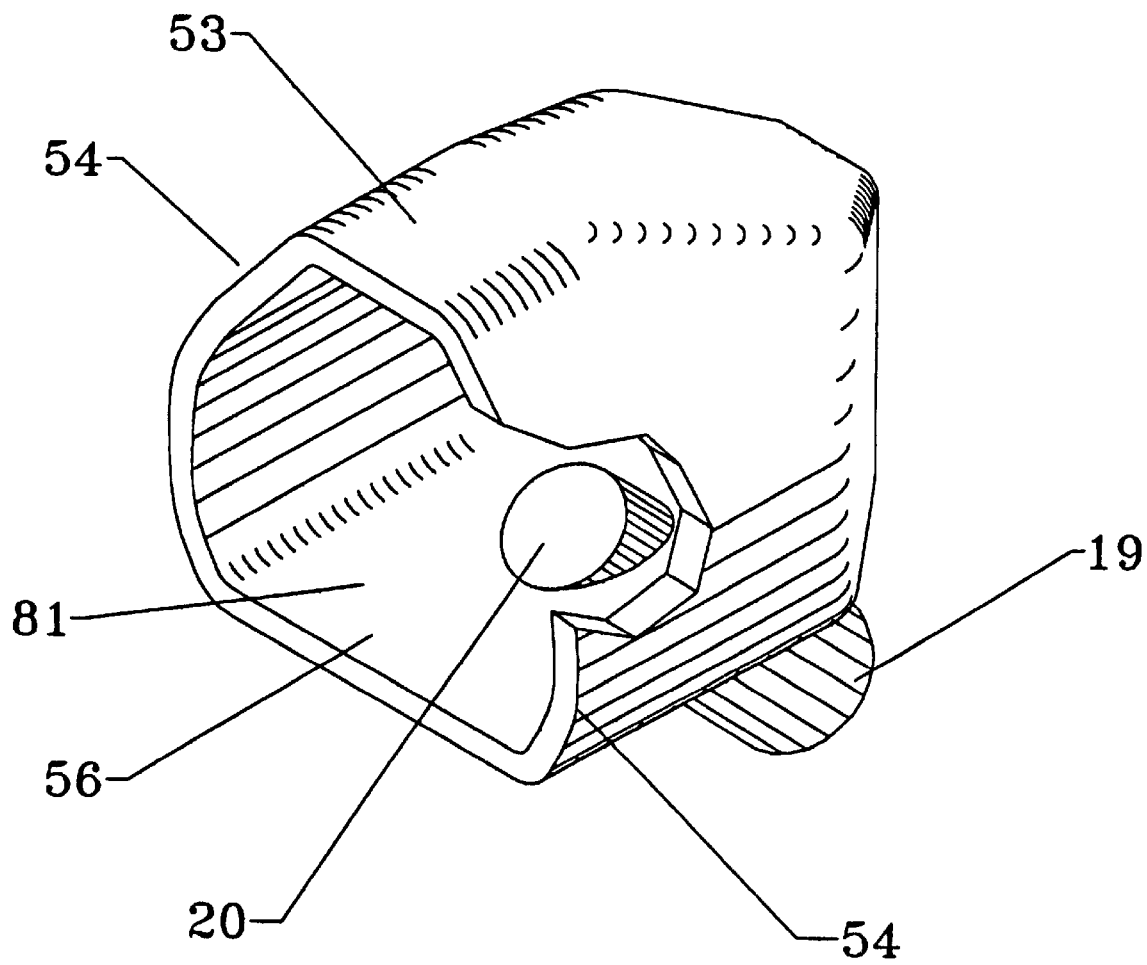
FIG. 10B contains an isometric view from the rear of the second embodiment of the locking device with the lock in a locked position.

Next, referring to FIGS. 1A, 10B, 11 and 12, is a discussion of the locking mechanism for holding locking device 9 on coupler 2 to prevent the trailer from being stolen. A cylindrical member 19 attached to or made a part of bottom wall 56 extends downward from bottom wall 56 at the perimeter of hole 66. Cylindrical member 19 is supported by gussett 22. There is an axial bore within cylindrical member 19 which is in alignment with hole 66. Lock 7, having a lock pin 14A and a lock plunger 14B, is housed in the end of cylindrical member 19 away from hole 66. Lock pin 14A moves axially within the bore of cylindrical member 19 in response to lock plunger 14B. A coupler engaging means in the form of an elongated boss 20 is integrally attached to the end of lock pin 14A and is preferably integral therewith. As shown in FIGS. 10A and 10B, boss 20 protrudes into the open ended cavity 81 when the lock 7 is in a locked position.

Figure 11:
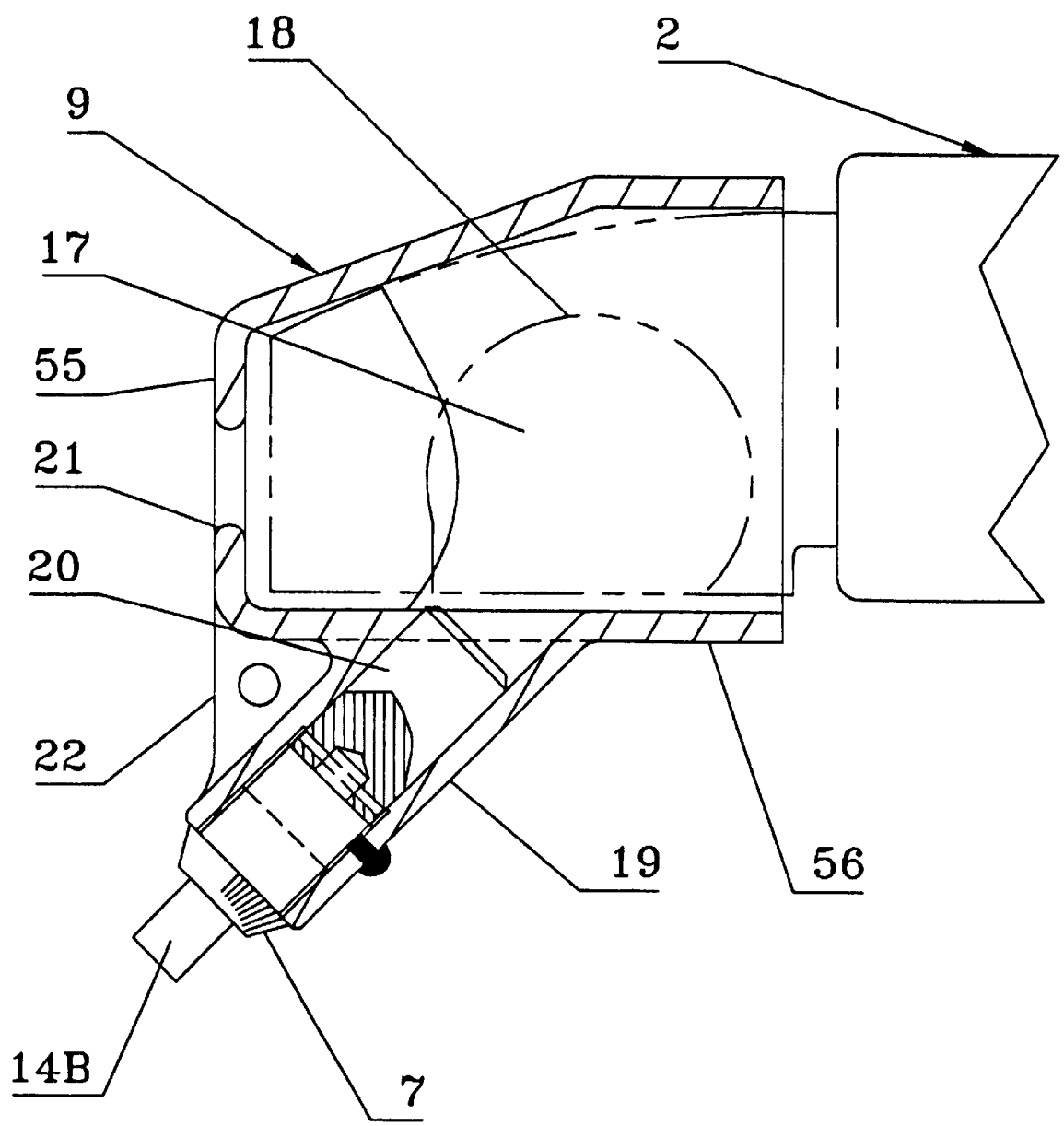
FIG. 11 is a partial side view, partial cross-sectional view of the second embodiment of the locking device of FIG. 8 shown positioned on a coupler in an unlocked position.

FIG. 11 shows locking device 9 positioned on coupler 2, with the lock 7 in an unlocked position. In this unlocked position, lock pin 14A is retracted and boss 20, being an integral extension of the lock pin 14A, is also in a retracted position housed within the bore of cylindrical member 19. Boss 20 is not positioned in hitch ball receptacle 17 and does not obstruct the positioning or removal of locking device 9 on or from coupler 2. Preferably, lock 7 is a punch type cylinder lock. However any number of locks known in the art also may be used.

Figure 12:
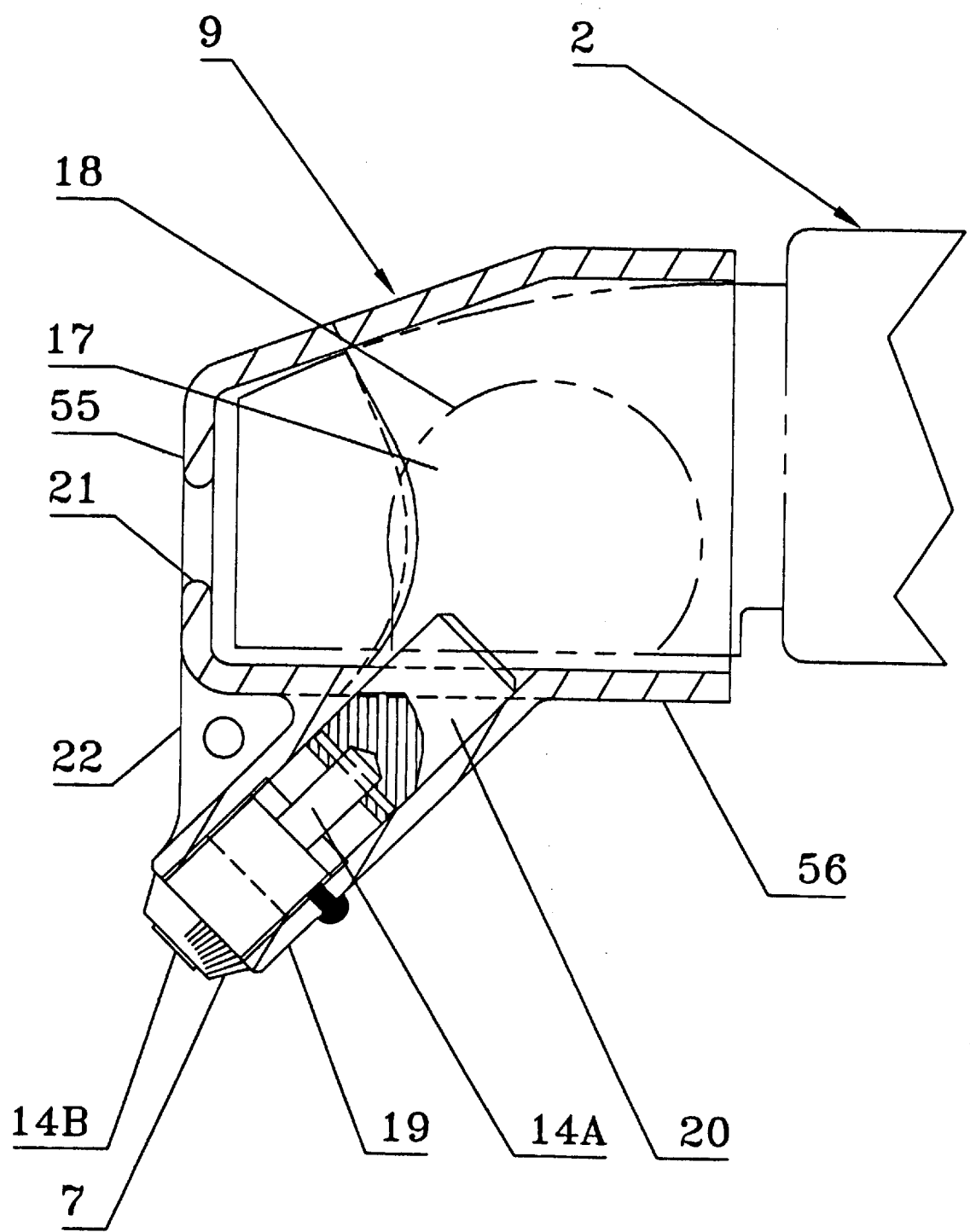
FIG. 12 is a partial side view, partial cross-sectional view of the second embodiment of the locking device of FIG. 8 shown positioned on the coupler in a locked position.

FIG. 12 shows locking device 9 attached to coupler 2, with the lock 7 in a locked position. In this position, lock pin 14A is extended and boss 20 protrudes into the coupler's hitch ball receptacle 17. Device 9 can not be removed because boss 20 is inside hitch ball receptacle 17 and will bear against a part of the interior surface 18 of hitch ball receptacle 17, thereby obstructing the removal of device 9 and preventing a hitch ball from being inserted into hitch ball receptacle 17. Boss 20 should be of sufficient size, shape and strength to withstand bending or breakage as a result of forced contact with the interior surface 18 of hitch ball receptacle 17.

Figure 13:
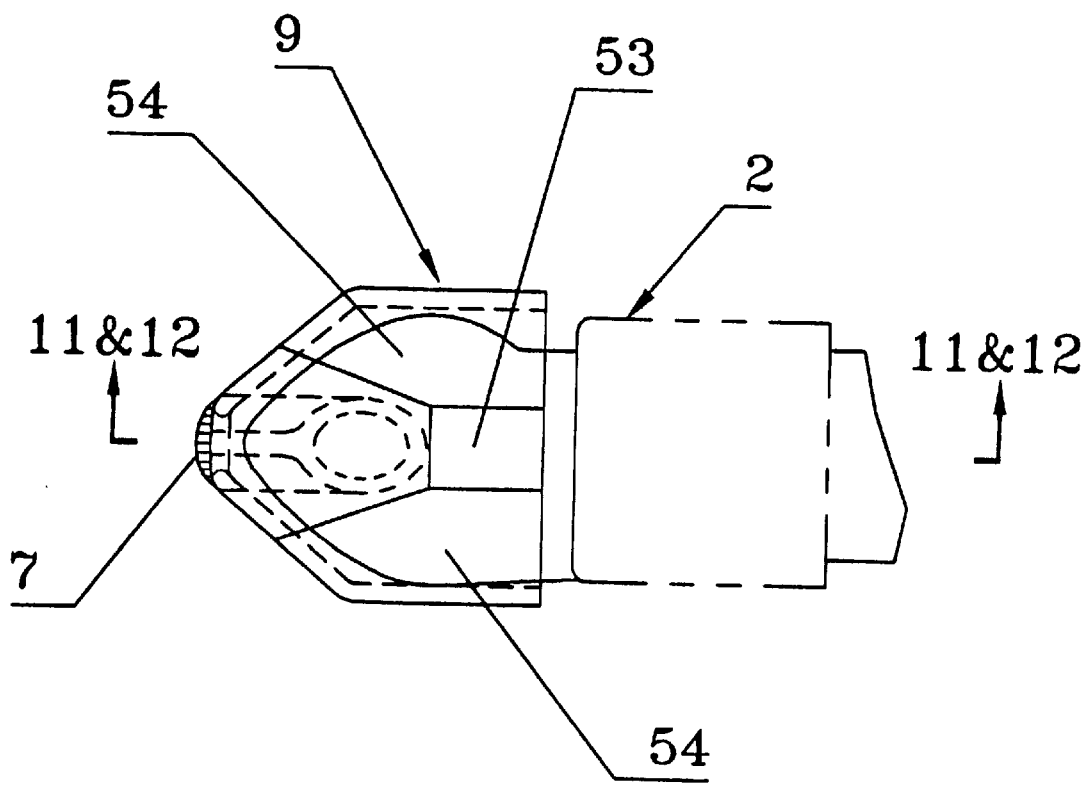
FIG. 13 is a top view of the device in FIG. 11.

FIG. 13 is a top view of the locking device 9, with dashed lines depicting the interior structure.

A key, not shown, can be used to unlock lock 7 and release lock plunger 14B. When lock 7 is unlocked, it causes lock pin 14A and boss 20 to retract to a position within the axial bore of cylindrical member 19, free of hitch ball receptacle 17.

As can be seen, the locking device of this embodiment can be placed on a coupler even if the coupler does not have an outwardly extending flange.

In my prototype the ceiling 53, sidewalls 54, end wall 55 and bottom wall 56 have an approximate thickness of 0.5 centimeters. Boss 20 has a diameter of about 1.8 centimeters and a length of about 3.2 centimeters. Boss 20 moves a distance of about 1.3 centimeters in response to lock plunger 14B being depressed. These dimensions are not intended to be exact or limiting as similar devices with other dimensions could also be used.

Figure 14:
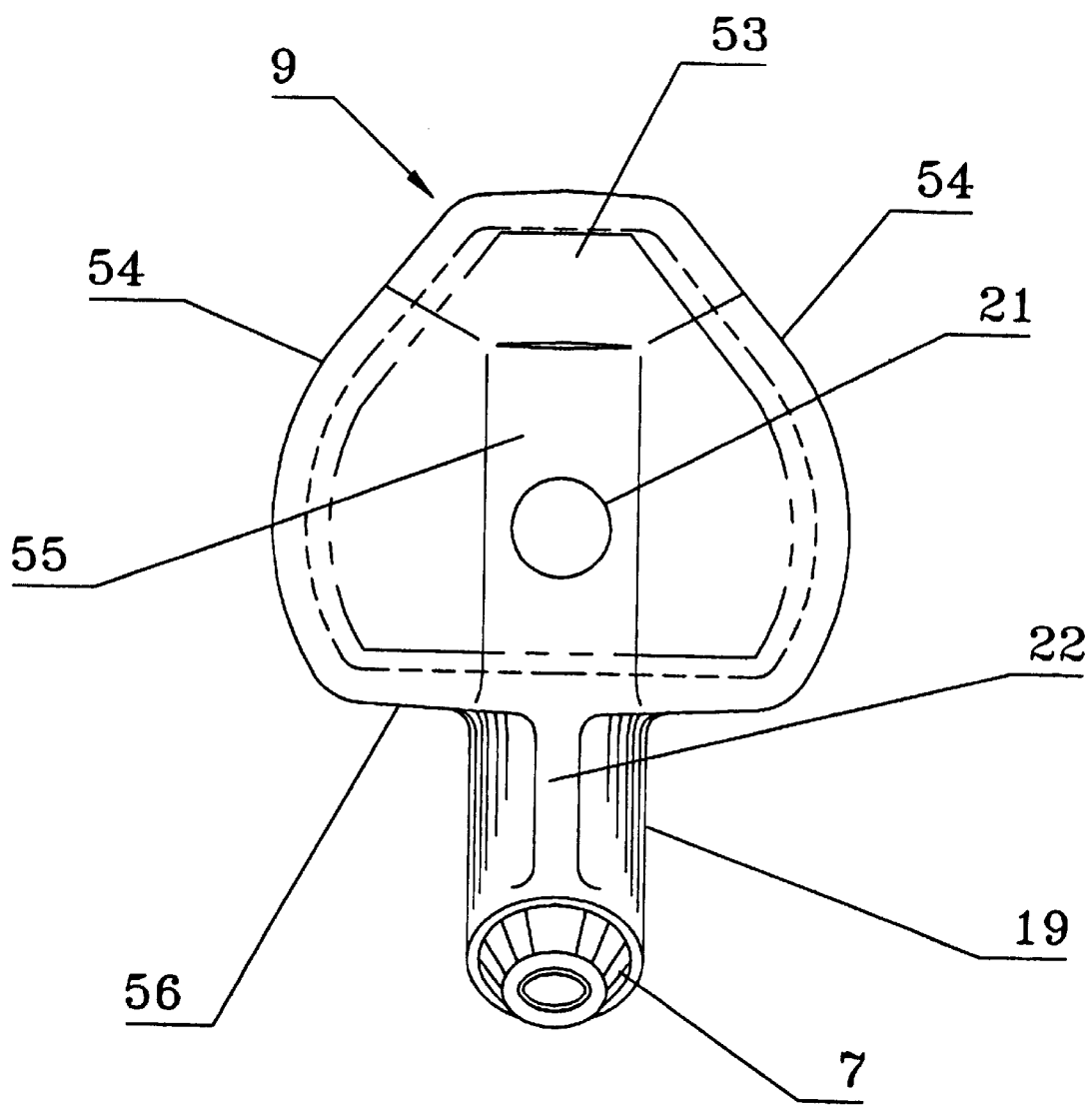
FIG. 14 is an end view of the device in FIG. 11.
Figure 46:
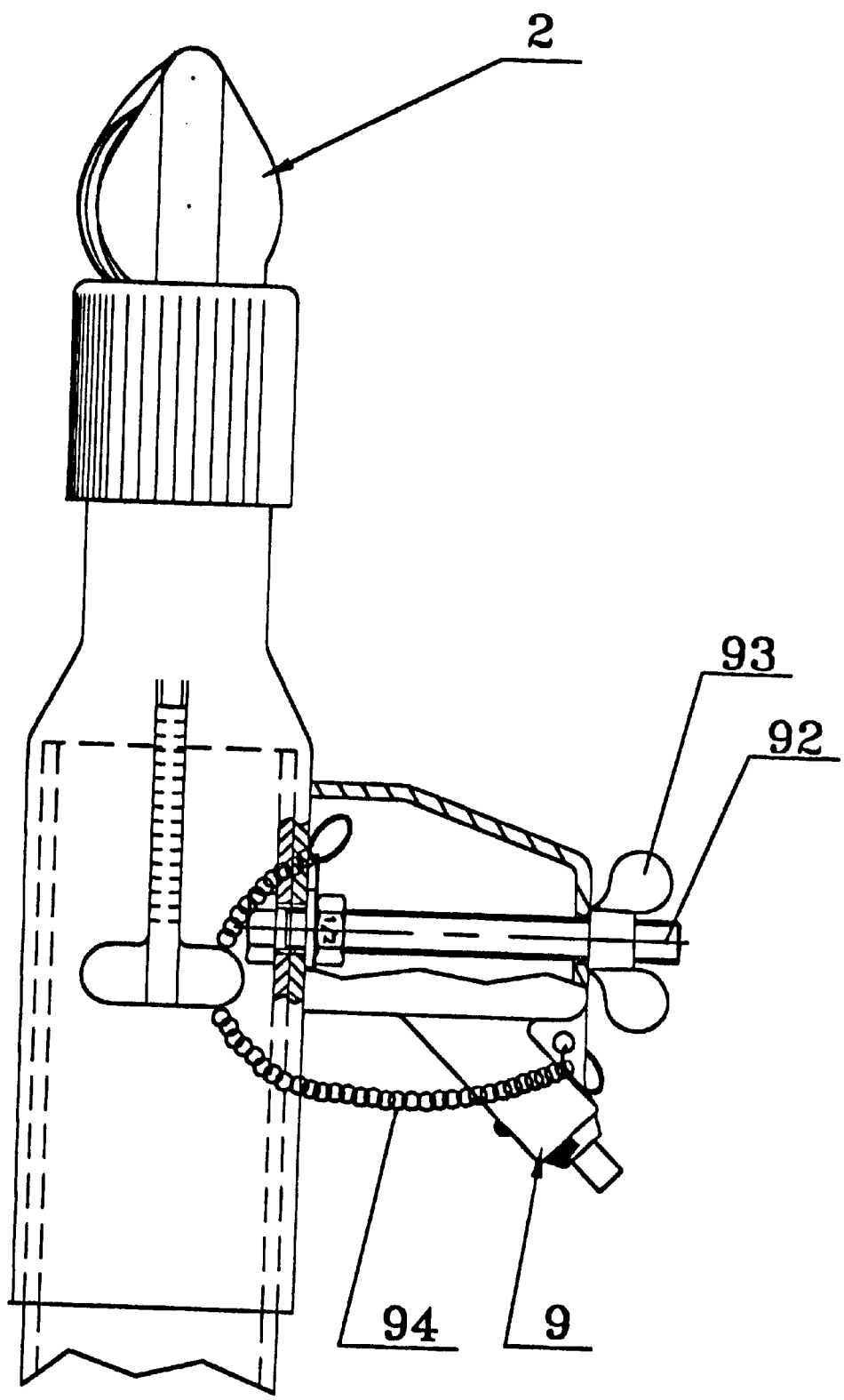
FIG. 46 is a top view of a solid steel type coupler demonstrating how the locking device of the second embodiment can be stored on a trailer when the locking device is not in use.

Referring to FIG. 14, a hole 21 is provided in end wall 55 for mounting device 9 on a bolt or other mounting member for storage. Preferably, the bolt or mounting member is on the trailer itself so that device 9 can be stored on the trailer when the device is not in use. FIG. 46 demonstrates one way that hole 21 can be used to store locking device 9 on the trailer when the locking device is not is use. Referring to FIG. 9A and FIG. 46, a bolt 92 extending from the trailer is inserted through hole 21 of locking device 9. The locking device 9 is secured to the bolt by a nut 93. A safety chain 94 should be used to prevent loss of the locking device in the event the nut 93 becomes detached from the bolt 92. As is evident, the devices of the fourth, sixth, eighth, tenth and twelfth embodiments could be stored in a 9 and preventing a hitch ball from being inserted into hitch ball receptacle 17. Boss 20 should be of sufficient size, shape and strength to withstand bending or breakage as a result of forced contact with the interior surface 18 of hitch ball receptacle 17.

FIG. 13 is a top view of the locking device 9, with dashed lines depicting the interior structure.

A key, not shown, can be used to unlock lock 7 and release lock plunger 14B. When lock 7 is unlocked, it causes lock pin 14A and boss 20 to retract to a position within the axial bore of cylindrical member 19, free of hitch ball receptacle 17.

As can be seen, the locking device of this embodiment can be placed on a coupler even if the coupler does not have an outwardly extending flange.

In my prototype the ceiling 53, sidewalls 54, end wall 55 and bottom wall 56 have an approximate thickness of 0.5 centimeters. Boss 20 has a diameter of about 1.8 centimeters and a length of about 3.2 centimeters. Boss 20 moves a distance of about 1.3 centimeters in response to lock plunger 14B being depressed. These dimensions are not intended to be exact or limiting as similar devices with other dimensions could also be used.

Referring to FIG. 14, a hole 21 is provided in end wall 55 for mounting device 9 on a bolt or other mounting member for storage. Preferably, the bolt or mounting member is on the trailer itself so that device 9 can be stored on the trailer when the device is not in use. FIG. 46 demonstrates one way that hole 21 can be used to store locking device 9 on the trailer when the locking device is not is use. Referring to FIG. 9A and FIG. 46, a bolt 92 extending from the trailer is inserted through hole 21 of locking device 9. The locking device 9 is secured to the bolt by a nut 93. A safety chain 94 should be used to prevent loss of the locking device in the event the nut 93 becomes detached from the bolt 92. As is evident, the devices of the fourth, sixth, eighth, tenth and twelfth embodiments could be stored in a similar manner.

Third Embodiment

Figure 15:
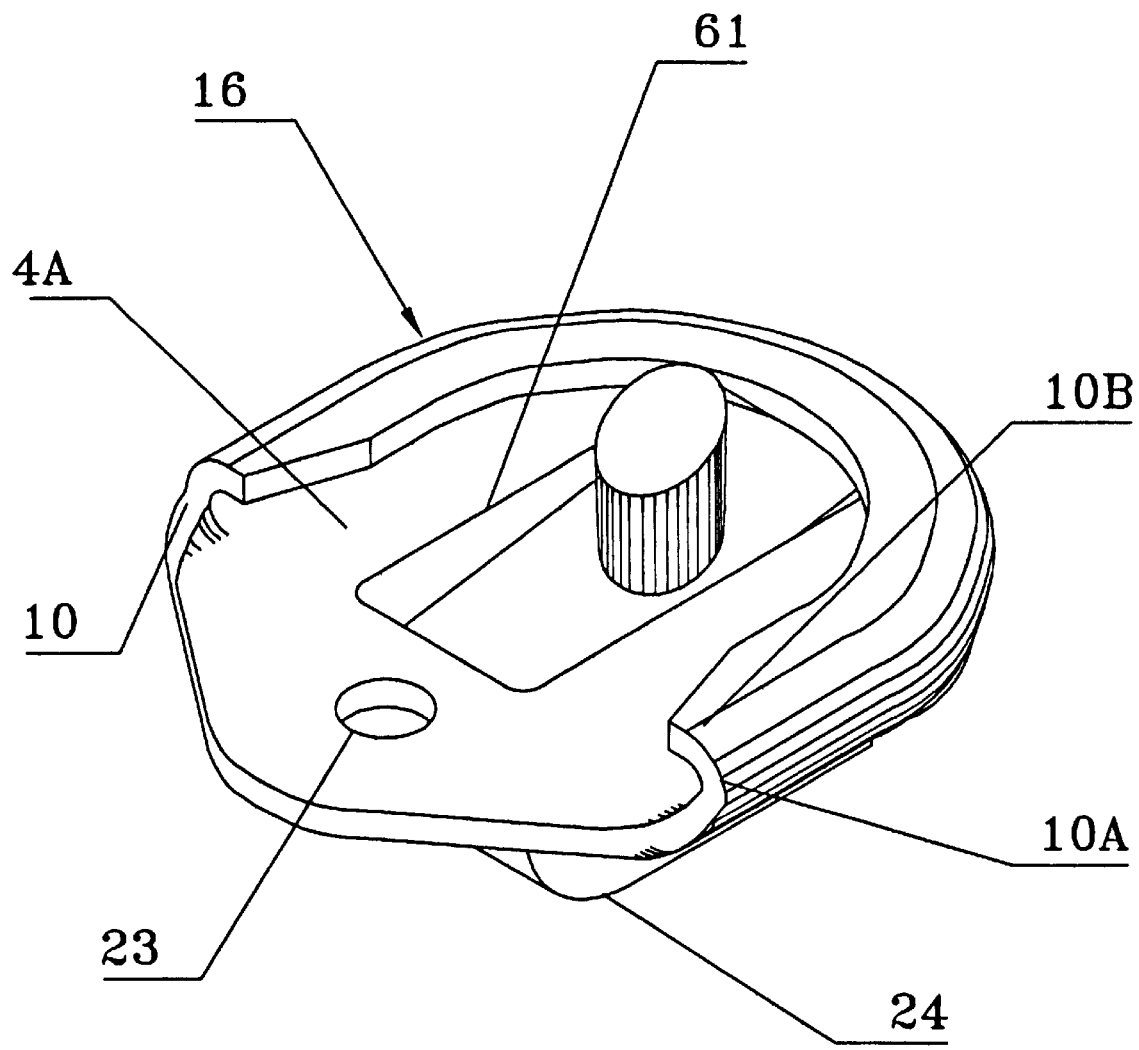
FIG. 15 is an isometric view of the third embodiment of the locking device of the present invention with the lock in a locked position.
Figure 16:
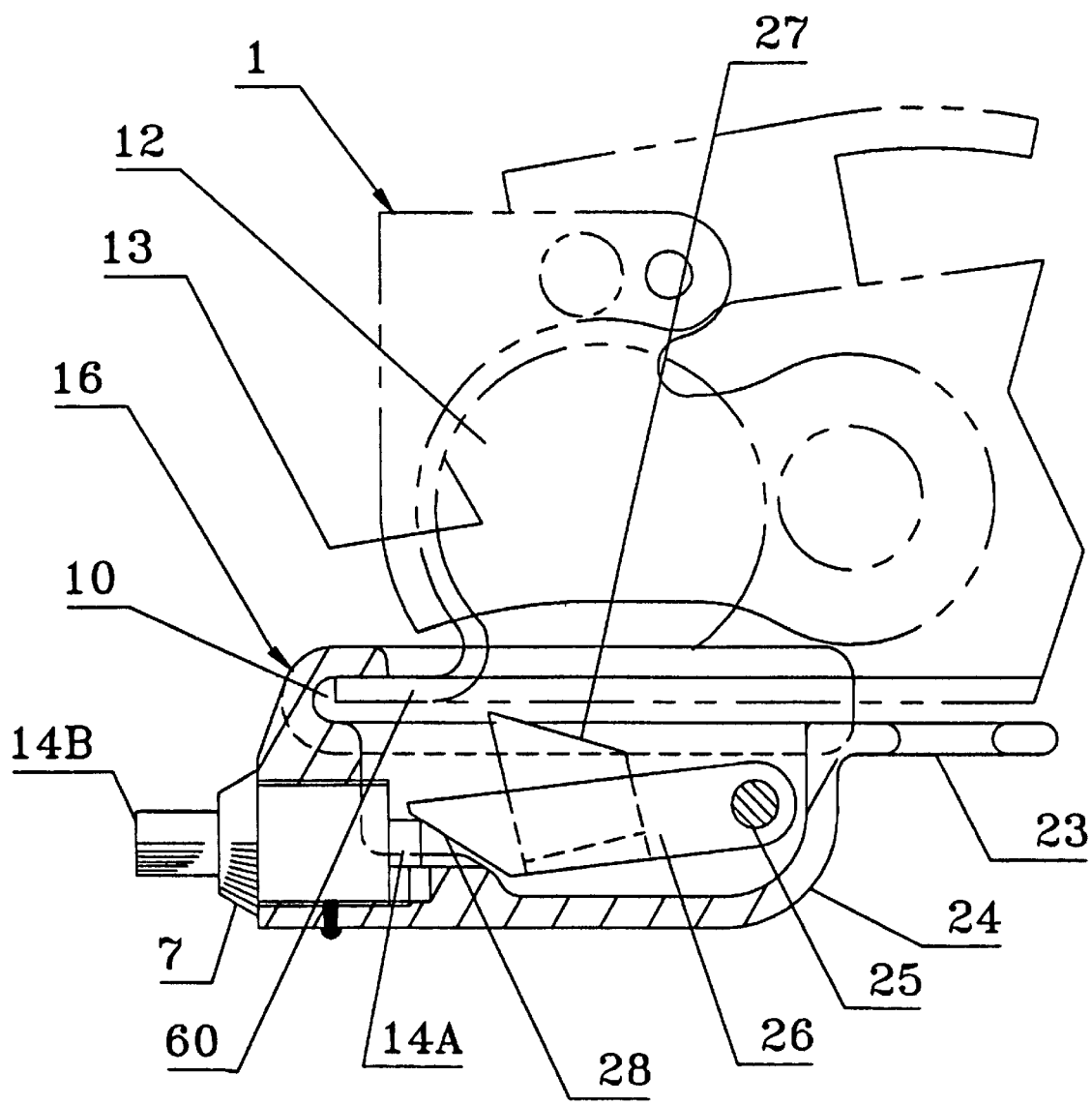
FIG. 16 is a partial side view, partial cross-sectional view of the third embodiment of the locking device shown positioned on a coupler in an unlocked position.
Figure 17:
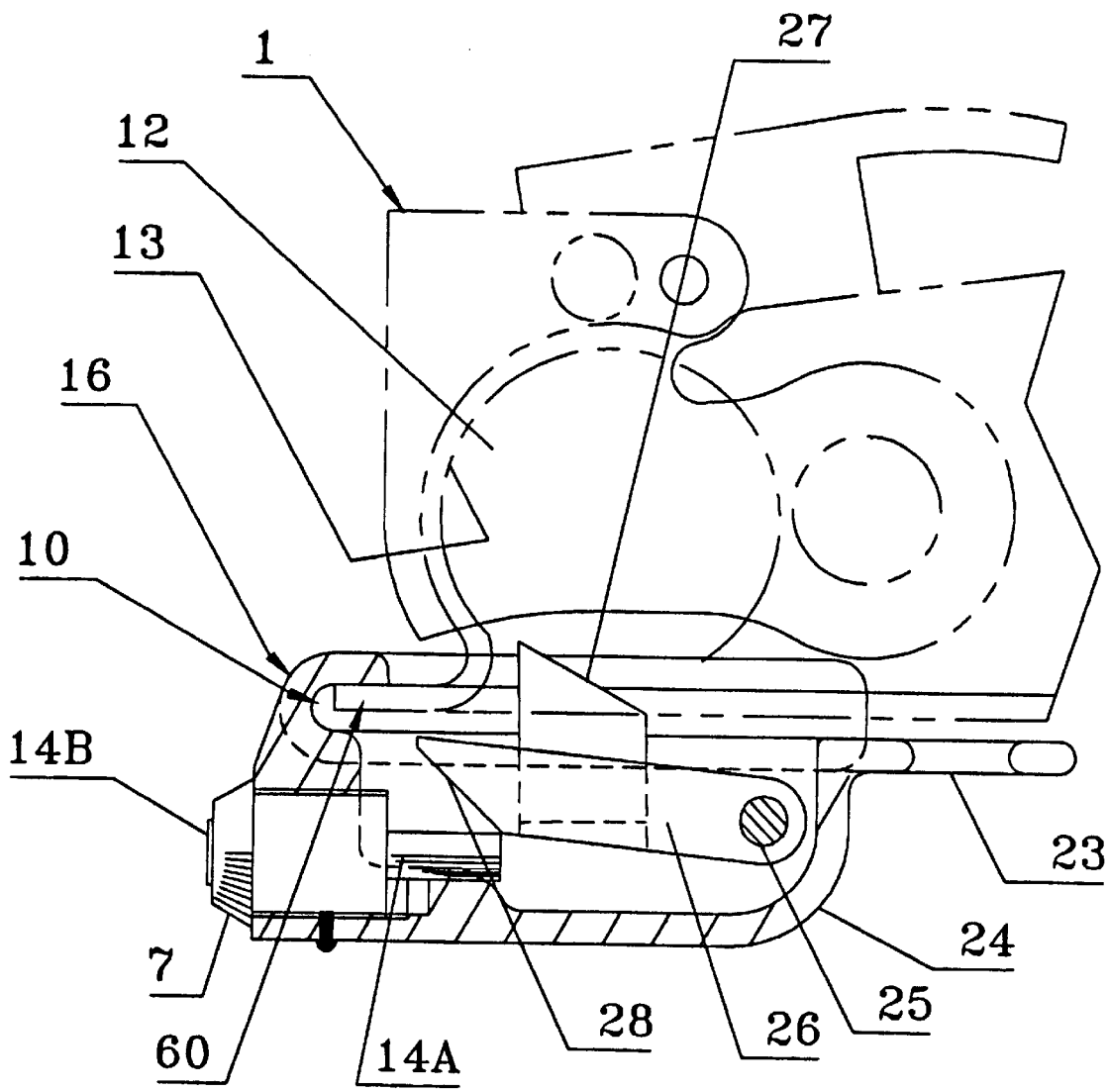
FIG. 17 is the same view as FIG. 16, but showing the locking device in a locked position.

FIGS. 15, 16 and 17, depict the third embodiment of the present invention. In this third embodiment, locking device 16 has a body made to fit a coupler of the type shown in FIG. 1. Referring to FIG. 15, locking device 16 has a planar body member 4A, with a bottom side, a top side and a U-shaped groove 10 formed about the periphery of the top side. U-shaped groove 10 is comprised of an upturned side member 10A formed about a part of the periphery of planar member 4A, with the side member having an inwardly extending lip 10B. Planar body member 4A has an opening 61, positioned to be aligned with ball hitch receptacle 12 when device 16 is placed on to coupler 1. Referring to FIGS. 15 and 16, a housing 24 extends downward from the bottom side of the planar member 4A to enclose opening 61 and to house elongated member 26, pivot pin 25 and boss 27.

Locking device 16 is positioned or placed onto the coupler 1 by aligning outwardly extending flange 57 of coupler 1 with U-shaped groove 10 of locking device 16 and sliding device 16 onto coupler 1 so that the coupler's flange 60 is held in the U-shaped groove 10. Device 16 has a size and shape such that a sliding and secure fit, with close tolerances, is obtained with coupler 1. Opening 61 in planar member 4A should be next to hitch ball opening or receptacle 12 when device 16 is properly positioned on coupler 1. In this position the coupler's hitch ball receptacle 12 is covered by locking device 16 and can not receive a hitch ball.

Next is a discussion of the locking mechanism for holding locking device 16 in place on coupler 1 to prevent the trailer from being stolen. A coupler engaging means is housed within housing 24 of the body. Referring to FIGS. 16 and 17, the coupler engaging means in this embodiment includes an elongated member 26. pivotally connected at one of its two ends to the interior of housing 24 by pivot pin 25. Elongated member 26 has a free end which swings in an arc around the axis of pivot pin 25. This free end of elongated member 26 has an angled face 28. There is a boss 27 formed on the top of elongated member 26. Elongated member 26 and boss 27 are positioned so that the boss 27 is aligned for movement through opening 61 in planar member 4A and into hitch ball receptacle 12. Boss 27 is sized to allow it to be easily inserted into hitch ball receptacle 12. It should also have a shape and strength sufficient to withstand bending or breakage if engaged against the interior surface 13 of hitch ball receptacle 12. Lock 7 is housed in the body for interaction with angled face 28. A typical angle for face 28 would be about forty degrees. Other angles may be used so long as elongated member 26 will move toward hitch ball receptacle 12 when lock plunger 14B is pushed against face 28. When lock plunger 14B is depressed to move lock 7 from the unlocked position to the locked position, it causes lock pin 14A extending from lock 7 to move into housing 24 and push against angled face 28. As lock pin 14A is pushed against angled face 28, the angled face 28 slides against lock pin 14A, causing the free end of elongated member 26 to swing toward hitch ball receptacle 12 and move the boss 27 into hitch ball receptacle 12.

FIG. 16 shows the third embodiment of the invention positioned on coupler 1 with lock 7 in an unlocked position. Lock 7 is locked by depressing lock plunger 14B. Preferably, lock 7, as shown, is a punch type cylinder lock. However, any number of locks known in the art may also be used.

FIG. 17 shows the third embodiment of the invention attached to coupler 1 with lock 7 in a locked position.

As can be seen in FIG. 17, when lock 7 is in a locked position, lock pin 14A is fully extended, elongated member 26 has been pushed by lock pin 14A toward hitch ball receptacle 12, boss 27 is inside the hitch ball receptacle 12 and elongated member 26 is held in position by lock pin 14A. The free end of elongated member 26 cannot swing away from the hitch ball receptacle 12 until the lock pin 14A is retracted. When in this locked position hitch ball receptacle 12 is covered by locking device 16 and locking device 16 can not be removed from coupler 1, because the boss 27 is inside hitch ball receptacle 12. Any attempt to remove the device will cause boss 27 to bear against a portion of interior surface 13 of hitch ball receptacle 12, thereby obstructing the removal of locking device 16 and preventing a hitch ball from being inserted into hitch ball receptacle 12. Boss 27 should be of sufficient size, shape and strength to withstand bending or breakage as a result of forced contact with the interior surface 13 of the hitch ball receptacle 12.

To remove the locking device 16, lock 7 must be unlocked using a key, not shown. Unlocking lock 7 causes lock pin 14A to retract away from pivot pin 25, thereby allowing the force of gravity to rotate the free end of the elongated member 26 away from hitch ball receptacle 12. A spring, not shown, can be positioned to enhance the motion of elongated member 26 away from hitch ball receptacle 12. As elongated member 26 pivots away from hitch ball receptacle 12, the boss 27 is moved by gravity out of hitch ball receptacle 12, allowing the removal of the locking device.

Fourth Embodiment

Figure 18:
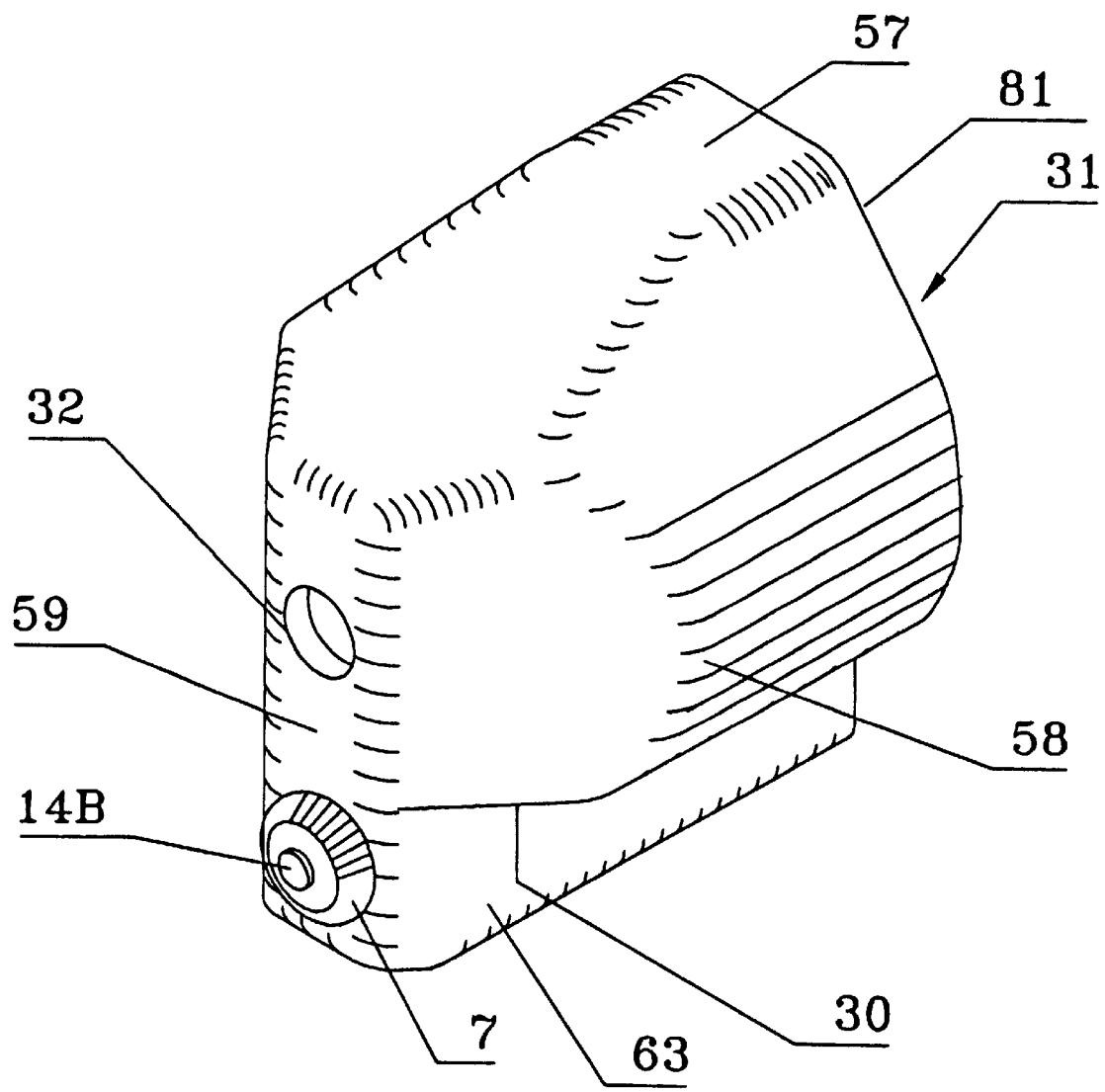
FIG. 18 is an isometric view of the fourth embodiment of the locking device shown with the in a locked position.
Figure 19:
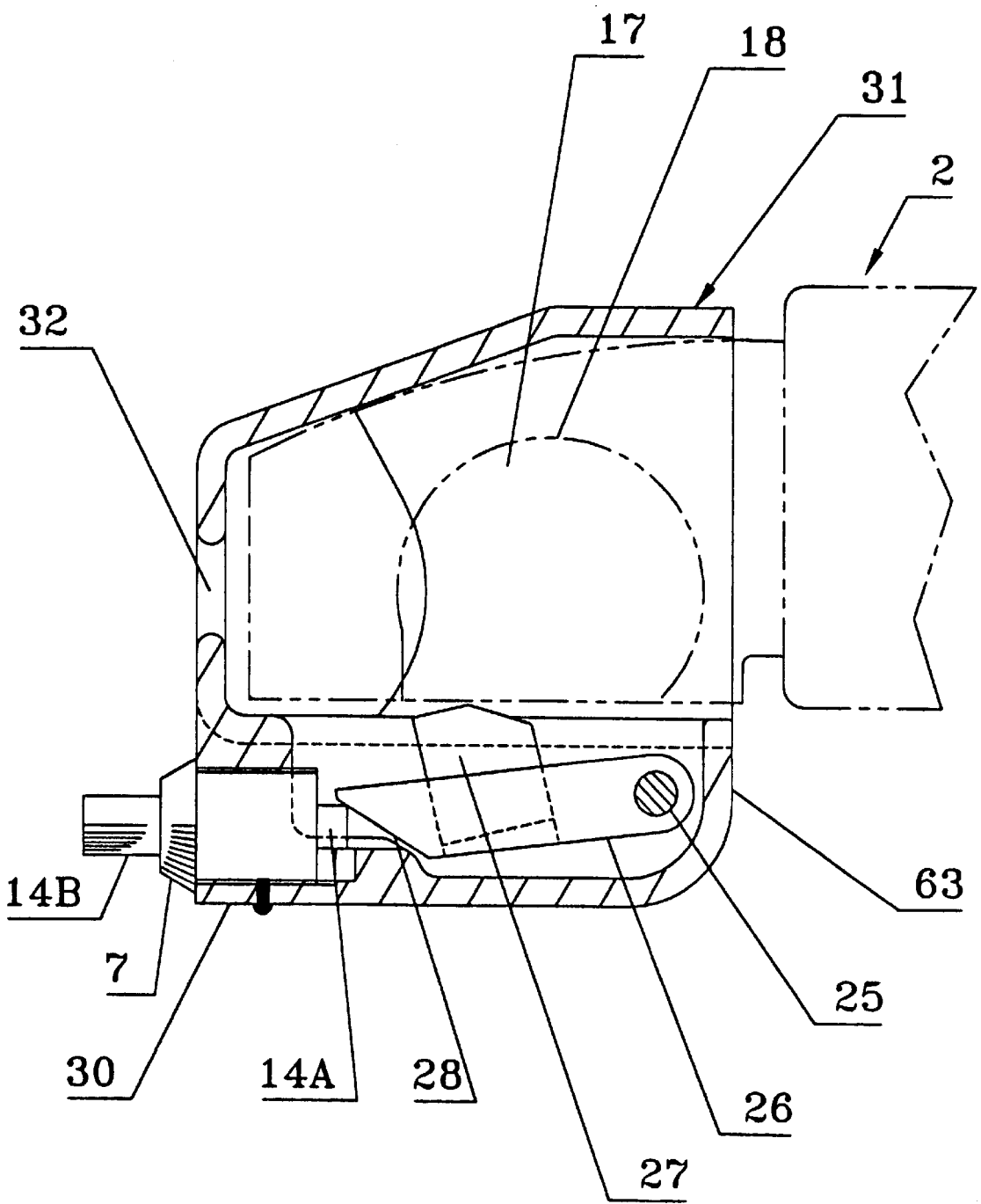
FIG. 19 is a partial side view, partial cross-sectional view of the fourth embodiment of the locking device shown positioned on a coupler in an unlocked position.
Figure 20:
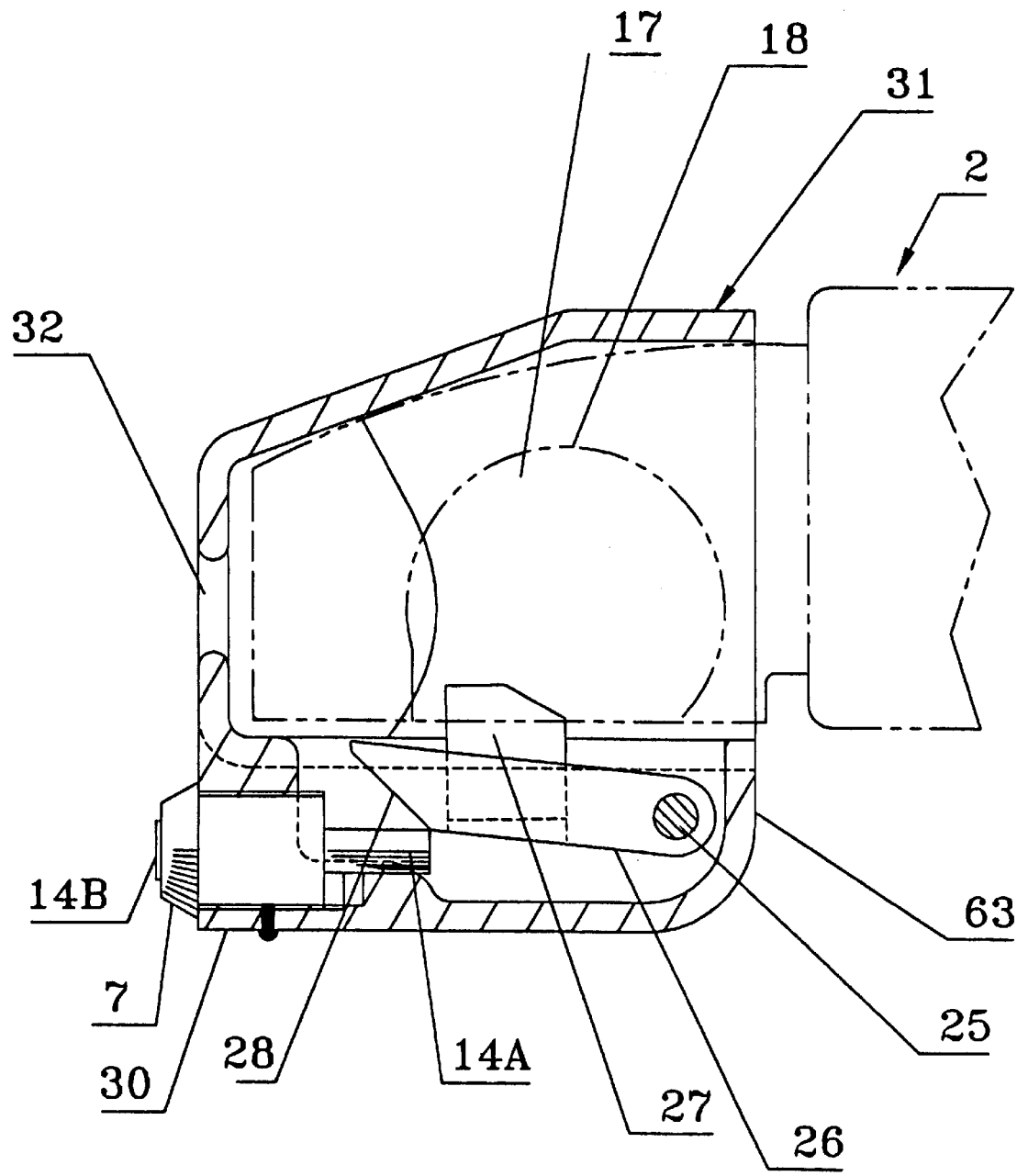
FIG. 20 is the same view as FIG. 19, but showing the locking device in a locked position.

FIGS. 18, 19 and 20 depict the fourth embodiment of the present invention. This embodiment is similar to the third embodiment except that the body of the locking device is designed to fit couplers of the type shown in FIG. 8 which are usually, but not necessarily, manufactured from cast or forged components.

FIG. 18, is isometric view from the front of locking device 31 with lock 7 in a locked position. The body of device 31 has a ceiling 57. There are two side walls 58 and an end wall 59 extending downward from ceiling 57. The two side walls 58 each have an in-turned lip 30. The ceiling 57, side walls 58, end wall 59 and in-turned lips 30 define an open ended cavity 81 into which the coupler 2 is received. Extending downward from in-turned lips 30, is a housing 63 with an interior defined by two housing side walls closed at each end by a housing end wall and closed at the bottom by a housing bottom wall. The interior of housing 63 opens into open ended cavity 81 so that when locking device 31 is fitted on to coupler 2, the interior of housing 63 opens into hitch ball receptacle 17 of coupler 2.

Locking device 31 is positioned on coupler 2 by aligning the open end of the device's open ended cavity 81 with the end of coupler 2 and sliding device 31 over coupler 2 so that the outer surface of coupler 2 is held within the open ended cavity 81 of locking device 31. In this position the coupler's hitch ball receptacle 17 is covered by the locking device 31 and can not receive a hitch ball. The device 31 has a size and shape such that a sliding and secure fit, with close tolerances, is obtained with the coupler 2.

Next is a discussion of the locking mechanism for holding locking device 31 in place on coupler 2 to prevent the trailer from being stolen. A coupler engaging means is housed within housing 63. Referring to FIGS. 19 and 20, the coupler engaging means in this embodiment includes elongated member 26 which is pivotally connected at one of its two ends to housing 63 by pivot pin 25. Elongated member 26 has a free end which swings in an arc around the axis of the pivot pin 25. This free end of elongated member 26 has an angled face 28. There is a boss 27 formed on the upper surface of elongated member 26. The elongated member 26 and boss 27 are positioned so that boss 27 is aligned for movement into hitch ball receptacle 17. Boss 27 is sized to allow it to be easily inserted into hitch ball receptacle 17. Any attempt to remove the device from the coupler will cause boss 27 to bear against the interior surface 18 of hitch ball receptacle 17. Therefore, boss 27 must be of sufficient shape and strength to withstand bending or breakage from such forced engagement. The lock 7 is mounted on the body of device 31 for lock pin 14A to interact with angled face 28. Lock pin 14A extending from lock 7 should move into housing 63 toward angled face 28 when the lock 7 is moved from the unlocked position to the locked position by depressing lock plunger 14B.

When lock pin 7 is pushed against angled face 28, the free end of elongated member 26 swings toward hitch ball receptacle 17 and the boss 27 moves into hitch ball receptacle 17. Elements 14A, 25, 26, 27 and 28 of FIGS. 19 and 20 function the same as and are essentially the same as those same numbered elements shown in FIGS. 16 and 17.

FIG. 19 shows the fourth embodiment of the invention placed on coupler 2 with lock 7 in an unlocked position. Lock 7 can be locked by depressing lock punch 14B. Preferably, lock 7 is a punch type cylinder type lock. However, any number of locks known in the art may also be used.

FIG. 20 shows the fourth embodiment of the invention, attached to coupler 2 with the lock 7 in a locked position. In this locked position the coupler's hitch ball receptacle or opening 17 is covered by locking device 31. Locking device 31 can not be removed from coupler 2 except through the use of a key to unlock lock 7.

When lock 7 is in a locked position lock pin 14A is fully extended, elongated member 26 has been pushed by lock pin toward the hitch ball receptacle 17, boss 27 is inside hitch ball receptacle 17 and elongated member 26 is held in position by lock pin 14A. The free end of elongated member 26 can not swing away from hitch ball receptacle 17 until the lock pin 14A is retracted. When in this locked position hitch ball receptacle 17 is covered by locking device 31 and locking device 31 can not be removed from coupler 2, because boss 27 is inside hitch ball receptacle 17. Any attempt to remove device 31 from coupler 2 will cause boss 27 to bear against a portion of interior surface 18 of hitch ball receptacle 17, thereby obstructing the removal of the locking device 31 and preventing a hitch ball from being inserted into hitch ball receptacle 17. Boss 27 should be of sufficient size, shape and strength to withstand bending or breakage as a result of forced contact with the interior surface 18 of hitch ball receptacle 17.

To remove locking device 31, lock 7 must be unlocked such as by using a key, not shown. Unlocking lock 7 releases lock plunger 14B and causes lock pin 14A to retract away from pivot pin 25, thereby allowing the force of gravity to rotate the free end of elongated member 26 away from hitch ball receptacle 17. A spring, not shown, can be positioned to enhance the motion of elongated member 26 away from hitch ball receptacle 17. As elongated member 26 pivots away from hitch ball receptacle 17, boss 27 moves out of hitch ball receptacle 17, allowing locking device 31 to be removed by sliding it off the coupler 2.

Fifth Embodiment

Figure 21:
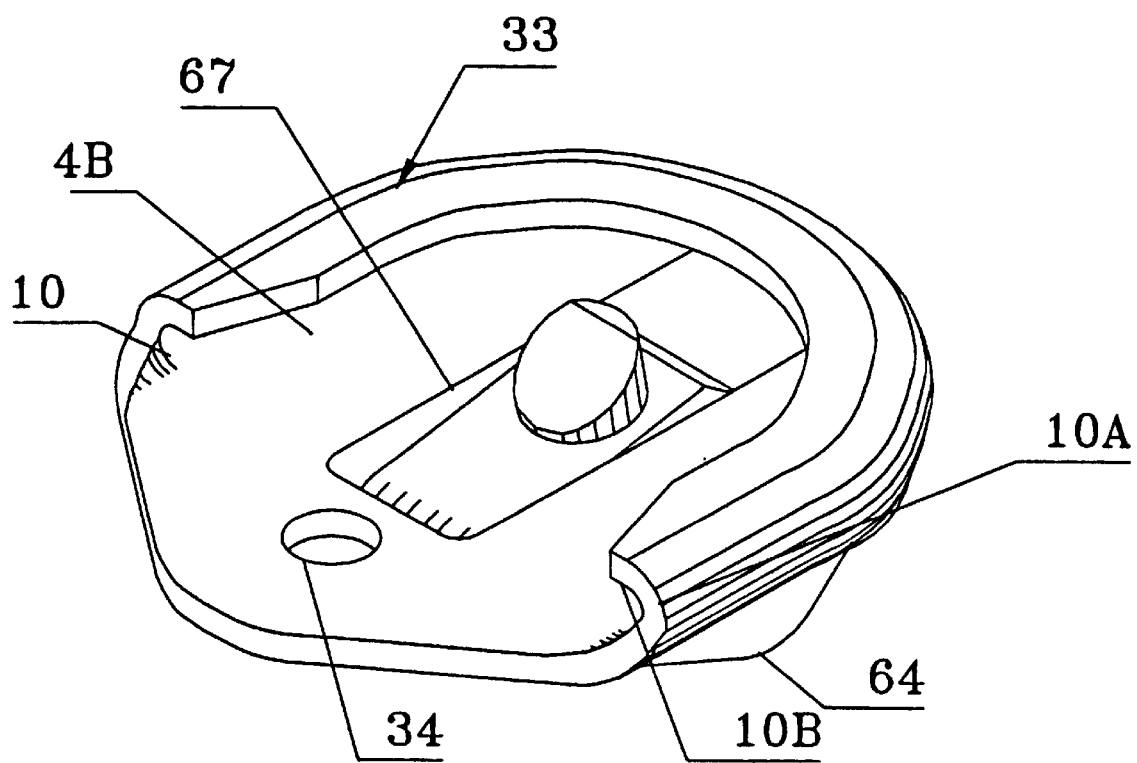
FIG. 21 is an isometric view of the fifth embodiment of the locking device shown with the lock in a locked position.
Figure 22:
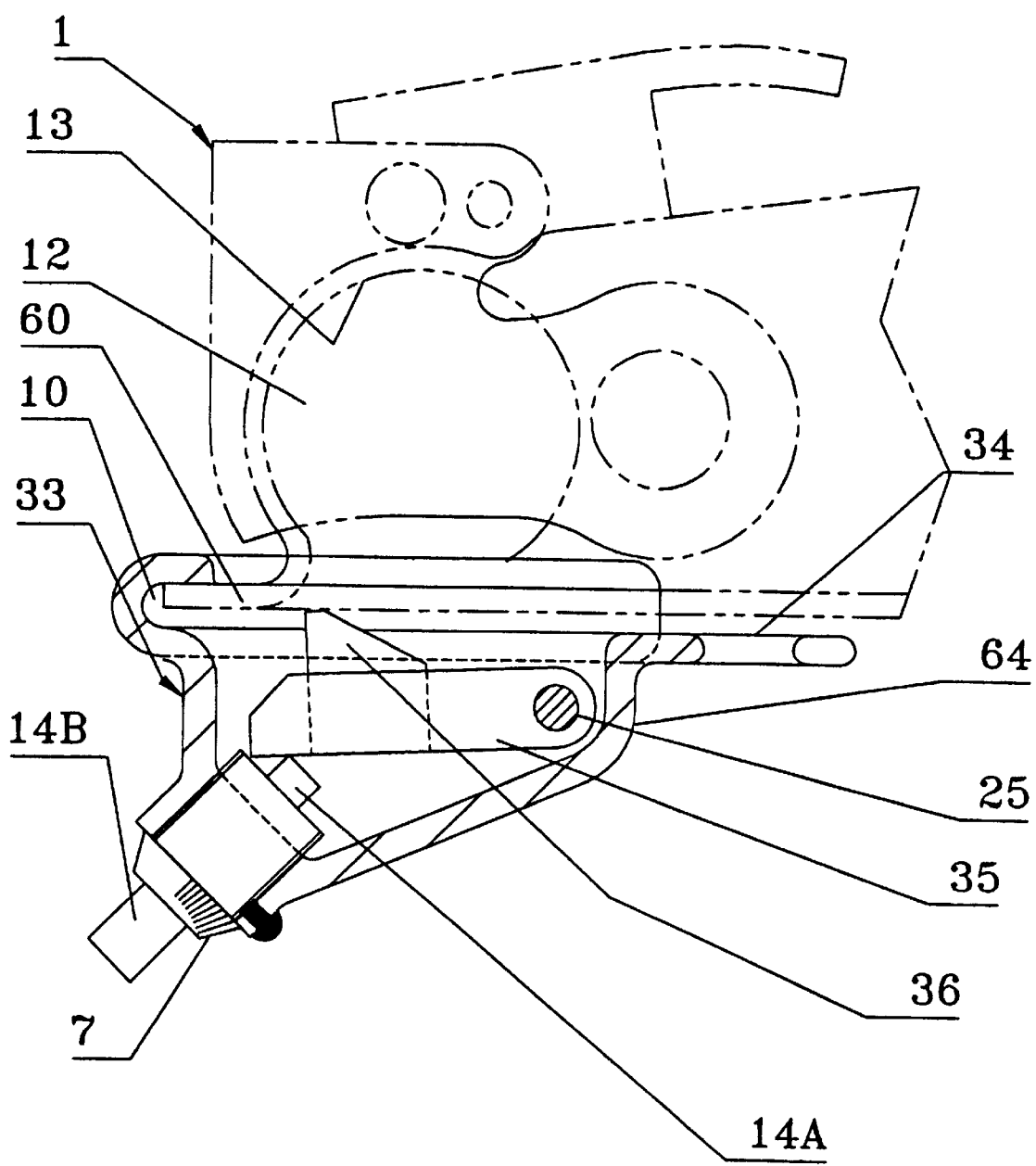
FIG. 22 is a partial side view, partial cross-sectional view of the fifth embodiment of the locking device shown positioned on a coupler in an unlocked position.
Figure 23:
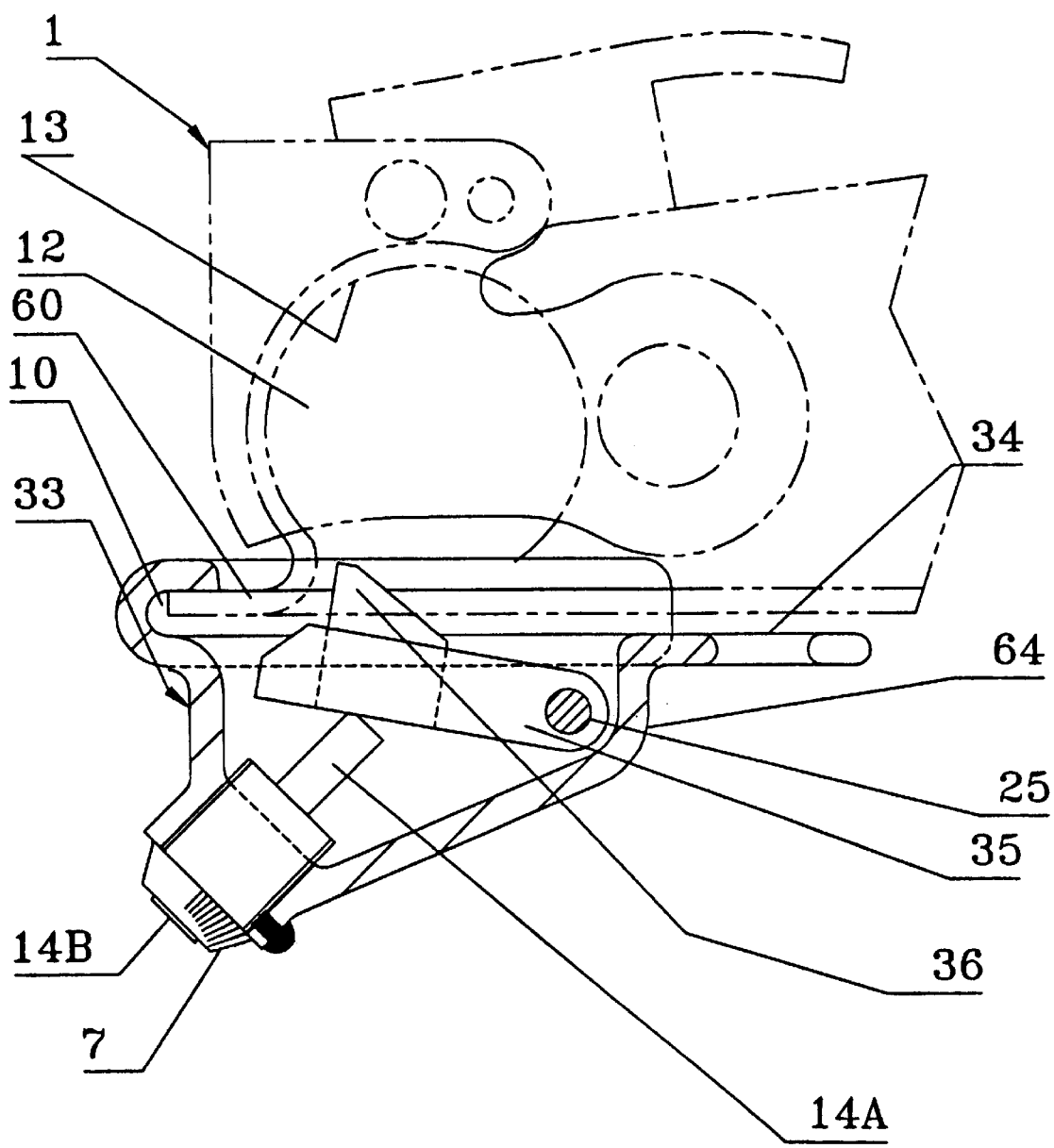
FIG. 23 is the same view as FIG. 22, but showing the locking device in a locked position.

FIGS. 21, 22 and 23 depict the fifth embodiment of the present invention. The device of this embodiment has a body made to fit a coupler of the type shown in FIG. 1. Referring to FIG. 21, locking device 33 has a planar body member 4B with a bottom side and a top side. A U-shaped groove 10 is formed about a part of the periphery of the top side of the planar body member 4B. The U-shaped groove 10 is comprised of an upturned side member 10A formed about a part of the periphery of the planar body member 4B with the side member 10A having an inwardly extending lip 10B. Planar body member 4B has an opening 67 positioned to be aligned with hitch ball receptacle 12 when device 33 is placed on coupler 1. Referring to FIGS. 21 and 22, a housing 64 extends downward from the bottom side of planar member 4B to enclose opening 67 and to house elongated member 35, pivot pin 25 and boss 36.

Locking device 33 is positioned or placed on coupler 1 by aligning the outwardly extending flange 60 of coupler 1 with U-shaped groove 10 of locking device 33 and sliding locking device 33 onto coupler 1 so that the coupler's flange 60 is held in U-shaped groove 10. Opening 67 in planar body member 4B should be next to the hitch ball opening or receptacle 12 when device 33 is properly positioned on coupler 1. Device 33 has a size and shape such that a sliding and secure fit, with close tolerances, is obtained with coupler 1. In this position the coupler's hitch ball receptacle 12 is covered by locking device 33 and when so covered cannot receive a hitch ball.

Next is a discussion of the locking mechanism for holding locking device 33 in place to prevent the trailer from being stolen. Referring to FIGS. 21, 22 and 23, a coupler engaging means is housed within housing 64. The coupler engaging means includes an elongated member 35 pivotally connected at one of its ends to housing 64 by pivot pin 25. Elongated member 35 has a free end which pivots in an arc about the axis of pivot pin 25. A boss 36 formed on the top of elongated member 35, and preferably integral therewith, aligned for movement into hitch ball receptacle 12. The boss 36 is sized to allow it to be easily inserted into hitch ball receptacle 12. Any attempt to remove the device 33 from coupler 1 will cause boss 36 to bear against the interior surface 13 of hitch ball receptacle 12. Therefore, boss 36 must be of sufficient shape and strength to withstand bending or breakage from such forced engagement. Lock 7 is housed in the body opposite the bottom surface of elongated member 35 so that lock pin 14A extending from lock 7 will project into the interior of housing 64 to engage the bottom surface of elongated member 35. When the lock 7 is moved from the unlocked position to the locked position, lock pin 14A should push elongated member 35 toward hitch ball receptacle 12 and move boss 36 into hitch ball receptacle 12.

FIG. 22 shows the fifth embodiment of the invention positioned on coupler 1 with lock 7 in an unlocked position. Lock 7 may be locked by depressing lock punch 14B. Preferably, lock 7 is a punch type cylinder lock. However, any number of locks known in the art may also be used.

FIG. 23 shows the fifth embodiment of the invention in which locking device 33 is attached to coupler 1 with lock 7 in a locked position.

As can be seen in FIG. 23, when lock 7 is in a locked position lock pin 14A is fully extended, elongated member 35 has been pushed by lock pin 14A toward hitch ball receptacle 12, boss 36 is inside of hitch ball receptacle 12, elongated member 35 is held in position by the lock pin 14A and can not swing away from hitch ball receptacle 12 until lock pin 14A is retracted. When in this locked position hitch ball receptacle 12 should be covered by locking device 33. Device 33 and boss 36 should be inside hitch ball receptacle 12. Any attempt to remove locking device 33 will cause boss 36 to bear against a part of interior surface 13 of hitch ball receptacle 12, thereby obstructing removal of locking device 33 and preventing anything from being inserted into hitch ball receptacle 12 for towing the trailer. Boss 36 should be of sufficient size, shape and strength to withstand bending or breakage as a result of forced contact with the interior surface 13 of hitch ball receptacle 12.

To remove device 33 from coupler 1, lock 7 must be unlocked using a key, not shown. Unlocking lock 7 causes lock pin 14A to retract away from the bottom surface of elongated member 35, thereby allowing the force of gravity to swing the free end of elongated member 35 away from hitch ball receptacle 12 and dislodge boss 36 from hitch ball receptacle 12. A spring, not shown, can be positioned to enhance the motion of elongated member 35 away from hitch ball receptacle 12.

Sixth Embodiment

Figure 24:
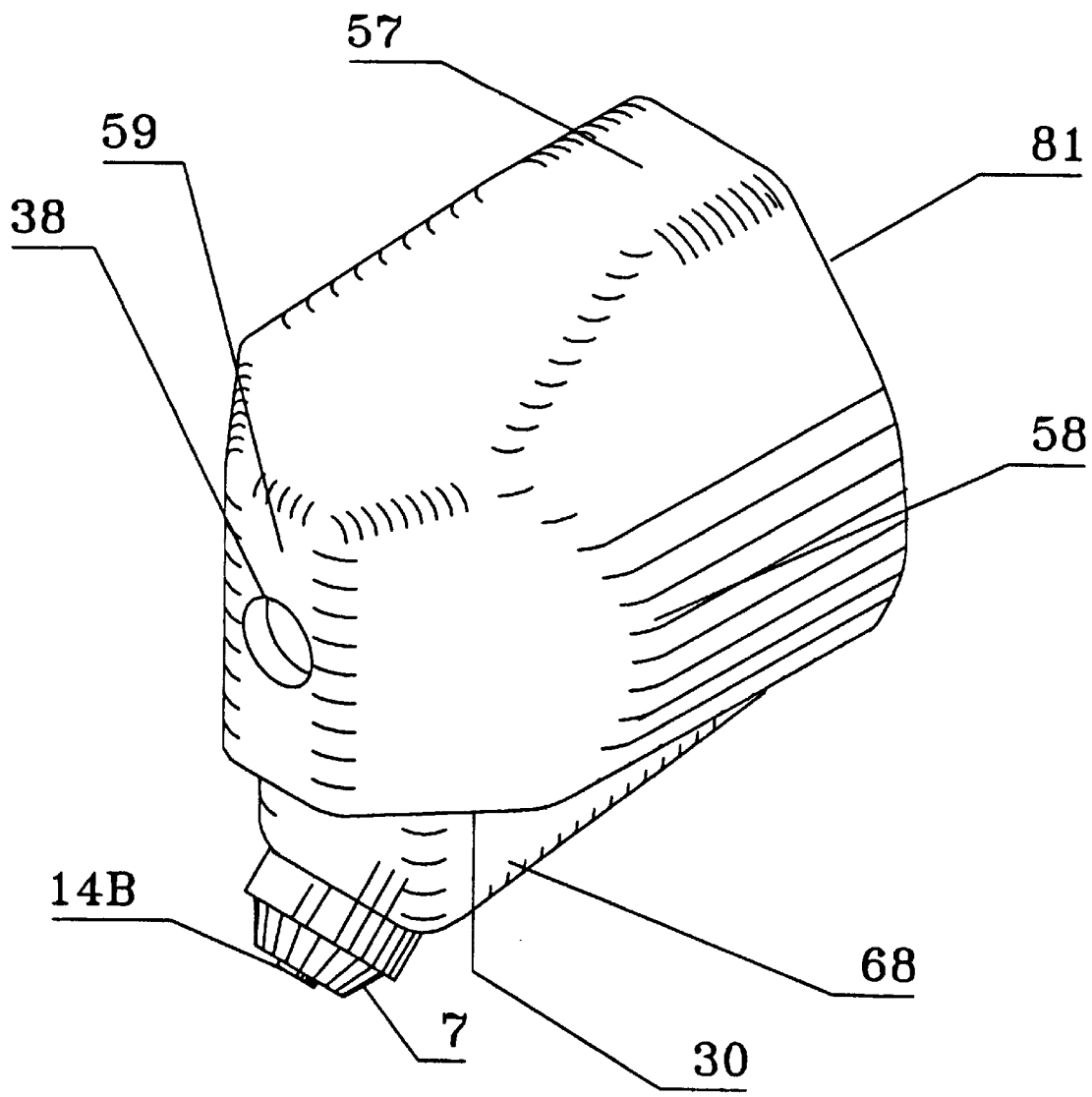
FIG. 24 is an isometric view of the sixth embodiment of the locking device shown with the lock in a locked position.
Figure 25:
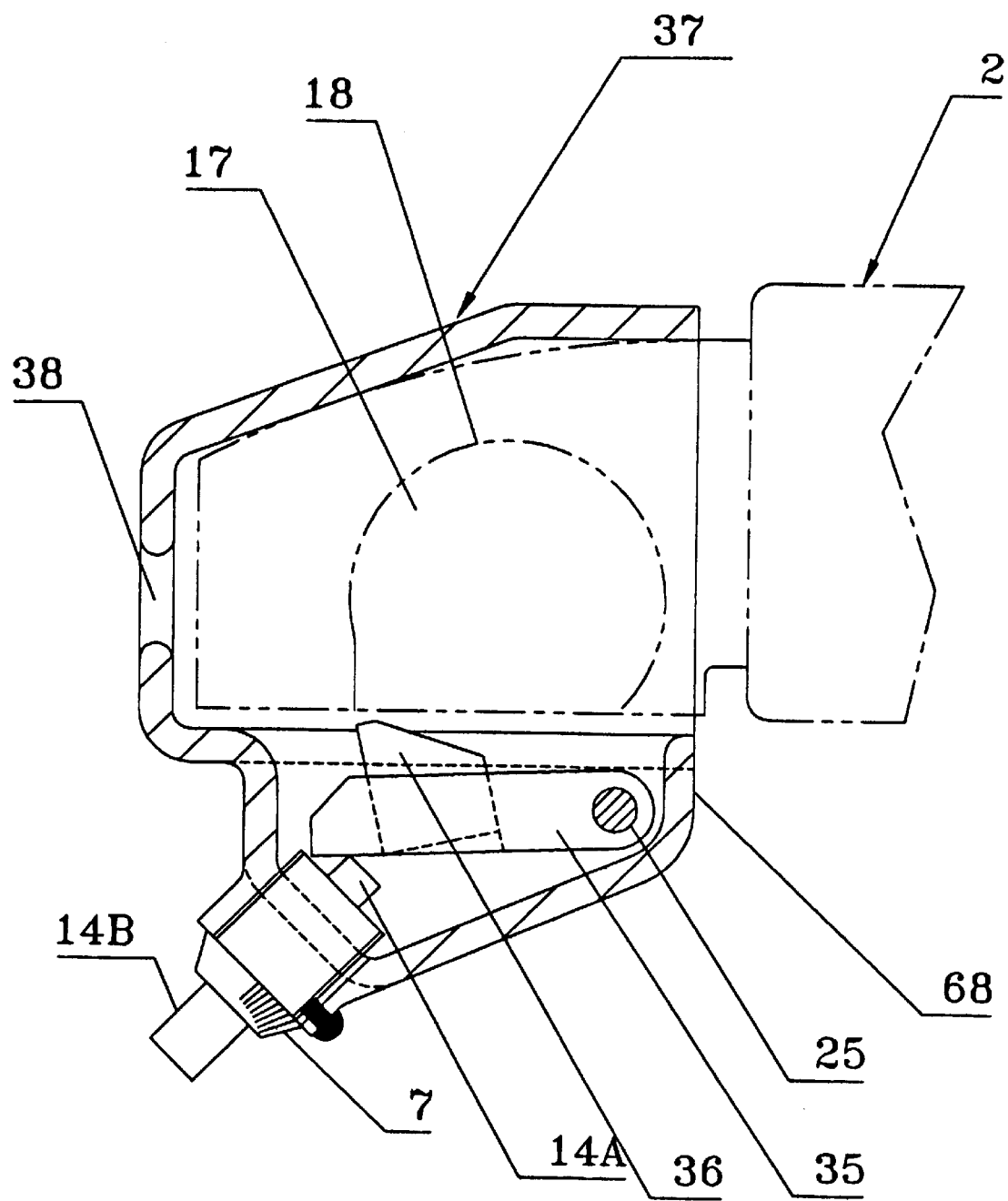
FIG. 25 is a partial side view, partial cross-sectional view of the sixth embodiment of the locking device shown positioned on a coupler in an unlocked position.
Figure 26:
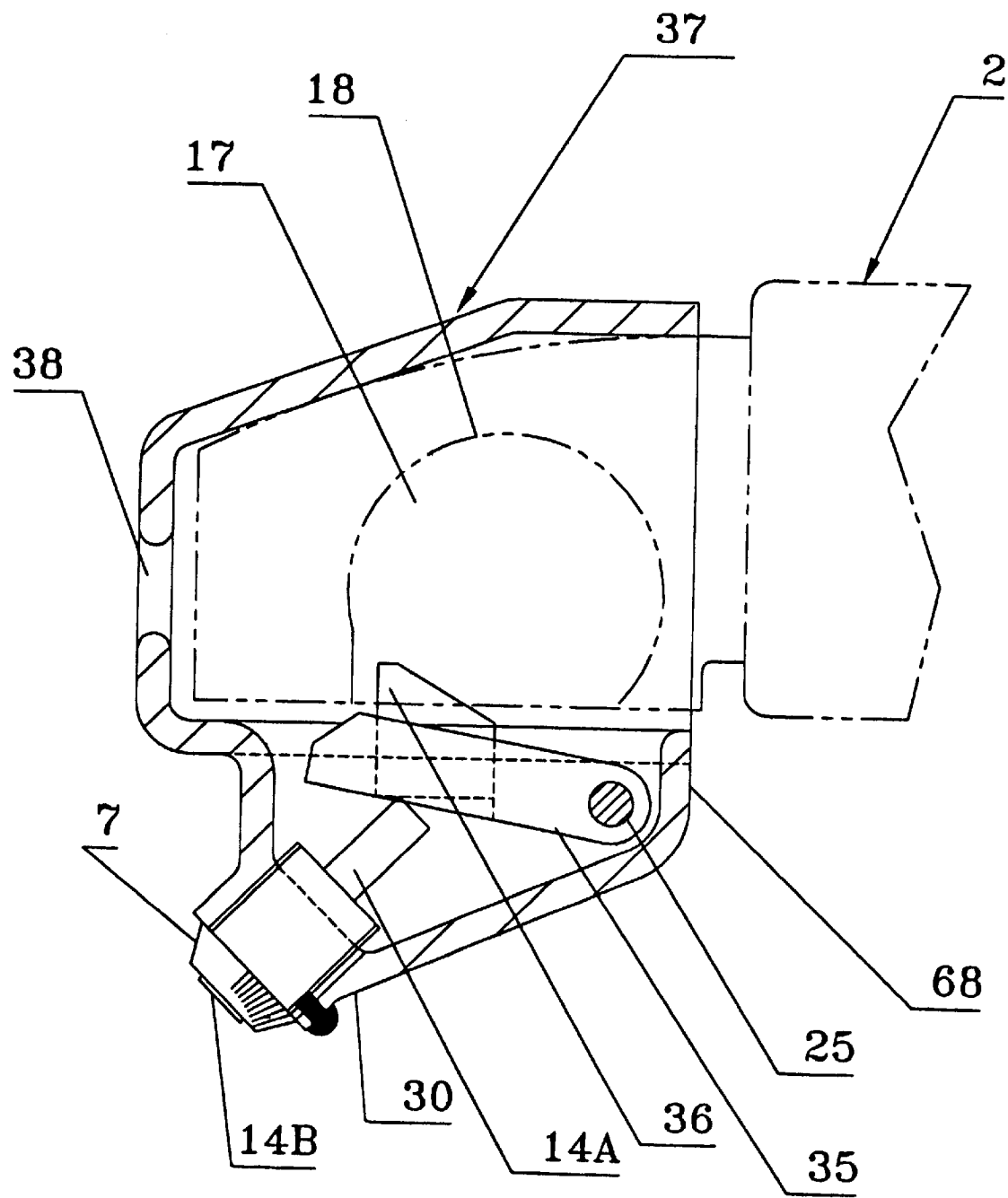
FIG. 26 is the same view as FIG. 25, but showing the locking device in a locked position.

FIGS. 24, 25 and 26 depict the sixth embodiment of the present invention. This embodiment is similar to the fifth embodiment except that the body of the device is designed to fit couplers of the type shown in FIG. 8, which are usually manufactured from cast or forged components. An isometric view from the front of the body of the locking device of this sixth embodiment is shown in FIG. 24. The body of device 37 includes a ceiling 57. There are two side walls 58 and an end wall 59 extending downward from ceiling 57. The two side walls 58 each have and in-turned lip 30. The ceiling 57, side walls 58, end wall 59 and in-turned lips 30 define an open ended cavity into which the coupler 2 is received. Extending downward from in-turned lips 30, is a housing 68 comprised of two housing side walls closed at each end by a housing end wall and closed at the bottom by a housing bottom wall. The interior of housing 68 opens into the open ended cavity 81 so that when locking device 37 is fitted on to coupler 2, the interior of housing 68 opens into hitch ball receptacle 17 of coupler 2.

The locking device 37 is fitted on to coupler 2 by aligning the open end of the cavity 81 with the end of coupler 2 and sliding device 37 over coupler 2 so that the outer surface of coupler 2 is held within the interior of the cavity 81 of locking device 37. The locking device 37 has a size and shape such that a sliding and secure fit, with close tolerances is obtained with coupler 2. In this position the coupler's hitch ball receptacle 17 is covered by the locking device 37 and can not receive a hitch ball.

The sixth embodiment of the locking device has a coupler engaging means which is an elongated member 35 pivotally connected at one of its ends to the body within housing 68 by pivot pin 25. Elongated member 35 has a free end which swings in an arc about the axis of pivot pin 25. There is a boss 36 formed on the top of elongated member 35 aligned for movement into hitch ball receptacle 17. The boss 36 is sized to allow it to be easily inserted into hitch ball receptacle 17. Any attempt to remove device 37 from coupler 2 will cause boss 36 to bear against the interior surface 18 of hitch ball receptacle 17. Therefore, boss 36 must be of sufficient shape and strength to withstand bending or breakage from such engagement. Lock 7 is housed in the body opposite the bottom surface of elongated member 35 so that the lock pin 14A extending from lock 7 is projected into housing 68 toward the bottom surface of elongated member 35 when lock 7 is moved from the unlocked position to the locked position, thereby pushing elongated member 35 toward hitch ball receptacle 17 and moving boss 36 into hitch ball receptacle 17. Elements 14A, 25, 35 and 36 of FIGS. 25 and 26 function the same as and are essentially the same as those same numbered elements shown in FIGS. 22 and 23.

FIG. 25 shows the sixth embodiment of the invention positioned on coupler 2 with lock 7 in an unlocked position. Lock 7 is switched from an unlocked position to a locked position by depressing lock plunger 14B. Preferably, lock 7 is a punch type cylinder lock. However, any number of locks known in the art may also be used.

FIG. 26 shows the sixth embodiment of the invention, attached to coupler 2 with lock 7 in a locked position.

As can be seen in FIG. 26, when lock 7 is in a locked position, lock pin 14A is fully extended, elongated member 35 has been pushed by lock pin 14A toward hitch ball receptacle 17, boss 36 is inside of hitch ball receptacle 17, elongated member 35 is held in position by the lock pin 14A and can not swing away from hitch ball receptacle 17 until lock pin 14A is retracted. When in this locked position hitch ball receptacle 17 should be covered by locking device 37 and boss 36 should be inside hitch ball receptacle 17. Any attempt to remove locking device 37 will cause boss 36 to bear against a part of interior surface 18 of hitch ball receptacle 17, thereby obstructing removal of locking device 37 and preventing anything from being inserted into hitch ball receptacle 17 for towing the trailer. Boss 36 should be of sufficient size, shape and strength to withstand bending or breakage as a result of forced contact with the interior surface 18 of hitch ball receptacle 17.

To remove the device 37 from the coupler 2, the lock 7 must be unlocked using a key, not shown. Unlocking lock 7 causes lock pin 14A to retract away from the bottom surface of the elongated member 35, which thereby allows the force of gravity to swing the free end of elongated member 35 away from hitch ball receptacle 17 and dislodge boss 36 from hitch ball receptacle 17. A spring, not shown, can be positioned to enhance the motion of elongated member 35 away from hitch ball receptacle 17.

Seventh Embodiment

Figure 27:
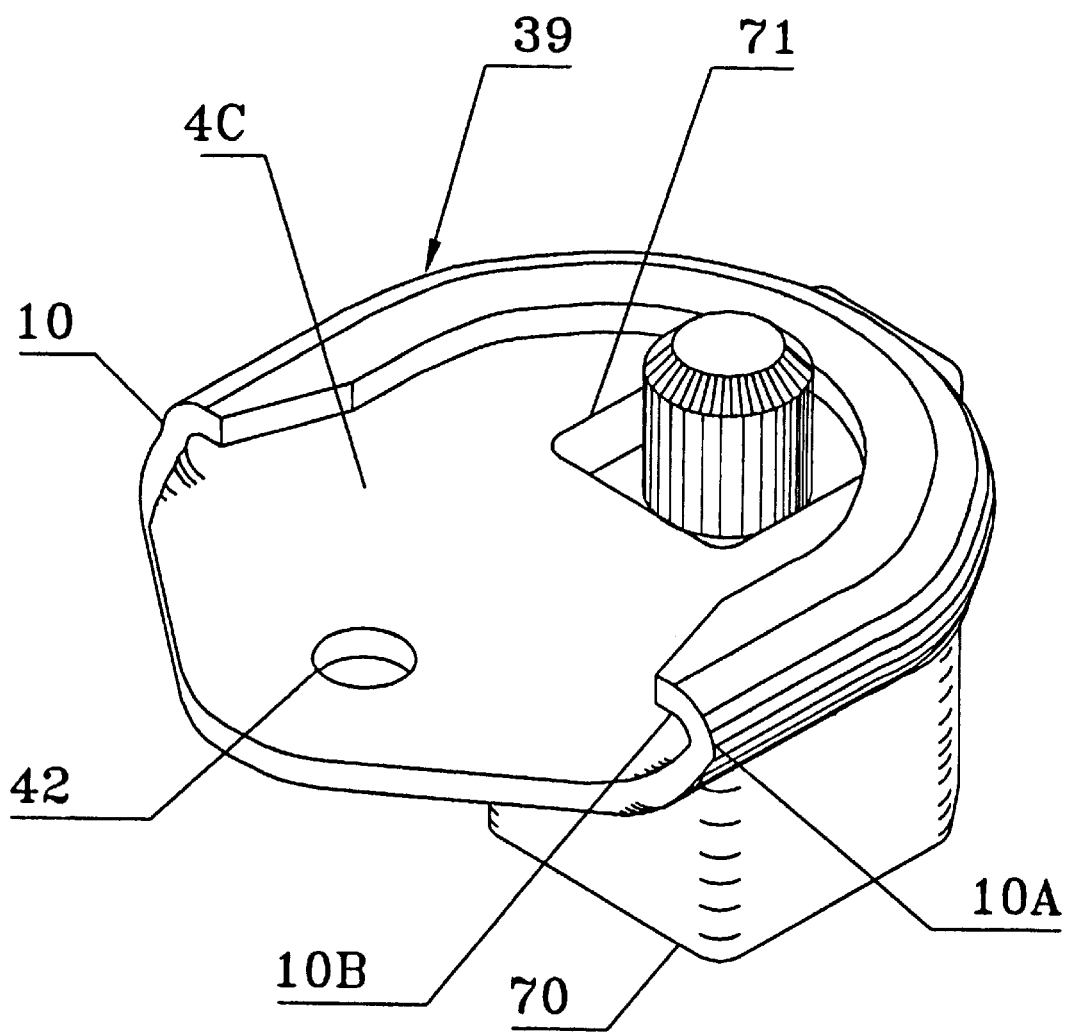
FIG. 27 is an isometric view of the seventh embodiment of the locking device shown with the lock in a locked position.
Figure 28:
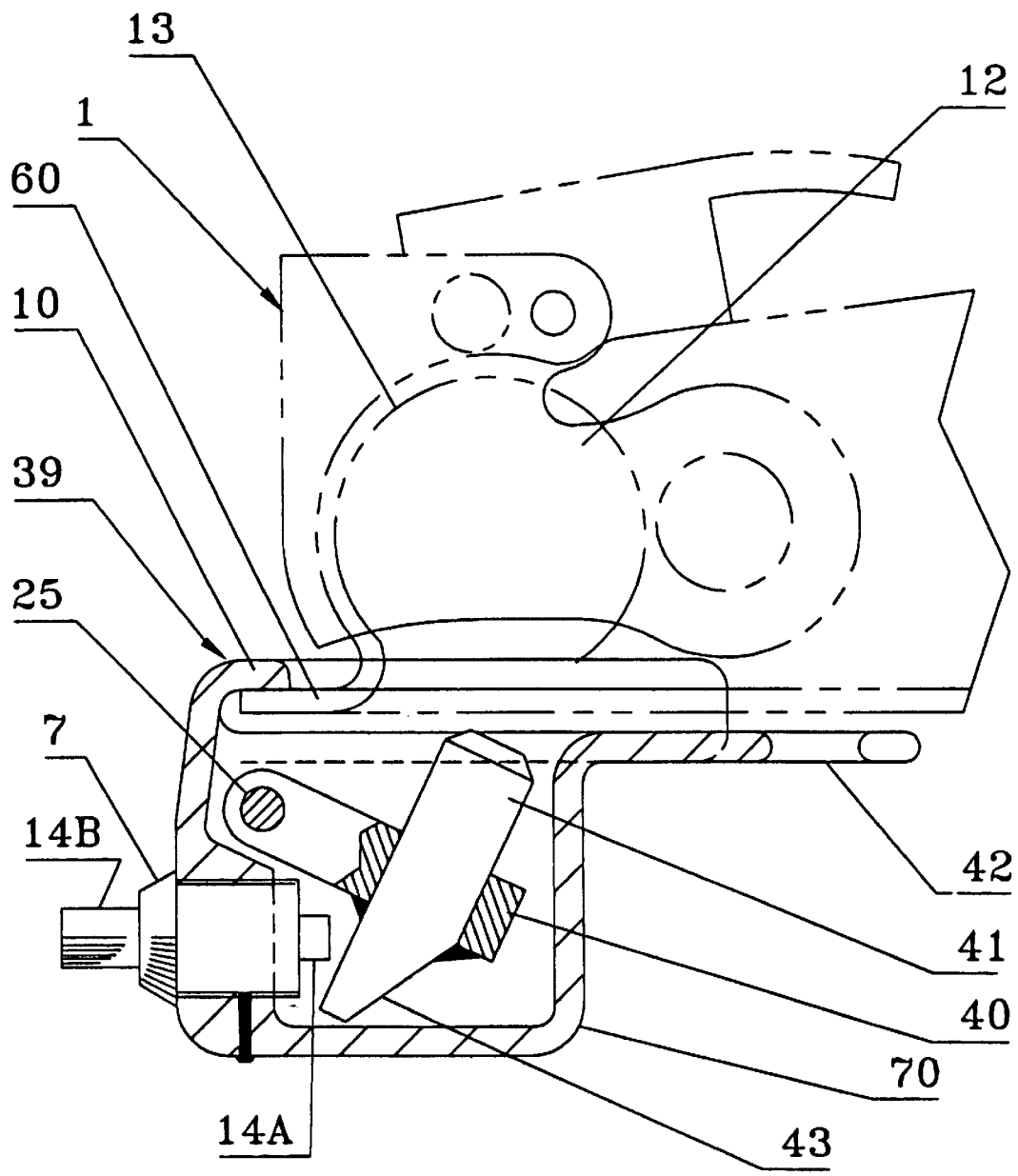
FIG. 28 is a partial side view, partial cross-sectional view of the seventh embodiment of the locking device positioned on a coupler in an unlocked position.
Figure 29:
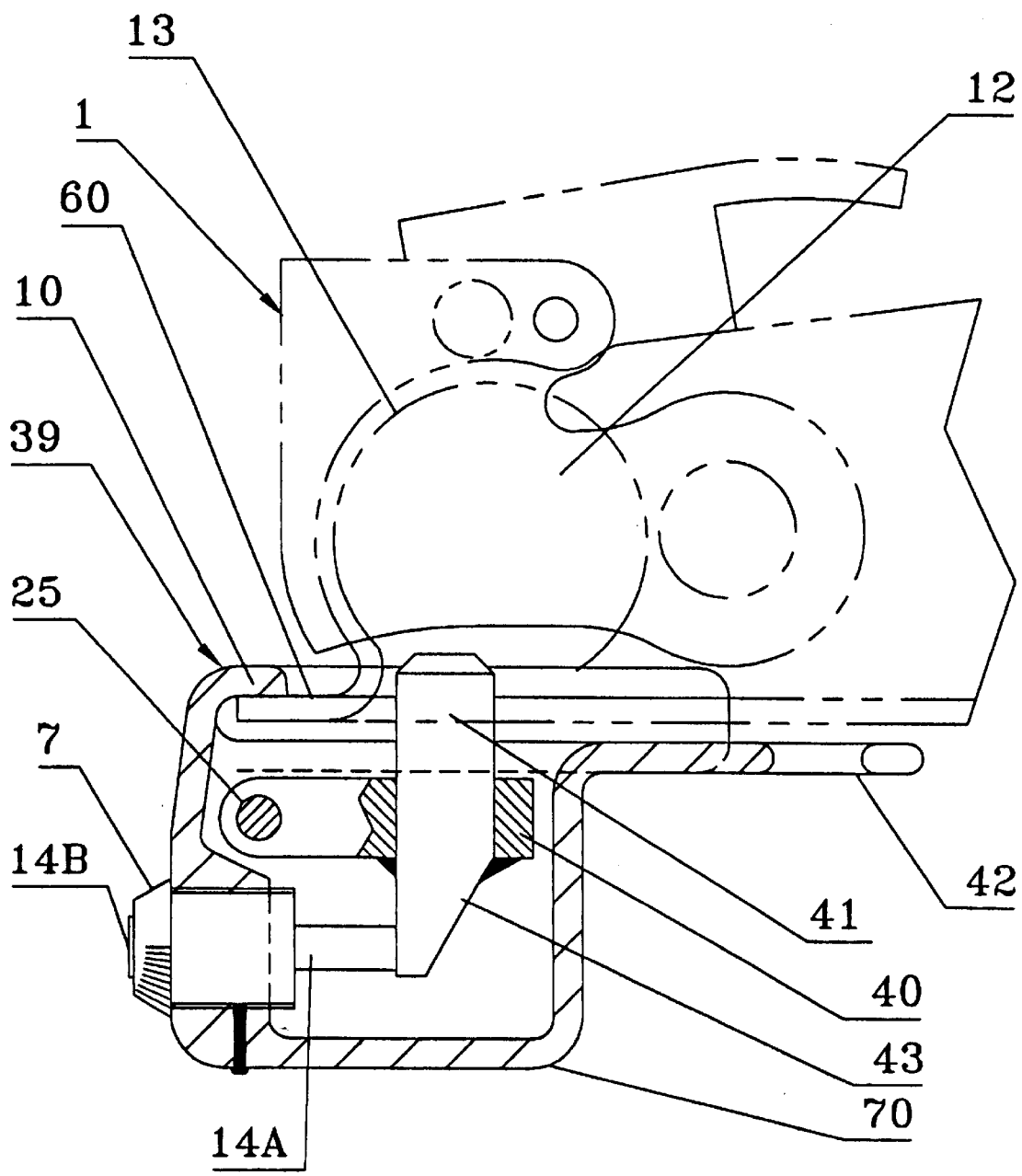
FIG. 29 is the same view as FIG. 28, but showing the locking device in a locked position.

FIGS. 27, 28 and 29 depict the seventh embodiment of the present invention. The seventh embodiment has a body made to fit a coupler of the type shown in FIG. 1. Referring to FIG. 27, it can be seen that locking device 39 has a planar body member 4C, with a bottom side and a top side, said top side having a U-shaped groove 10 formed about the periphery of the top side. The U-shaped groove 10 is comprised of an upturned side member 10A formed about a part of the periphery of the planar member 4C with the side member having an inwardly extending lip 10B. The planar body member 4C has an opening 71 with a housing 70 extending downward from the bottom side to enclose opening 71 and to house elongated member 40, boss 41, leg 43 and pivot pin 25. Opening 71 is positioned to be aligned with hitch ball receptacle 12 when device 39 is placed on coupler 1.

The locking device 39 is positioned or placed onto coupler 1 by aligning the outwardly extending flange 60 of coupler 1 with U-shaped groove 10 of locking device 39 and sliding device 39 onto coupler I so that the coupler's flange 60 is held in the U-shaped groove 10. Opening 71 in planar body member 4C should be next to the hitch ball receptacle 12 when device 39 is properly positioned on coupler 1. The device has a size and shape such that a sliding and secure fit, with close tolerances, is obtained with the coupler 1. In this position the coupler's hitch ball receptacle 12 is covered by the locking device 39 and when so covered cannot receive a hitch ball.

Next is a discussion of the locking mechanism for holding locking device 39 in place to prevent the trailer from being stolen. Referring to FIGS. 28 and 29, a coupler engaging means is housed within housing 70. Pivot pin 25 is supported from the housing 70. One of the ends of elongated member 40 is attached to pivot pin 25. The other end of elongated member 40 swings in an arc about the axis of pivot pin 25. There is a boss 41 formed on the top of elongated member 40 aligned for movement into hitch ball receptacle 12. The boss 41 is sized to allow it to be easily inserted into hitch ball receptacle 12. Any attempt to remove the device from the coupler will cause boss 41 to bear against the interior surface 13 of hitch ball receptacle 12. Therefore, boss 41 must be of sufficient shape and strength to withstand bending or breakage from such engagement. There is a leg 43 extending downward from the bottom surface of elongated member 40. Boss 41 may be an integral member of elongated member 40. Boss 41, elongated member 40 and leg 43 also may be one integral part. The lock 7 is housed in the end wall of housing 70 for engagement with leg 43 so that lock pin 14A extending from lock 7 is projected toward leg 43 when lock 7 is moved from an unlocked position to a locked position, thereby pivoting the swinging end of elongated member 40 toward hitch ball receptacle 12 and moving boss 41 into hitch ball receptacle 12.

FIG. 28 shows the locking device 39 positioned on coupler 1 with lock 7 in an unlocked position. Lock 7 is switched from an unlocked position to a locked position by depressing lock plunger 14B. Preferably, lock 7 is a punch type cylinder lock. However, any number of locks known in the art may also be used.

FIG. 29 shows locking device 39 attached to coupler 1 with lock 7 in a locked position. As can be seen in FIG. 29, when lock 7 is in a locked position lock pin 14A is fully extended and bearing against leg 43 at an approximate right angle with respect to the leg 43, elongated member 40 has been moved toward hitch ball receptacle 12, boss 41 is inside of hitch ball receptacle 12, elongated member 40 is held in position by lock pin 14A bearing against leg 43 and can not swing away from hitch ball receptacle 12 until lock pin 14A is retracted. When in this position hitch ball receptacle 12 is covered by the locking device 39 and locking device 39 can not be removed from the coupler 1, because boss 41 is inside hitch ball receptacle 12 and will bear against a portion of interior surface 13 of hitch ball receptacle 12, thereby obstructing the removal of locking device 39 and preventing a hitch ball from being inserted into hitch ball receptacle 12. Boss 41 should be of sufficient size, shape and strength to withstand bending or breakage as a result of forced contact with the interior surface 13 of hitch ball receptacle 12.

To remove locking device 39 from coupler 1, lock 7 must be unlocked using a key, not shown. Unlocking lock 7 causes lock pin 14A to retract away from leg 43, thereby allowing the force of gravity to swing the free end of elongated member 40 away from hitch ball receptacle 12 and dislodge boss 41 from hitch ball receptacle 12. A spring, not shown, can be positioned to enhance the motion of elongated member 40 away from hitch ball receptacle 12.

Eighth Embodiment

Figure 30:
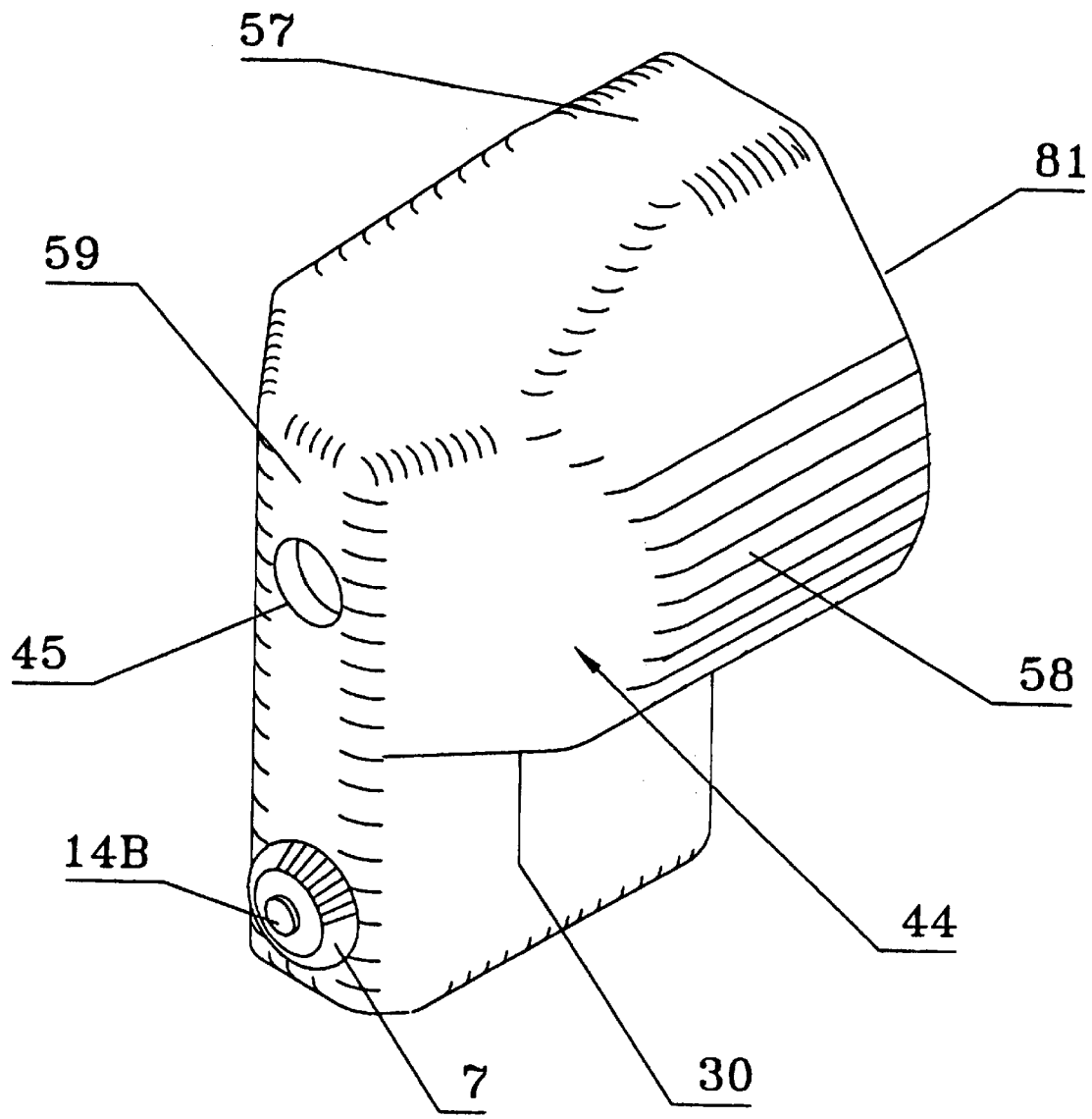
FIG. 30 is an isometric view of the eighth embodiment of the locking device with the lock in a locked position.
Figure 31:
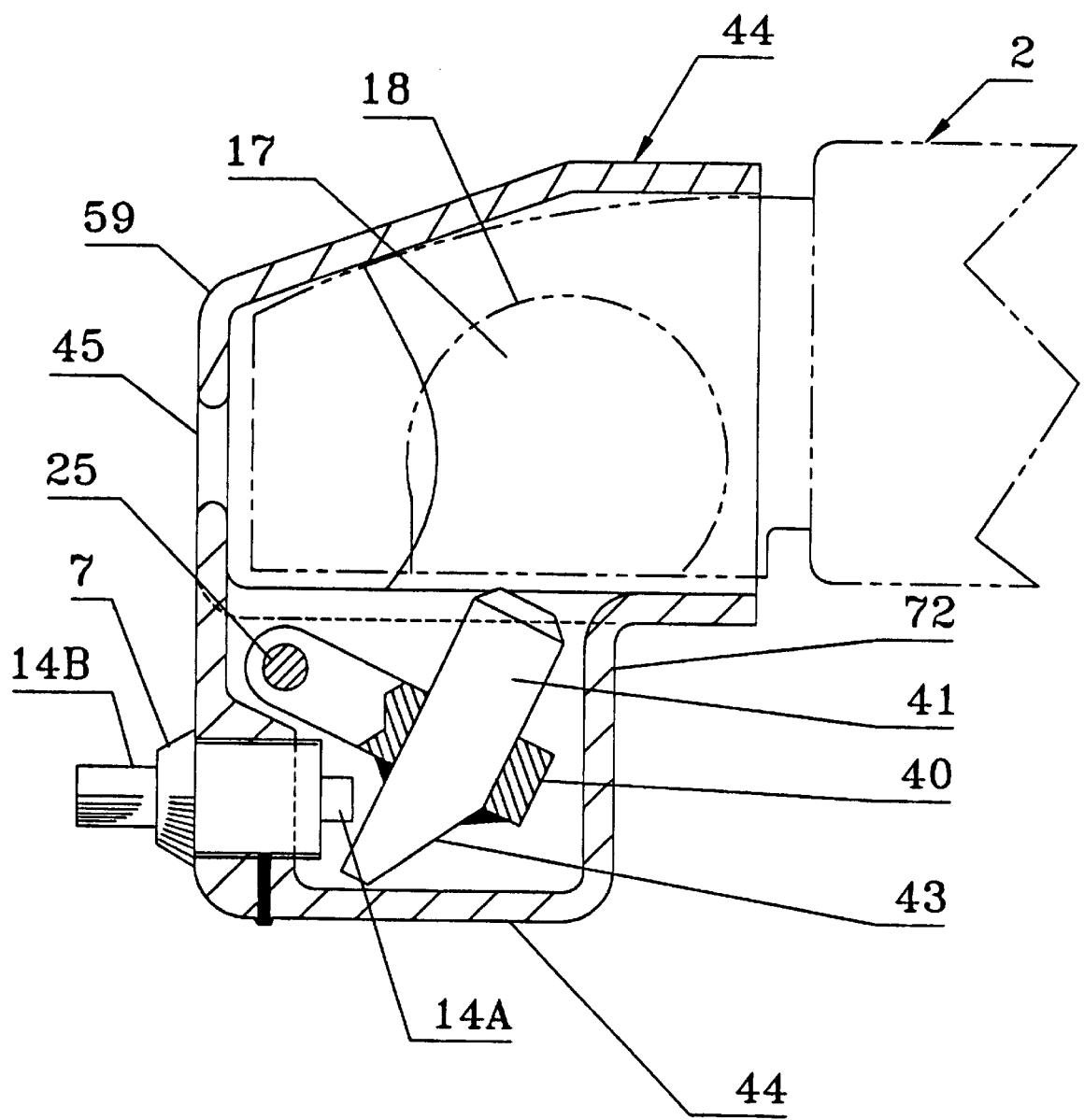
FIG. 31 is a partial side view, partial cross sectional view of the eighth embodiment of the locking device shown positioned on a coupler in an unlocked position.
Figure 32:
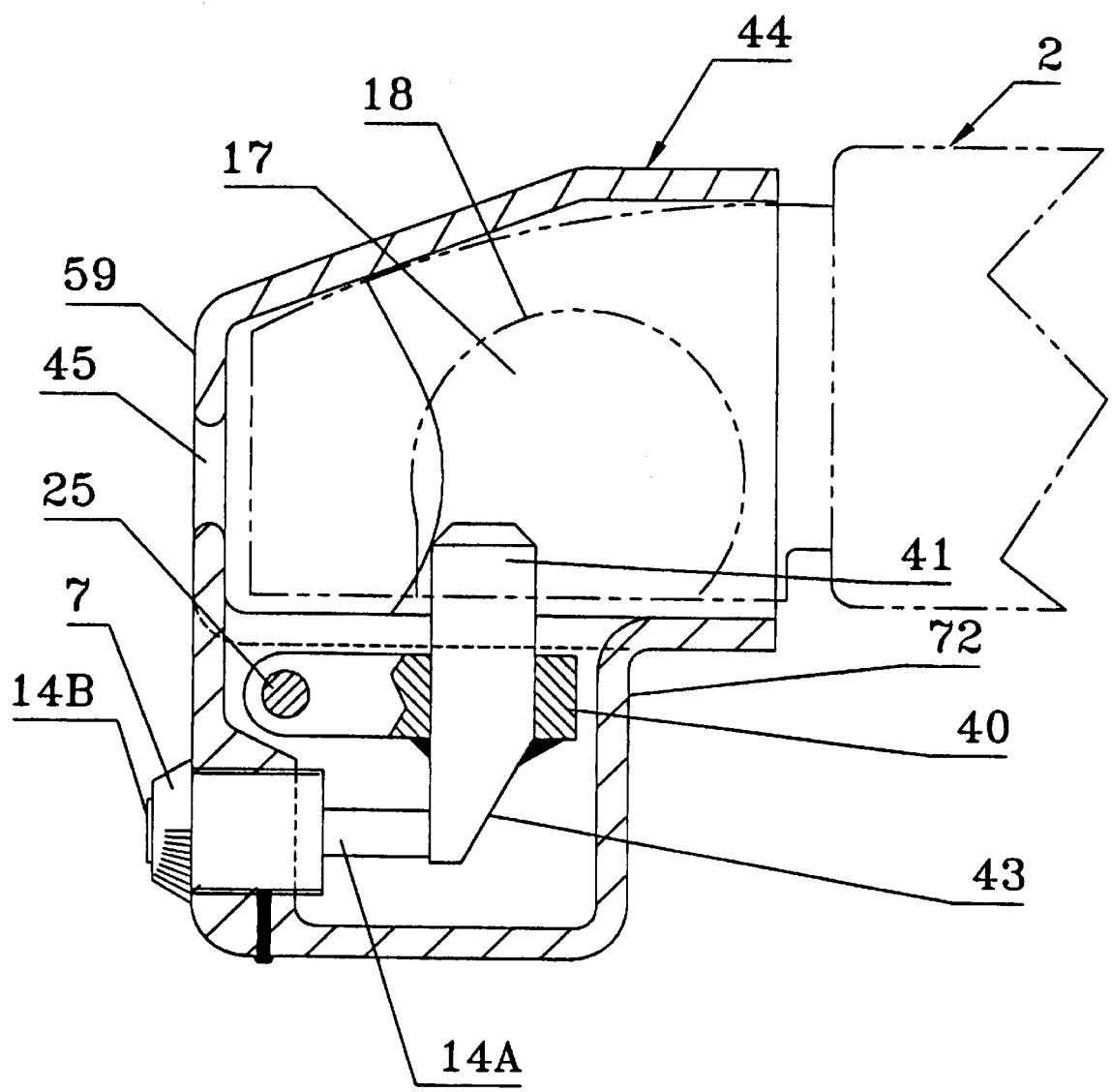
FIG. 32 is the same view as FIG. 31, but showing the locking device in a locked position.

FIGS. 30, 31 and 32 depict the eighth embodiment of the present invention. This embodiment is similar to the seventh embodiment except that the body of the device is designed to fit couplers of the type shown in FIG. 8, which are usually manufactured from cast or forged components. An isometric view from the front of the body of the locking device of this eighth embodiment is shown in FIG. 30. The body of device 44 includes a ceiling 57. There are two side walls 58 and an end wall 59 extending downward from ceiling 57. The two side walls 58 each have and in-turned lip 30. The ceiling 57, side walls 58, end wall 59 and in-turned lips 30 define an open ended cavity 81 into which the coupler 2 is received. Extending downward from in-turned lips 30, is a housing 72 comprised of two housing side walls closed at each end by a housing end wall and closed at the bottom by a housing bottom wall. The interior of housing 72 opens into the open ended cavity 81 so that when locking device 31 is positioned on coupler 2, the interior of housing 72 opens into hitch ball receptacle 17 of coupler 2.

The locking device 44 is fitted on to the coupler 2 by aligning the open end of the cavity 81 with the end of coupler 2 and sliding device 44 over coupler 2 so that the outer surface of coupler 2 is held within the open ended cavity 81 of locking device 44. The device 44 has a size and shape such that a sliding and secure fit, with close tolerances is obtained with coupler 2. In this position the couplers hitch ball receptacle 17 is covered by the locking device 44 and can not receive a hitch ball.

Next is a discussion of the locking mechanism for holding locking device 44 in place to prevent the trailer from being stolen. Referring to FIGS. 30, 31 and 32 a coupler engaging means is housed within housing 72. Pivot pin 25 is supported from the interior of housing 72. One of the ends of elongated member 40 is attached to the pivot pin 25. The other end of elongated member 40 swings in an arc about the axis of pivot pin 25. There is a boss 41 formed on the top of elongated member 40 aligned for movement into hitch ball receptacle 17. The boss 41 is sized to allow it to be easily inserted into hitch ball receptacle 17. Any attempt to remove the device from the coupler will cause boss 41 to bear against the interior surface 18 of hitch ball receptacle 17. Therefore, boss 41 must be of sufficient shape and strength to withstand bending or breakage from such engagement. A leg 43 extends downward from elongated member 40. Boss 41 may be integral member with leg 43 as depicted in FIGS. 31 and 32. Lock 7 is housed in end wall 59 for engagement with leg 43 so that lock pin 14A extending from lock 7 is projected toward leg 43 when the lock 7 is moved from the unlocked position to the locked position, thereby pivoting the swinging end of elongated member 40 toward hitch ball receptacle 17 and moving boss 41 into hitch ball receptacle 17.

FIG. 31 shows the eighth embodiment of the invention positioned on coupler 2 with lock 7 in an unlocked position. Preferably, lock 7, is a punch type cylinder lock, and can be switched to the locked position by depressing lock punch 14B. However, any number of locks known in the art may also be used.

FIG. 32 shows the eighth embodiment of the invention, attached to coupler 2 with lock 7 in a locked position.

As can be seen in FIGS. 31 and 32, when lock 7 is in a locked position the lock pin 14A is fully extended and bearing against the leg 43 at an approximate right angle with respect to the leg 43, elongated member 40 has moved toward hitch ball receptacle 17, boss 41 is inside of hitch ball receptacle 17, elongated member 40 is held in position by lock pin 14A bearing against leg 43 and can not swing away from hitch ball receptacle 17 until lock pin 14A is retracted. When in this locked position hitch ball receptacle 17 should be covered by locking device 44 and boss 41 should be inside hitch ball receptacle 17. Any attempt to remove locking device 44 will cause boss 41 to bear against a portion of interior surface 18 of hitch ball receptacle 17, thereby obstructing the removal of the locking device and preventing a hitch ball from being inserted into hitch ball receptacle 17. Boss 41 should be of sufficient size, shape and strength to withstand bending or breakage as a result of forced contact with the interior surface 18 of hitch ball receptacle 17.

To remove locking device 44 from coupler 2, lock 7 must first be unlocked using a key, not shown. Unlocking lock 7 causes lock pin 14A to retract away from leg 43, thereby allowing the force of gravity to swing the free end of elongated member 40 away from hitch ball receptacle 17 and dislodge boss 41 from hitch ball receptacle 17. A spring, not shown, can be positioned to enhance the motion of elongated member 40 away from hitch ball receptacle 17.

Ninth Embodiment

Figure 33:
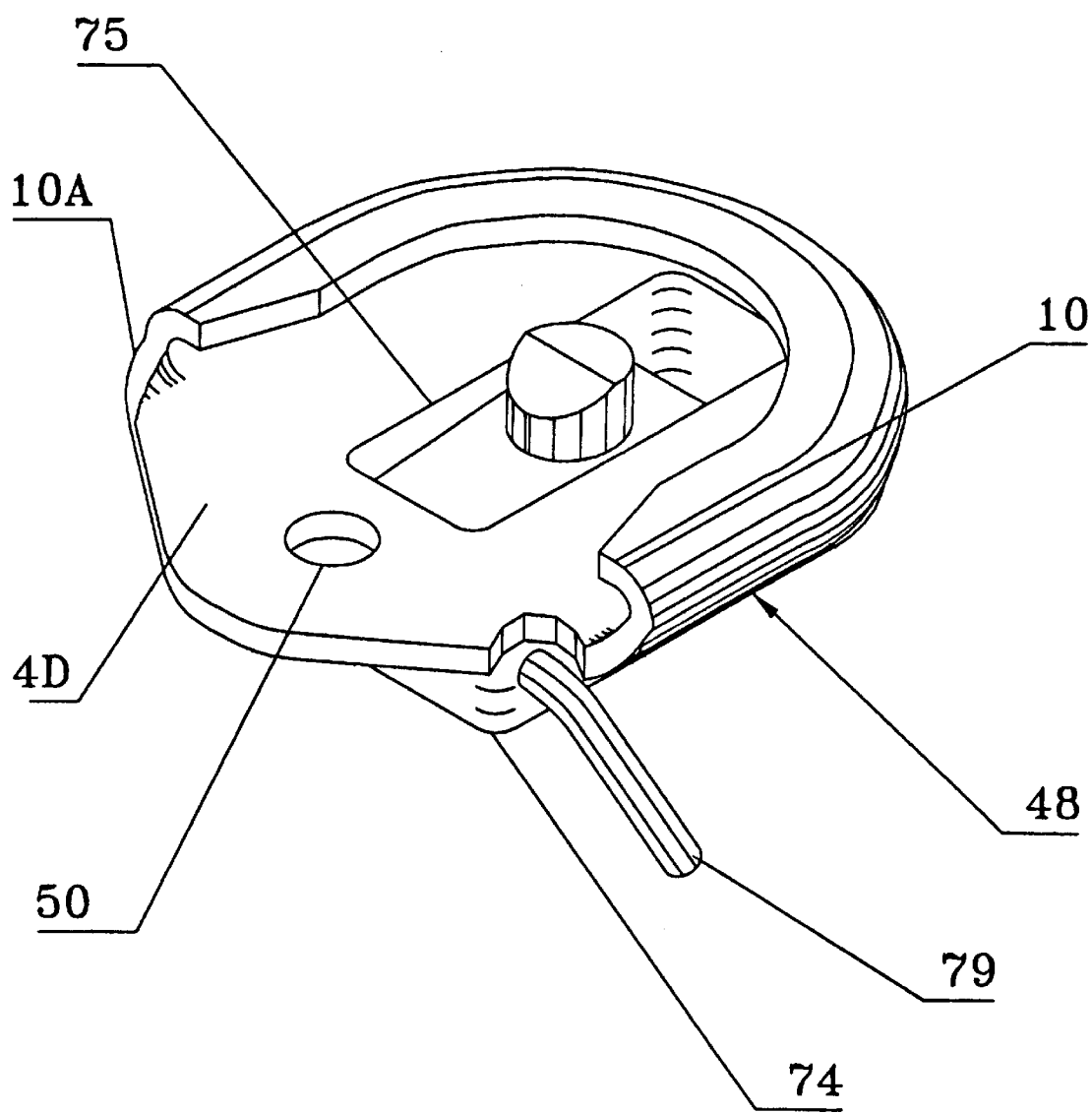
FIG. 33 is an isometric view of the ninth embodiment of the locking device of the present invention with the lock shown in a locked position.
Figure 34:
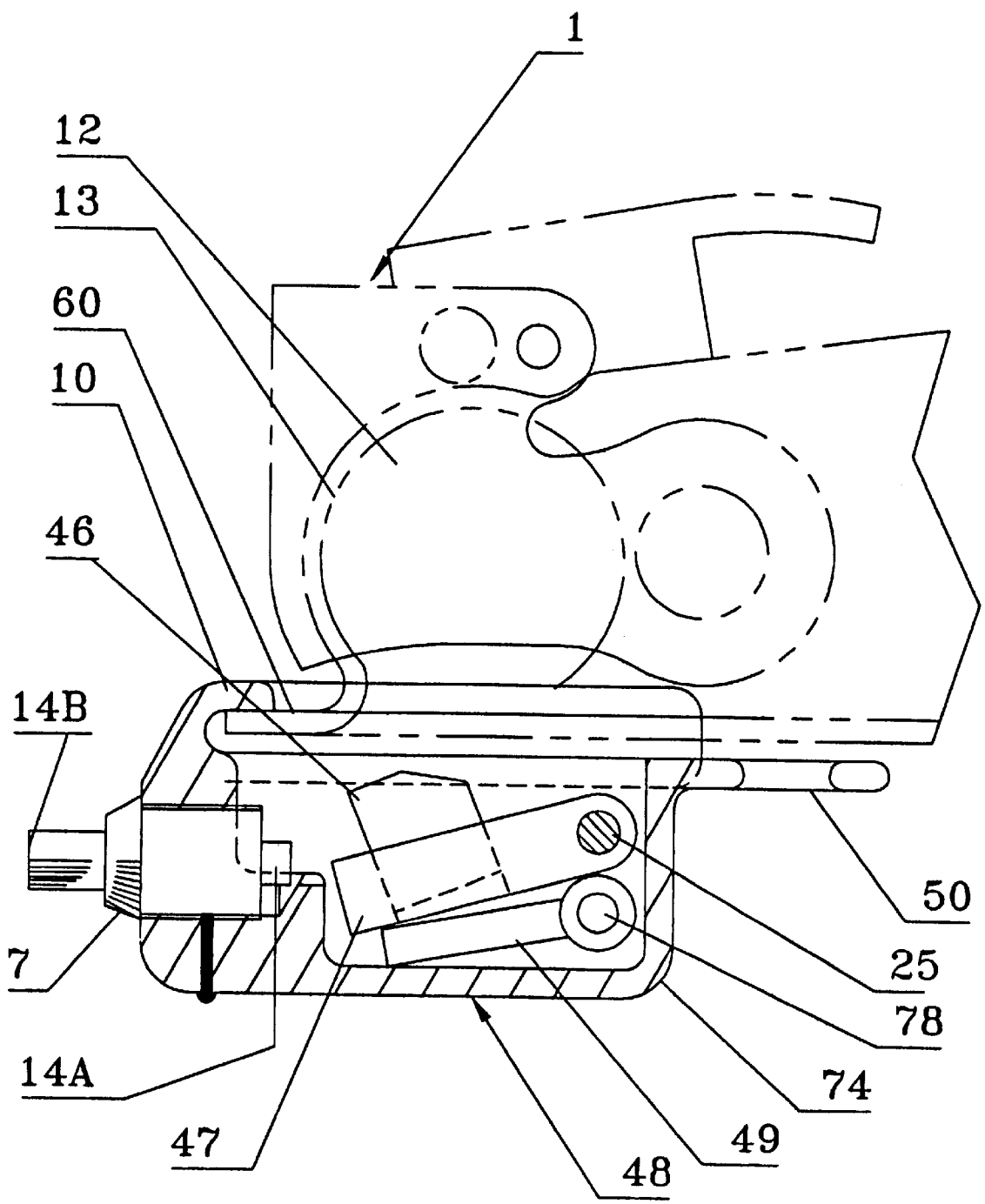
FIG. 34 is a partial side view, partial cross-sectional view of the ninth embodiment of the locking device shown positioned on a coupler in an unlocked position.
Figure 35:
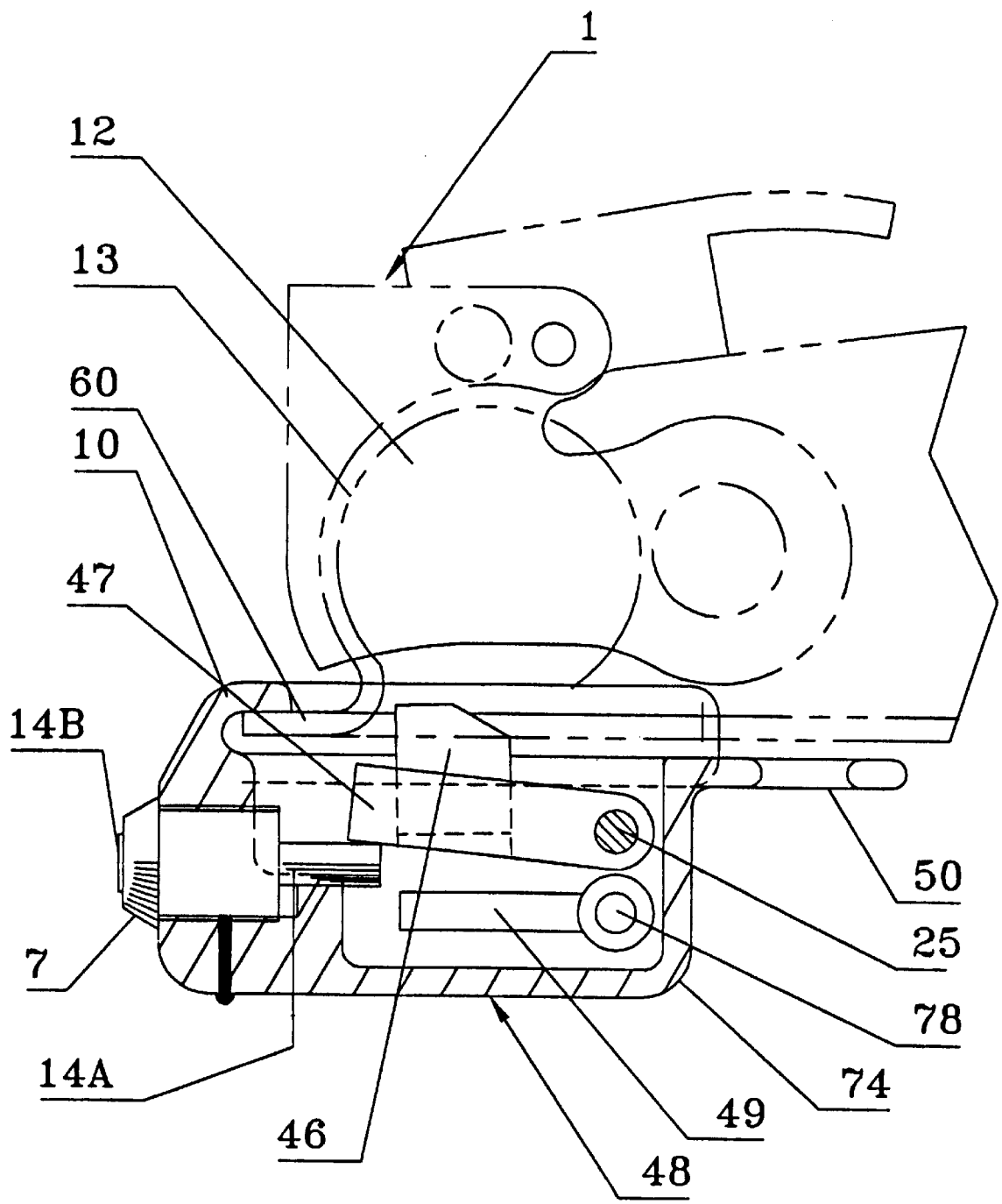
FIG. 35 is the same view as FIG. 34, but showing the locking device in a locked position.

The ninth embodiment has a body made to fit a coupler of the type shown in FIG. 1. Referring to FIGS. 33, 34 and 35, locking device 48 has a planar body member 4D, with a bottom side and a top side, said top side having a U-shaped groove 10 formed about the periphery of the top side. The U-shaped groove 10 is comprised of an upturned side member 10A formed about a part of the periphery of the planar member with the side member having an inwardly extending lip 10B. The planar body member 4D has an opening 75 with a housing 74 extending downward from the bottom side to enclose opening 75 and to house pivot pin 25, pivot pin 78, elongated member 47, boss 46 and lever 49. Opening 75 is positioned to be aligned with hitch ball receptacle 12 when device 48 is placed on coupler 1.

Locking device 48 is positioned or placed on coupler 1 by aligning outwardly extending flange 60 of coupler 1 with U-shaped groove 10 of locking device 48 and sliding the locking device 48 onto coupler 1 so that the coupler's flange 60 is held in U-shaped groove 10. In this position the coupler's hitch ball receptacle 12 is covered by locking device 48 and when so covered cannot receive a hitch ball. Referring to FIGS. 33 and 34, when locking device 48 is properly positioned on coupler 1, then opening 75 in planar body member 4D should be next to the hitch ball receptacle 12. The device 48 has a size and shape such that a sliding and secure fit, with close tolerances, is obtained with coupler 1.

FIG. 34 shows the ninth embodiment of the invention positioned on coupler with the lock 7 in an unlocked position. Preferably, lock 7 is a punch type cylinder lock which can be locked by depressing lock punch 14B. However, any number of locks known in the art may also be used.

FIG. 35 shows the ninth embodiment of the invention, attached to coupler 1 with the lock 7 in a locked position.

Next is a discussion of the locking mechanism for holding the locking device 48 in place to prevent the trailer from being stolen. Referring to FIGS. 33, 34 and 35, a coupler engaging means is housed within housing 74. The coupler engaging means is an elongated member 47 connected to housing 74 at one of its ends pivot pin 25. Pivot pin 25 is mounted on housing 74 so that the free end of elongated member 47 swings in an arc about the axis of pivot pin. Lock 7 is mounted in the end wall of housing 74 so that lock pin 14A may interact with elongated member 47. There is a boss 46 formed on the top of the elongated member 47 aligned for movement into hitch ball receptacle 12. The boss 46 is sized to allow it to be easily inserted into hitch ball receptacle 12. Any attempt to remove the device from the coupler will cause boss 46 to bear against the interior surface 13 of hitch ball receptacle 12. Therefore, boss 46 must be of sufficient shape and strength to withstand bending or breakage from such engagement. Below elongated member 47 there is a lever 49 connected to the interior of housing 74 by pivot pin 78. Pivot pin 78 is supported by housing 74. The lever 49 has a handle 79, connected thereto. The handle 79 extends through an opening in the housing for operation outside the body. Preferably, lever 49 and handle 79 form an angle and are connected to pivot pin 78 at the vertex of the angle. Preferably, lever 49 and handle 79 are integrally connected to one another. Movement of the handle 79 causes the top of lever 49 to pivot against the bottom of elongated member 47, thereby swinging the elongated member 47 toward hitch ball receptacle 12 and moving boss 46 into hitch ball receptacle 12. Boss 46 is then held inside hitch ball receptacle 12, by depressing lock punch 14B thereby locking lock 7 and causing lock pin 14A to extend to a position immediately under elongated member 47. The presence of lock pin 14A under elongated member 47 prevents any movement of boss 46 in a direction away from hitch ball receptacle 12. When in this locked position hitch ball receptacle 12 should be covered by locking device 48 and locking device 48 and boss 46 should be inside hitch ball receptacle 12. Any attempt to remove locking device 48 will cause boss 46 to bear against a portion of interior surface 13 of hitch ball receptacle 12, thereby obstructing the removal of locking device 48 and preventing a hitch ball from being inserted into hitch ball receptacle 12. Boss 46 should be of sufficient size, shape and strength to withstand bending or breakage as a result of forced contact with the interior surface 13 of hitch ball receptacle 12.

To remove boss 46 from hitch ball receptacle 12, a key, not shown, is used to unlock lock 7. When lock 7 is unlocked, lock pin 14A is retracted which allows the force of gravity to swing elongated member 47 away from the hitch ball receptacle 12 and dislodge boss 46 from hitch ball receptacle 12.

Tenth Embodiment

Figure 36:
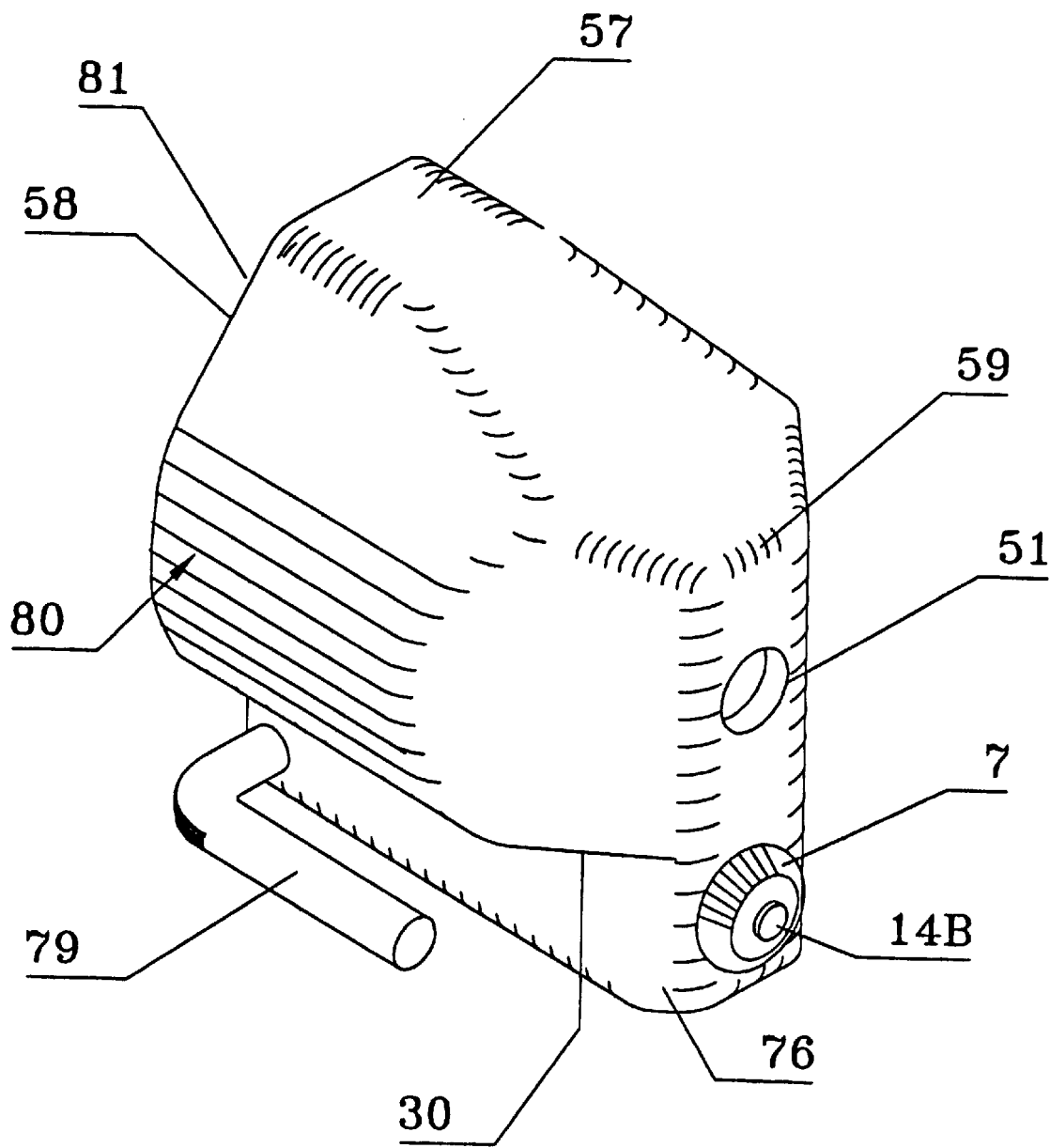
FIG. 36 is an isometric view of the tenth embodiment of the locking device shown with the lock in a locked position.
Figure 37:
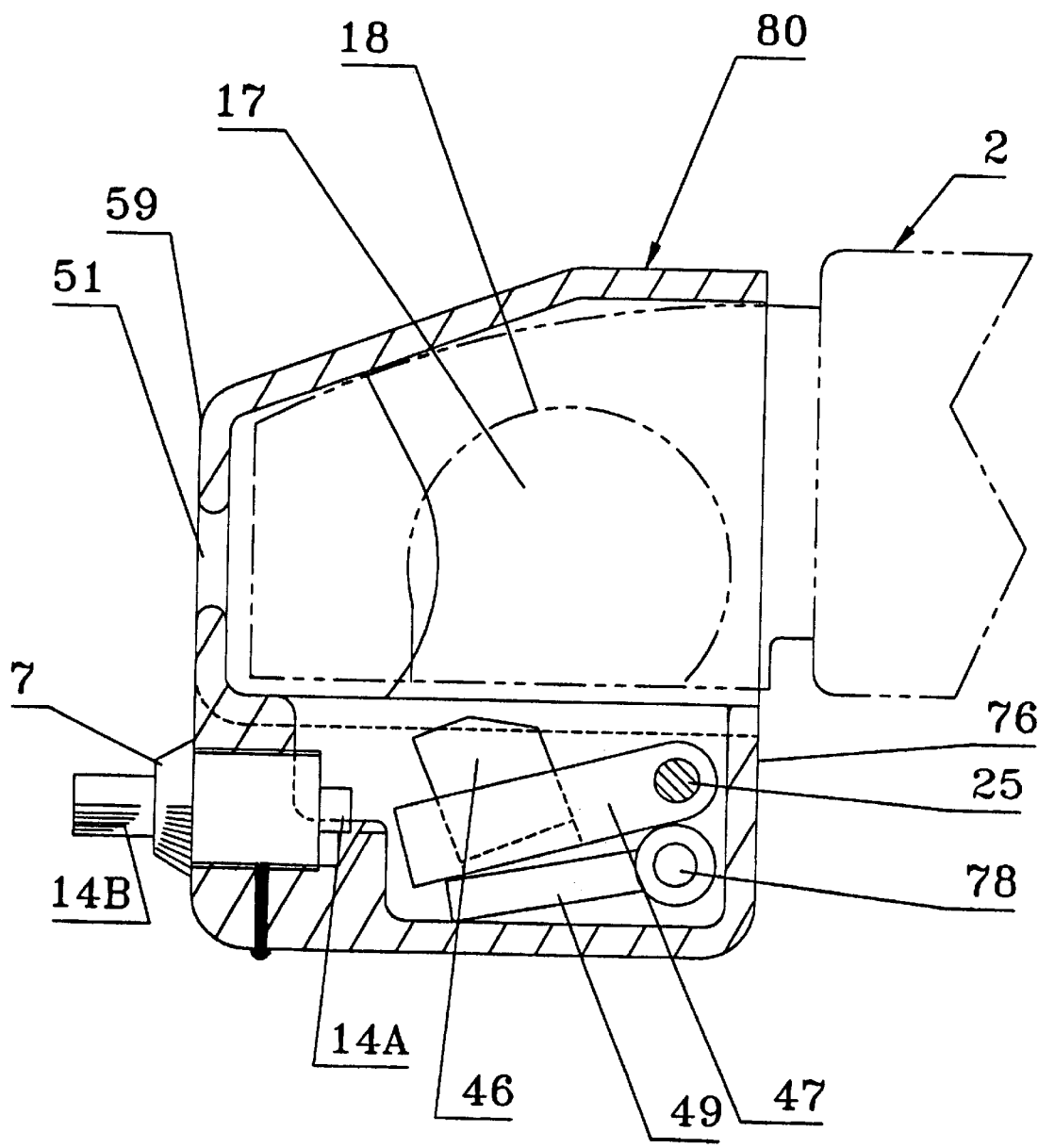
FIG. 37 is a partial side view, partial cross-sectional view of the tenth embodiment of the locking device shown positioned on a coupler in an unlocked position.
Figure 38:
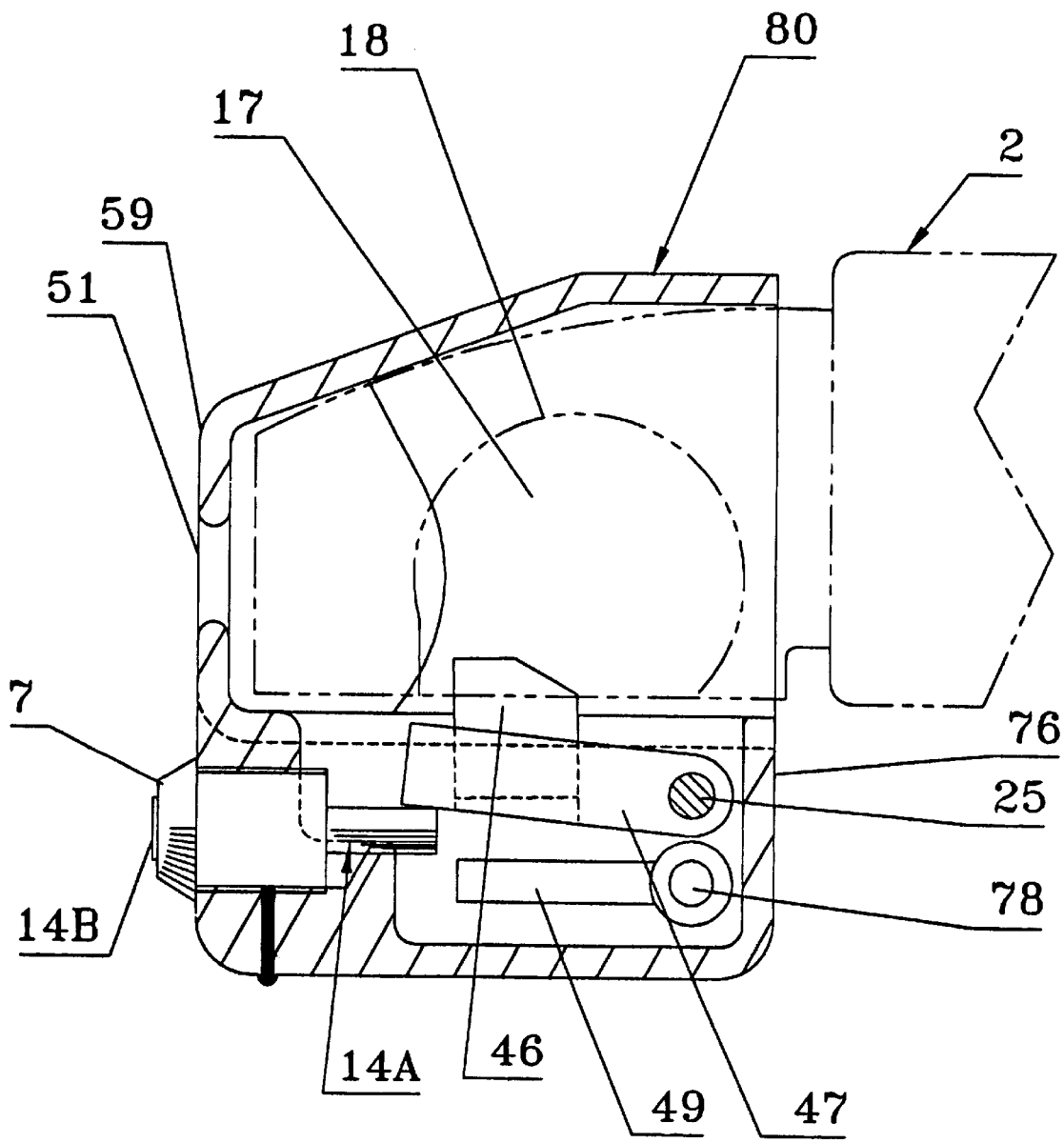
FIG. 38 is the same view as FIG. 37, but showing the locking device in a locked position.

FIGS. 36, 37 and 38 depict the tenth embodiment of the present invention. This embodiment is similar to the ninth embodiment except that the body of the device is designed to fit couplers of the type shown in FIG. 8 which are usually manufactured from cast or forged components. An end view of the body of the locking device of this tenth embodiment is shown in FIG. 36. The body of locking device 80 includes a ceiling 57. There are two side walls 58 and an end wall 59 extending downward from ceiling 57. The two side walls 58 each have and in-turned lip 30. The ceiling 57, side walls 58, end wall 59 and in-turned lips 30 define an open ended cavity 81 into which the coupler 2 is received. Extending downward from in-turned lips 30, is a housing 76 comprised of two housing side walls closed at each end by a housing end wall and closed at the bottom by a housing bottom wall. The interior of housing 76 opens into the open ended cavity 81 so that when locking device 80 is positioned on coupler 2, the interior of housing 76 opens into hitch ball receptacle 17 of coupler 2.

The locking device 80 is positioned on coupler 2 by aligning the open end of the cavity 81 with the end of coupler 2 and sliding locking device 80 over coupler 2 so that the outer surface of the coupler 2 is held within said open ended cavity 81 of the body of locking device 80. The locking device 80 has a size and shape such that a sliding and secure fit, with close tolerances is obtained with coupler 2.

FIG. 37 shows the tenth embodiment of the invention positioned on coupler 2 with lock 7 in an unlocked position. Preferably, lock 7 is a punch type cylinder lock which can be locked by depressing lock punch 14B. However, any number of locks known in the art may be used.

FIG. 38 shows the tenth embodiment of the invention, attached to coupler 2 with lock 7 in a locked position.

Next is a discussion of the locking mechanism for holding locking device 80 in place to prevent the trailer from being stolen. Referring to FIGS. 37 and 38, a coupler engaging means is housed within housing 76 of the body. A lock 7 is mounted in end wall 59. The coupler engaging means is an elongated member 47 connected to housing 76 by pivot pin 25. Pivot pin 25 is mounted in housing 76 at a position opposite lock 7. The free end of elongated member 47 swings in an arc about the axis of pivot pin 25. There is a boss 46 formed on the top of elongated member 47 aligned for movement into hitch ball receptacle 17. Boss 46 is sized to allow it to be easily inserted into hitch ball receptacle 17. Any attempt to remove the device from the coupler will cause boss 46 to bear against the interior surface 18 of hitch ball receptacle 17. Therefore, boss 46 must be of sufficient shape and strength to withstand bending or breakage from such engagement. Below elongated member 47, a lever 49 is connected to housing 76 by pivot pin 78. Pivot pin 78 is supported from the housing 76 at a position opposite end wall 59. Lever 49 has a handle 79, integral therewith which extends through an opening of the body for operation outside the body. Preferably lever 49 and handle 79 form an angle and are connected to pivot pin 78 at the vertex of the angle. Movement of handle 79 causes the top of lever 49 to pivot against the bottom of elongated member 47, thereby swinging elongated member 47 toward hitch ball receptacle 17 and moving boss 46 into hitch ball receptacle 17. Boss 46 is then held inside hitch ball receptacle 17, by depressing lock punch 14B thereby locking lock 7 and causing lock pin 14A to extend to a position immediately under elongated member 47. The presence of lock pin 14A under elongated member 47 prevents any movement of boss 46 in a direction away from hitch ball receptacle 17. When in this locked position hitch ball receptacle 17 should be covered by locking device 80 and boss 46 should be inside hitch ball receptacle 17. Any attempt to remove locking device 80 will cause boss 46 to bear against a portion of interior surface 18 of hitch ball receptacle 17, thereby obstructing the removal of locking device 80 and preventing a hitch ball from being inserted into hitch ball receptacle 17. Boss 46 should be of sufficient size, shape and strength to withstand bending or breakage as a result of forced contact with the interior surface 18 of hitch ball receptacle 17.

To remove boss 46 from hitch ball receptacle 17, a key, not shown, is used to unlock lock 7. When lock 7 is moved from the locked position to the unlocked position, lock pin 14A is retracted which allows the force of gravity to swing elongated member 47 away from hitch ball receptacle 17 and dislodge boss 46 from hitch ball receptacle 17.

Eleventh Embodiment

Figure 39:
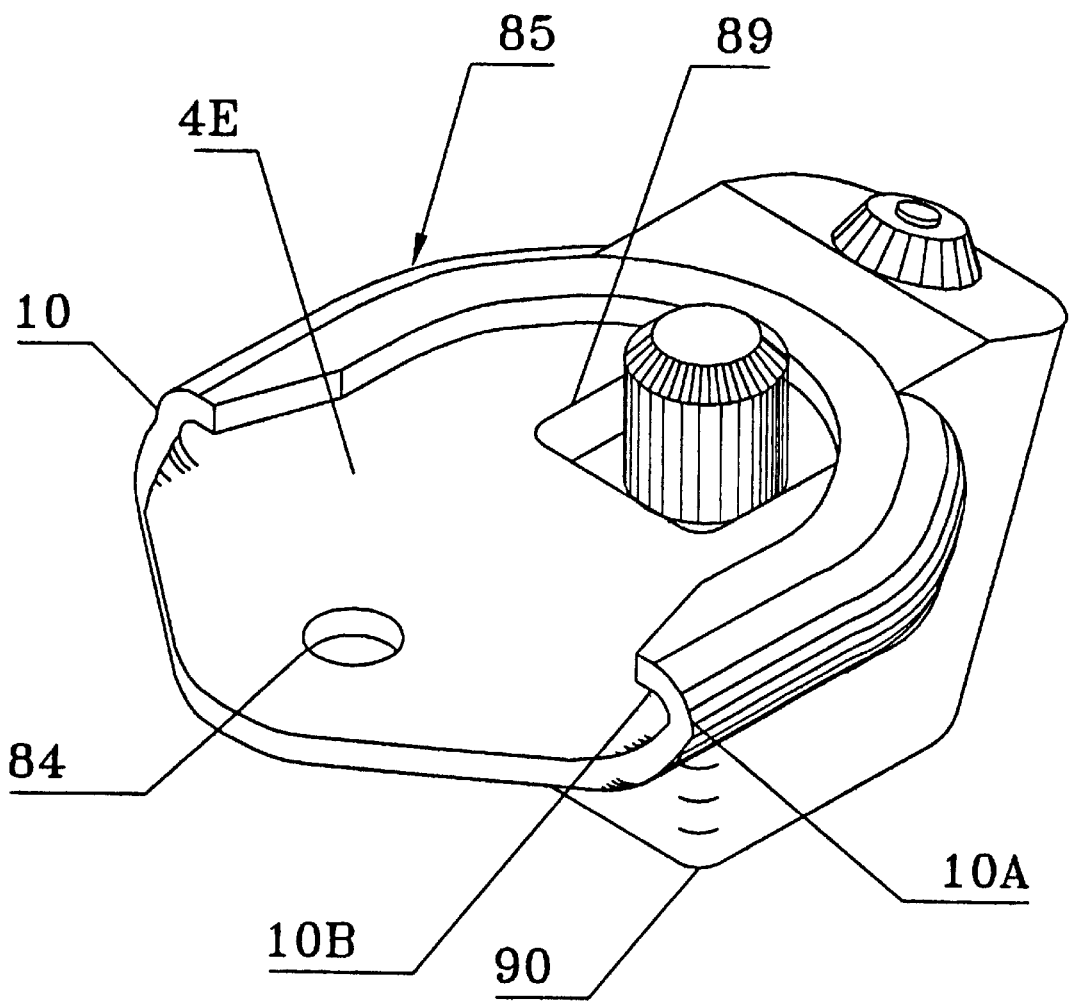
FIG. 39 is an isometric view of the eleventh embodiment of the locking device shown with the lock in a locked position.
Figure 40:
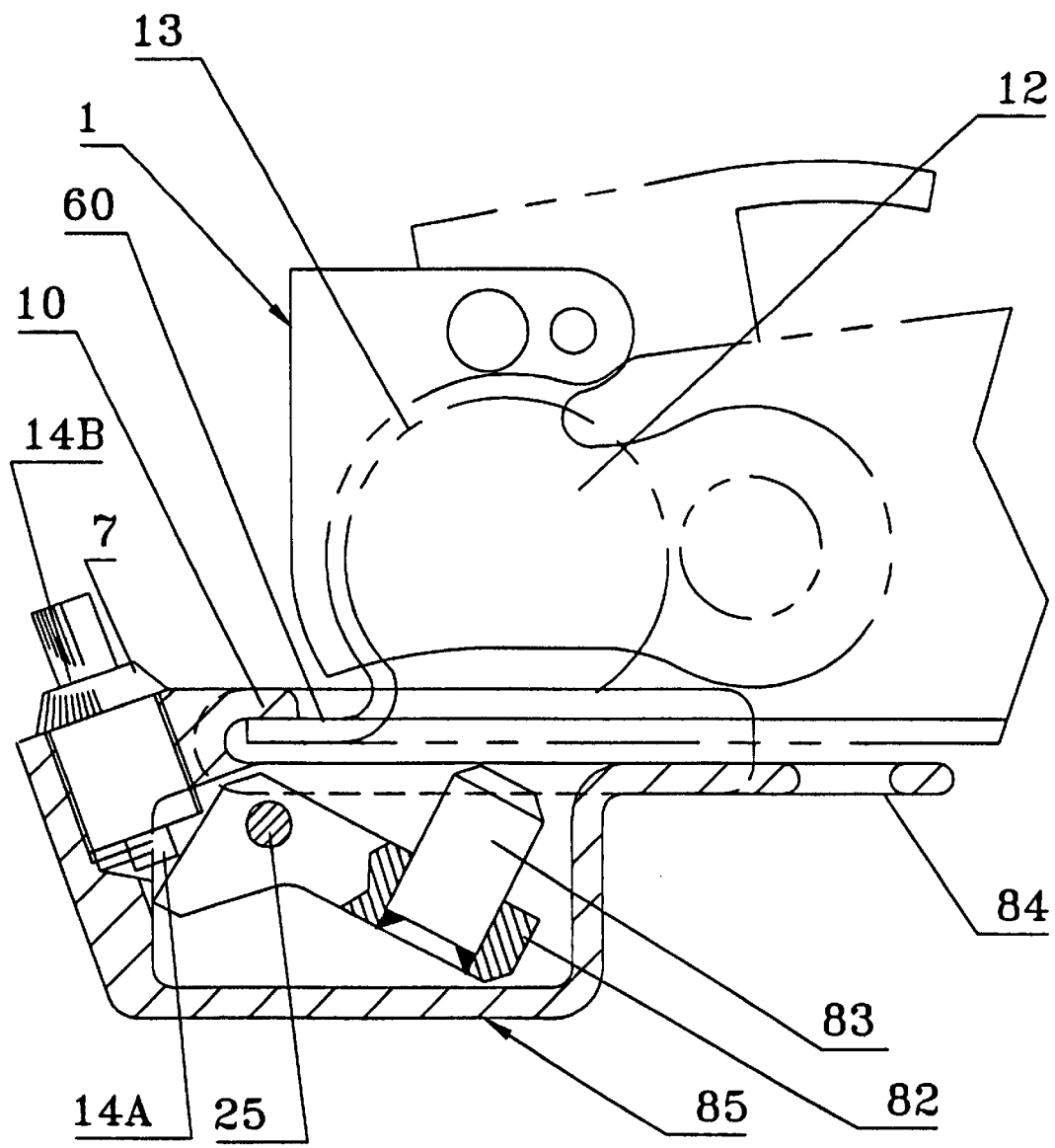
FIG. 40 is a partial side view, partial cross-sectional view of the eleventh embodiment of the locking device positioned on a coupler in an unlocked position.
Figure 41:
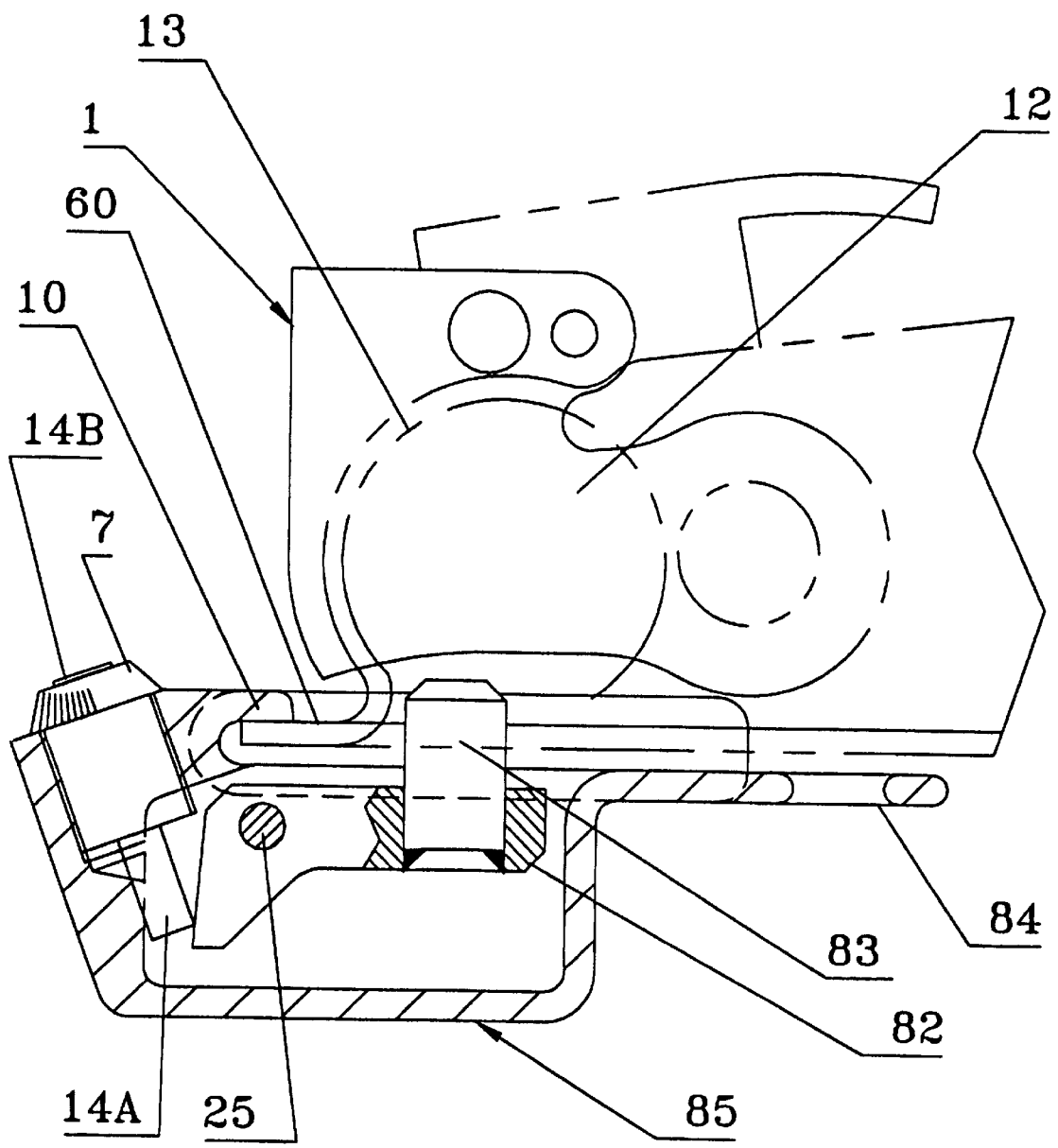
FIG. 41 is the same view as FIG. 40, but showing the locking device in a locked position.

FIGS. 39, 40 and 41 depict the eleventh embodiment of the present invention. The eleventh embodiment has a body made to fit a coupler of the type shown in FIG. 1. Referring to FIG. 39, it can be seen that locking device 85 has a planar body member 4E, with a bottom side and a top side, said top side having a U-shaped groove 10 formed about the periphery of the top side. The U-shaped groove 10 is comprised of an upturned side member 10A formed about a part of the periphery of the planar member 4E with the side member having an inwardly extending lip 10B. The planar body member 4E has an opening 89 with a housing 90 extending downward from the bottom side to enclose opening 89. Referring to FIGS. 40 and 41, the housing 90 houses elongated member 82, boss 83, leg 95 and pivot pin 25. Opening 89 is positioned to be aligned with hitch ball receptacle 12 when device 85 is placed on coupler 1.

The locking device 85 is positioned or placed onto coupler 1 by aligning the outwardly extending flange 60 of coupler 1 with U-shaped groove 10 of locking device 85 and sliding device 85 onto coupler 1 so that the coupler's flange 60 is held in the U-shaped groove 10. Opening 89 in planar body member 4E should be next to the hitch ball receptacle 12 when device 85 is properly positioned on coupler 1. The device has a size and shape such that a sliding and secure fit, with close tolerances, is obtained with the coupler 1. In this position the coupler's hitch ball receptacle 12 is covered by the locking device 85 and when so covered cannot receive a hitch ball.

Next is a discussion of the locking mechanism for holding locking device 85 in place to prevent the trailer from being stolen. Referring to FIGS. 40 and 41, a coupler engaging means is housed within housing 90. Pivot pin 25 is supported from the housing 90. One of the ends of elongated member 82 is attached to pivot pin 25. The other end of elongated member 82 swings in an arc about the axis of pivot pin 25. There is a boss 83 formed on the top of elongated member 82 aligned for movement into hitch ball receptacle 12. The boss 83 is sized to allow it to be easily inserted into hitch ball receptacle 12. Any attempt to remove the device from the coupler will cause boss 83 to bear against the interior surface 13 of hitch ball receptacle 12. Therefore, boss 83 must be of sufficient shape and strength to withstand bending or breakage from such engagement. There is a leg 95 extending downward from the bottom surface of elongated member 82. Boss 83 may be an integral member of elongated member 82. Boss 83, elongated member 82 and leg 95 also may be one integral part. The lock 7 is housed in the end wall of housing 90 for engagement with leg 95 so that lock pin 14A extending from lock 7 is projected toward leg 95 when lock 7 is moved from an unlocked position to a locked position, thereby pivoting the swinging end of elongated member 82 toward hitch ball receptacle 12 and moving boss 83 into hitch ball receptacle 12.

FIG. 40 shows the locking device 85 positioned on coupler 1 with lock 7 in an unlocked position. Lock 7 is switched from an unlocked position to a locked position by depressing lock plunger 14B. Preferably, lock 7 is a punch type cylinder lock. However, any number of locks known in the art may also be used.

FIG. 41 shows locking device 85 attached to coupler 1 with lock 7 in a locked position. As can be seen in FIG. 41, when lock 7 is in a locked position lock pin 14A is fully extended and bearing against leg 95, elongated member 82 has been moved toward hitch ball receptacle 12, boss 83 is inside of hitch ball receptacle 12, elongated member 82 is held in position by lock pin 14A bearing against leg 95 and can not swing away from hitch ball receptacle 12 until lock pin 14A is retracted. When in this position hitch ball receptacle 12 is covered by the locking device 85 and locking device 85 can not be removed from the coupler 1, because boss 83 is inside hitch ball receptacle 12 and will bear against a portion of interior surface 13 of hitch ball receptacle 12, thereby obstructing the removal of locking device 85 and preventing a hitch ball from being inserted into hitch ball receptacle 12. Boss 83 should be of sufficient size, shape and strength to withstand bending or breakage as a result of forced contact with the interior surface 13 of hitch ball receptacle 12.

To remove locking device 85 from coupler 1, lock 7 must be unlocked using a key, not shown. Unlocking lock 7 causes lock pin 14A to retract away from leg 95, thereby allowing the force of gravity to swing the free end of elongated member 82 away from hitch ball receptacle 12 and dislodge boss 83 from hitch ball receptacle 12. A spring, not shown, can be positioned to enhance the motion of elongated member 82 away from hitch ball receptacle 12.

Twelfth Embodiment

Figure 42:
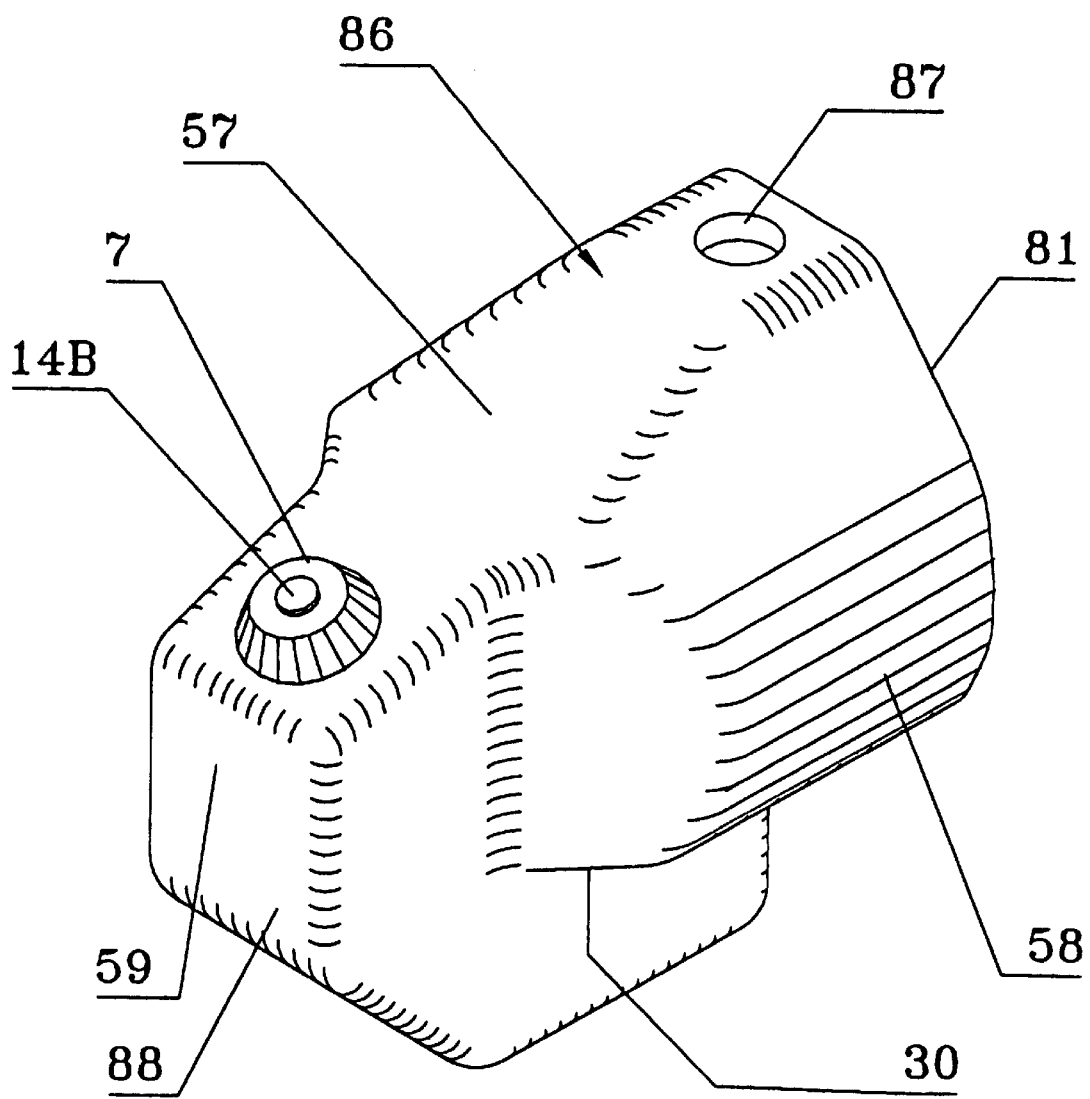
FIG. 42 is an isometric view of the twelfth embodiment of the locking device with the lock in a locked position.
Figure 43:
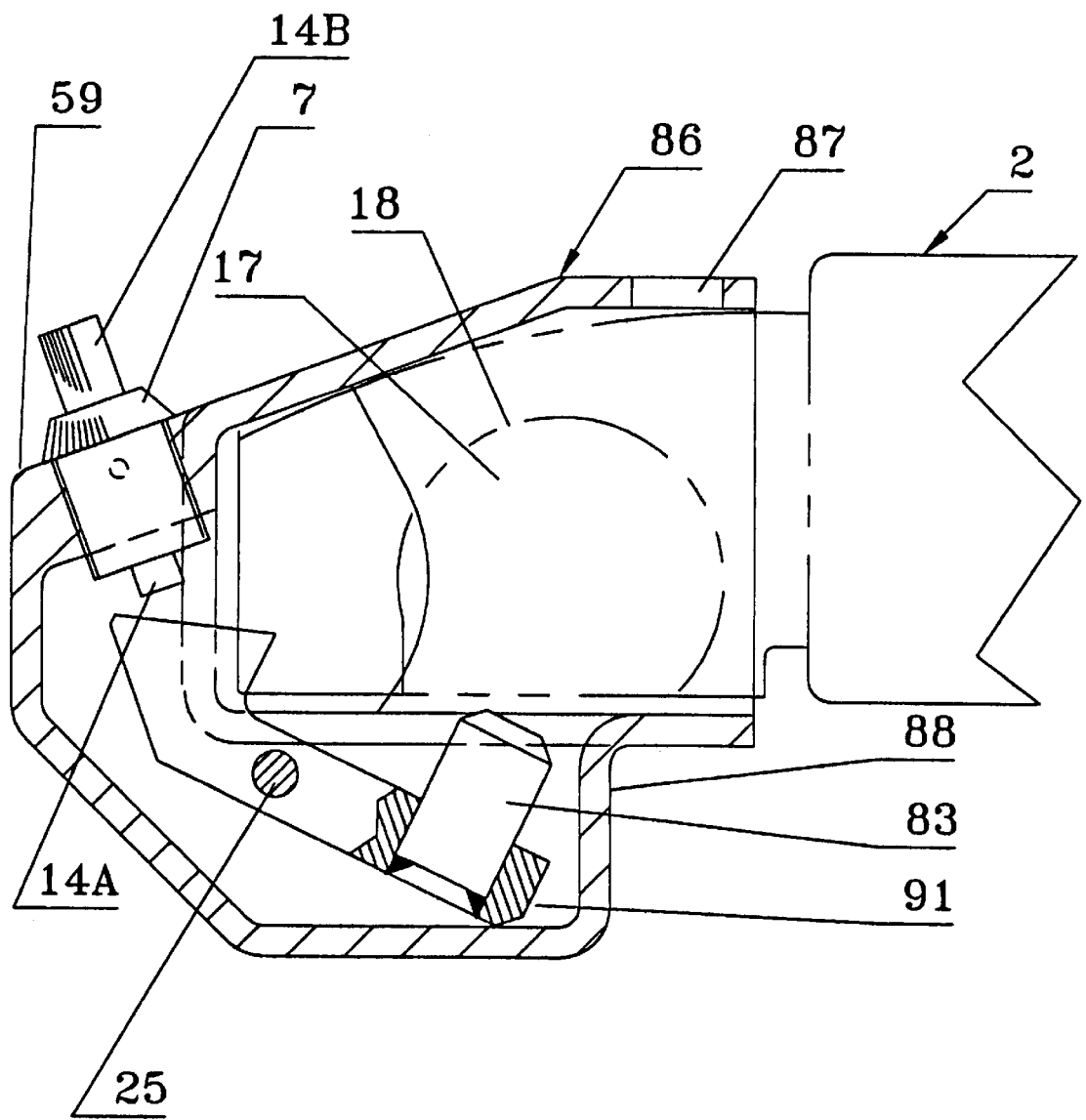
FIG. 43 is a partial side view, partial cross sectional view of the twelfth embodiment of the locking device shown positioned on a coupler in an unlocked position.
Figure 44:
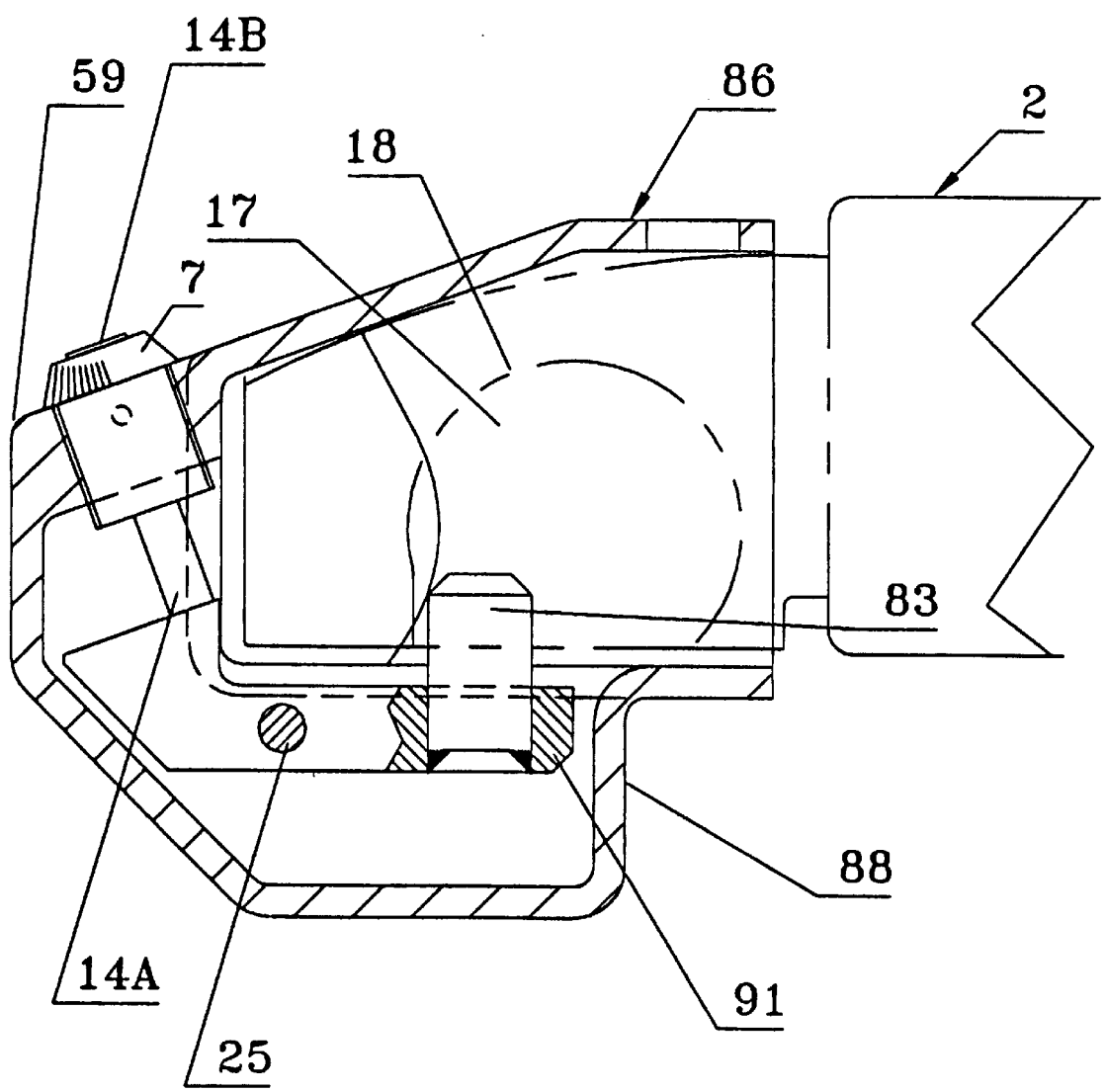
FIG. 44 is the same view as FIG. 43, but showing the locking device in a locked position.

FIGS. 42, 43 and 44 depict the twelfth embodiment of the present invention. The body of the device 86 is designed to fit couplers of the type shown in FIG. 8, which are usually manufactured from cast or forged components. An isometric view from the front of the body of the locking device of this twelfth embodiment is shown in FIG. 42. The body of device 86 includes a ceiling 57. There are two side walls 58 and an end wall 59 extending downward from ceiling 57. The two side walls 58 each have and in-turned lip 30. The ceiling 57, side walls 58, end wall 59 and in-turned lips 30 define an open ended cavity 81 into which the coupler 2 is received. Extending downward from in-turned lips 30, is a housing 88 comprised of two housing side walls closed at each end by a housing end wall and closed at the bottom by a housing bottom wall. The interior of housing 88 opens into the open ended cavity 81 so that when locking device 86 is positioned on coupler 2, the interior of housing 88 opens into hitch ball receptacle 17 of coupler 2.

The locking device 86 is fitted on to the coupler 2 by aligning the open end of the cavity 81 with the end of coupler 2 and sliding device 86 over coupler 2 so that the outer surface of coupler 2 is held within the open ended cavity 81 of locking device 86. The device 86 has a size and shape such that a sliding and secure fit, with close tolerances is obtained with coupler 2. In this position the coupler's hitch ball receptacle 17 is covered by the locking device 86 and can not receive a hitch ball.

Next is a discussion of the locking mechanism for holding locking device 44 in place to prevent the trailer from being stolen. Referring to FIGS. 42, 43 and 44 a coupler engaging means is housed within housing 88. Elongated member 91 has a first end and a second end and is attached to pivot pin 25 at a point in between the two ends so that the downward movement of the first end rotates the second end in an upward direction. Pivot pin 25 is supported from the interior of housing 88. There is a boss 83 formed on the top of elongated member 91 aligned for movement into hitch ball receptacle 17. The boss 83 is sized to allow it to be easily inserted into hitch ball receptacle 17. Any attempt to remove the device from the coupler will cause boss 83 to bear against the interior surface 18 of hitch ball receptacle 17. Therefore, boss 83 must be of sufficient shape and strength to withstand bending or breakage from such engagement. Boss 83 may be an integral member with elongated member 91. Lock 7 is housed in end wall 59 for engagement with the first end of elongated member 91 so that lock pin 14A extending from lock 7 is projected toward the first end of elongated member 91 when the lock 7 is moved from the unlocked position to the locked position, thereby pivoting the second end of elongated member 91 toward hitch ball receptacle 17 and moving boss 83 into hitch ball receptacle 17.

FIG. 43 shows the twelfth embodiment of the invention positioned on coupler 2 with lock 7 in an unlocked position. Preferably, lock 7, is a punch type cylinder lock, and can be switched to the locked position by depressing lock punch 14B. However, any number of locks known in the art may also be used.

FIG. 44 shows the twelfth embodiment of the invention, attached to coupler 2 with lock 7 in a locked position.

As can be seen in FIGS. 43 and 44, when lock 7 is in a locked position the lock pin 14A is fully extended and bearing against the first end of elongated member 91, the second end of elongated member 91 has rotated toward hitch ball receptacle 17 and boss 83 is inside of hitch ball receptacle 17. Elongated member 91 is held in position by lock pin 14A bearing against the first end of elongated member 91 and the second end of elongated member 91 can not swing away from hitch ball receptacle 17 until lock pin 14A is retracted. When in this locked position hitch ball receptacle 17 should be covered by locking device 86 and boss 83 should be inside hitch ball receptacle 17. Any attempt to remove locking device 86 will cause boss 83 to bear against a portion of interior surface 18 of hitch ball receptacle 17, thereby obstructing the removal of the locking device and preventing a hitch ball from being inserted into hitch ball receptacle 17. Boss 83 should be of sufficient size, shape and strength to withstand bending or breakage as a result of forced contact with the interior surface 18 of hitch ball receptacle 17.

To remove locking device 86 from coupler 2, lock 7 must first be unlocked using a key, not shown. Unlocking lock 7 causes lock pin 14A to retract away from leg the first end of elongated member 91, thereby allowing the force of gravity to swing the second end of elongated member 91 away from hitch ball receptacle 17 and dislodge boss 83 from hitch ball receptacle 17. A spring, not shown, can be positioned to enhance the motion of the second end of elongated member 91 away from hitch ball receptacle 17.

Thirteenth Embodiment

Figure 47:
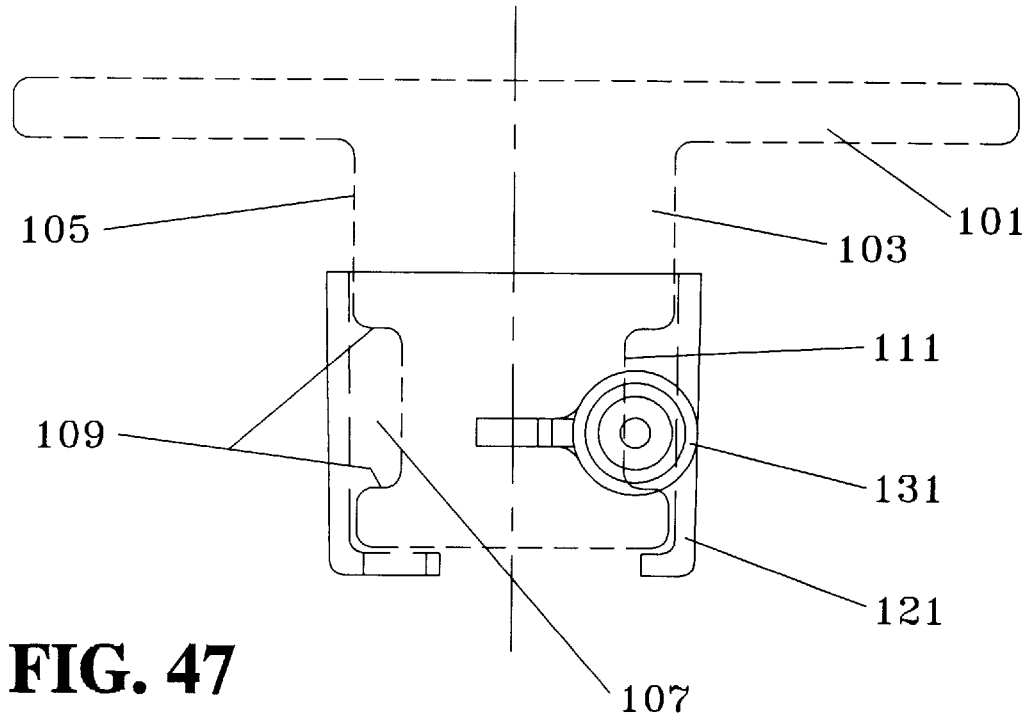
FIG. 47 is a diametric cross-section of the thirteenth embodiment of the locking device shown positioned on a king pin coupler of a trailer.
Figure 48:
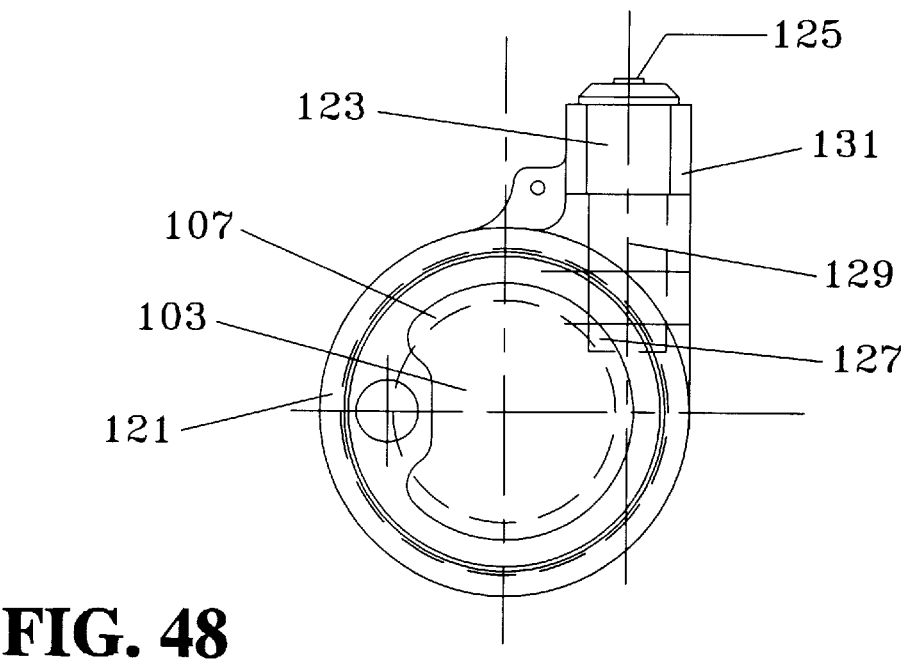
FIG. 48 is a bottom plan view of the embodiment of FIG. 47.
Figure 49:
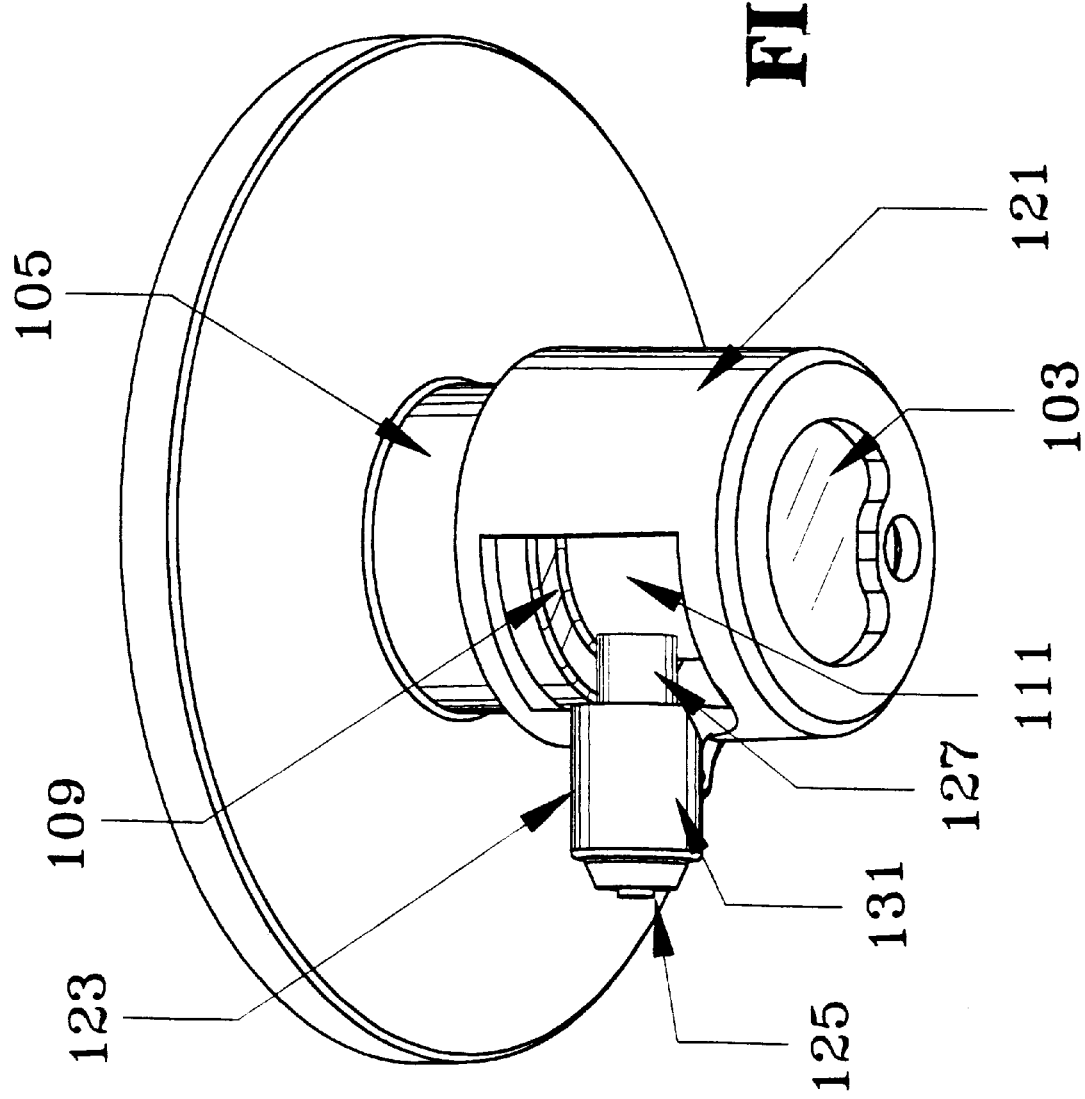
FIG. 49 is a perspective view with parts broken away of the embodiment of FIG. 47 shown positioned on a king pin coupler of a trailer with the locking device in a locked or extended position.

FIGS. 47, 48 and 49 depict a thirteenth embodiment of the invention in which the coupler 101 is the king pin of a trailer hitch. As shown, the coupler 101 includes a downwardly depending cylindrical portion 103 having an outer perimeter 105 with an annular receptacle 107 formed by an opening 109 extending to an interior surface 111 which is concentric with and diametrically smaller than the outer perimeter 105 of the coupler 101. The body 121 of the anti-theft device is attachable to the coupler 101 so as to cover the opening 109 of the receptacle 107. A lock 123 is mounted on the body 121 and includes a lock pin 125 and a coupler engaging means 127 longitudinally aligned on an axis 129 of the lock housing 131 which extends somewhat tangentially from the body 121. The engaging means 127 is insertable into and withdrawable from the receptacle 107 of the coupler 101. Thus, with the lock in the unlocked condition, the lock pin 125 and the coupler engaging means 127 are retracted so that the body 121 can slide into engagement on or from engagement with the king pin cylinder 103. Conversely, with the lock pin 125 and coupler engaging means 127 in the locked condition the coupler engaging means 127 extends into the receptacle 107 of the coupler 101. Thus, in the engaged or extended condition, the coupler engaging means 127 prevents removal of the body 121 from the cylindrical portion 103 of the trailer king pin or coupler 101. The device is placed in the locked condition by pressing the pin 125 to move it axially along the pin housing axis 129 to insert the engaging means 127 into the receptacle 107. A key (not shown) is used to release the pin 125 and the coupler engaging means 127 from the engaged or extended condition and return the pin 125 and engaging means 127 to the retracted or unlocked condition under the force exerted by a biasing means within the pin housing 131.

Thus, to place a trailer in an anti-theft condition, the operator simply engages the body 121 on the coupler 101 and presses the pin 125 to insert the coupler engaging means 127 into the receptacle 107, in which condition the device is automatically locked. To remove the device from the trailer coupler, the operator merely uses the key to release the pin 125 and engaging means 127 to the bias of the lock so that it returns to the retracted position. The operator then removes the body 121 from the cylindrical portion 103 of the trailer coupler 101.

While the invention has been described with a certain degree of particularity, it is manifest that many changes may be made in the details of construction without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An anti-theft device for use on a trailer king-pin in which the king-pin has an outer perimeter and a receptacle with an opening and interior surface, said device comprising:

a. a body attachable to the king-pin, said body having a structure such that when the body is attached to the king-pin it covers the opening of the king pin's receptacle;

b. a lock, mounted on the body, with a lock pin having a retracted position when the lock is unlocked and an extended position when the lock is locked, said lock pin is moved from the retracted position to the extended position and from the extended position to the retracted position; by operation of the lock, and a key controlled means in the lock for releasing the lock pin from its extended position; and c. a king-pin engaging means supported from the body for interaction with the lock pin, said means having an engaged position and an unengaged position with respect to the receptacle of the king-pin when said body is attached to the king pin, when in said engaged position a portion of said means is inside the receptacle to prevent removal of the body and when in said unengaged position said means is outside of the receptacle, whereby movement of the lock pin from the retracted position to the extended position causes the king-pin engaging means to move from the unengaged position to the engaged position, and movement of the lock pin from the extended position to the retracted position causes the king-pin engaging means to move from the engaged position to the unengaged position.

* * * * *